(12) United States Patent
Alshina et al.

(10) Patent No.: US 10,171,821 B2
(45) Date of Patent: Jan. 1, 2019

(54) SCALABLE VIDEO ENCODING METHOD AND APPARATUS AND SCALABLE VIDEO DECODING METHOD AND APPARATUS USING UP-SAMPLING FILTER ACCOMPANIED BY CONVERSION OF BIT DEPTH AND COLOR FORMAT

(71) Applicant: SAMSUNG ELECTRONICS CO., LTD., Suwon-si (KR)

(72) Inventors: Elena Alshina, Suwon-si (KR); Chan-yul Kim, Bucheon-si (KR); Alexander Alshin, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 177 days.

(21) Appl. No.: 14/905,525

(22) PCT Filed: Jul. 16, 2014

(86) PCT No.: PCT/KR2014/006466
§ 371 (c)(1),
(2) Date: Jan. 15, 2016

(87) PCT Pub. No.: WO2015/009068
PCT Pub. Date: Jan. 22, 2015

(65) Prior Publication Data
US 2016/0156912 A1 Jun. 2, 2016

Related U.S. Application Data

(60) Provisional application No. 61/846,701, filed on Jul. 16, 2013.

(51) Int. Cl.
*H04N 19/187* (2014.01)
*H04N 19/44* (2014.01)
(Continued)

(52) U.S. Cl.
CPC ......... *H04N 19/187* (2014.11); *H04N 19/105* (2014.11); *H04N 19/117* (2014.11);
(Continued)

(58) Field of Classification Search
CPC .. H04N 19/187; H04N 19/105; H04N 19/117; H04N 19/137; H04N 19/159;
(Continued)

(56) References Cited

U.S. PATENT DOCUMENTS 7,813,428 B2 10/2010 Yoon et al.
8,804,833 B2 8/2014 Francois et al.
(Continued)

FOREIGN PATENT DOCUMENTS

KR 10-2007-0012201 A 1/2007
KR 10-2009-0003174 A 1/2009
(Continued)

OTHER PUBLICATIONS

Communication dated Oct. 22, 2014, Issued by the International Searching Authority in counterpart International Application No. PCT/KR2014/006466 (PCT/ISA/210, PCT/ISA/220, PCT/ISA/237, PCT/IB/373).
(Continued)

*Primary Examiner* — Marnie Matt
(74) *Attorney, Agent, or Firm* — Sughrue Mion, PLLC

(57) ABSTRACT

A video encoding method including determining a phase shift between pixels of an enhancement layer image and a reference layer image, according to a scaling factor between the enhancement layer image and the reference layer image and a color format of the enhancement layer; selecting at least one filter coefficient set corresponding to the phase shift, from filter coefficient data including filter coefficient sets; generating an up-sampled reference layer image by extending a resolution of the reference layer image accord-
(Continued)

ing to the scaling factor by performing interpolation filtering on the reference layer image by using the filter coefficient set; obtaining a prediction error between the up-sampled reference layer image and the enhancement layer image; generating an enhancement layer bitstream including the prediction error and a scalable codec; and generating a base layer bitstream by encoding the base layer images.

15 Claims, 33 Drawing Sheets

(51) Int. Cl.
| | |
|---|---|
| H04N 19/117 | (2014.01) |
| H04N 19/159 | (2014.01) |
| H04N 19/33 | (2014.01) |
| H04N 19/59 | (2014.01) |
| H04N 19/105 | (2014.01) |
| H04N 19/137 | (2014.01) |
| H04N 19/593 | (2014.01) |
| H04N 19/80 | (2014.01) |
| H04N 19/463 | (2014.01) |

(52) U.S. Cl.
CPC ......... *H04N 19/137* (2014.11); *H04N 19/159* (2014.11); *H04N 19/33* (2014.11); *H04N 19/44* (2014.11); *H04N 19/59* (2014.11); *H04N 19/593* (2014.11); *H04N 19/80* (2014.11); *H04N 19/463* (2014.11)

(58) Field of Classification Search
CPC ........ H04N 19/33; H04N 19/44; H04N 19/59; H04N 19/593; H04N 19/80; H04N 19/463
USPC ..................................................... 375/240.12
See application file for complete search history.

(56) References Cited

U.S. PATENT DOCUMENTS

| | | | | |
|---|---|---|---|---|
| 2006/0210185 | A1* | 9/2006 | Sun | H04N 19/176 382/240 |
| 2006/0222067 | A1* | 10/2006 | Park | H04N 19/105 375/240.08 |
| 2008/0267289 | A1 | 10/2008 | Yu et al. | |
| 2009/0010331 | A1* | 1/2009 | Jeon | H04N 19/105 375/240.12 |
| 2009/0231487 | A1* | 9/2009 | Nakagawa | H04N 9/642 348/453 |
| 2009/0310680 | A1* | 12/2009 | Jeon | H04N 19/105 375/240.16 |
| 2011/0080953 | A1* | 4/2011 | Francois | H04N 19/00896 375/240.16 |
| 2012/0213296 | A1 | 8/2012 | Sun | |
| 2012/0268558 | A1 | 10/2012 | Choi et al. | |
| 2013/0329782 | A1* | 12/2013 | Seregin | H04N 19/159 375/240.02 |
| 2014/0037015 | A1* | 2/2014 | Ye | H04N 19/46 375/240.26 |
| 2014/0044161 | A1* | 2/2014 | Chen | H04N 19/159 375/240.02 |
| 2014/0301463 | A1* | 10/2014 | Rusanovskyy | H04N 19/52 375/240.14 |
| 2014/0307773 | A1* | 10/2014 | Minoo | H04N 19/70 375/240.02 |
| 2014/0321560 | A1* | 10/2014 | Ugur | H04N 19/80 375/240.29 |
| 2015/0296211 | A1* | 10/2015 | Chuang | H04N 19/187 375/240.12 |

FOREIGN PATENT DOCUMENTS

| | | |
|---|---|---|
| KR | 10-2011-0031952 A | 3/2011 |
| KR | 10-2012-0118779 A | 10/2012 |

OTHER PUBLICATIONS

Chen, et al., "SHVC Working Draft 2", Joint Collaborative Team on Video Coding (JCT-VC) of ITU-T SG16 WP3 and ISO/IEC JTC1/SC29/WG11, 13th Meeting, Apr. 18, 2013-Apr. 26, 2013, Document: JCTVC-M1008_v3, 66 pages total, Incheon, KR.

Ugur, et al., "AHG14: On resampling & color gamut scalability", Joint Collaborative Team on Video Coding (JCT-VC) of ITU-T SG 16 WP 3 and ISO/IEC JTC 1/SC 29/WG 11, 14th Meeting, Jul. 25, 2013-Aug. 2, 2013, Document: JCTVC-N0146, 5 pages total, Vienna, AT.

Communication dated May 23, 2016, issued by the Korean Intellectual Property Office in counterpart Korean Patent Application No. 10-2015-7003378.

Alshina et. al., "AhG14: On bit-depth scalability support", Joint Collaborative Team on Video Coding (JCT-VC) of ITU-T SG 16 WP 3 and ISO/IEC JTC 1/SC 29/WG 11, JCTVC-N0218, Jul. 25-Aug. 2, 2013, p. 1-p. 3, 14th meeting, Samsung Electronics, Ltd., Vienna, AT.

Chen et al., "Non-SCE1: Dynamic range control of intermediate data in re-sampling process", JCT-VC of ITU-T and ISO/IE, JCTVC-N0214, 3 pages total, Version 1, Jul. 16, 2013, Qualcomm Inc.

Communication dated Feb. 20, 2017 issued by Korean Intellectual Property Office in counterpart Korean Application No. 10-2015-7003378.

* cited by examiner

4:2:2 COLOR FORMAT

4:4:4 COLOR FORMAT

FIG. 9

| PHASE SHIFT INDEX | TARGET PHASE SHIFT | UP-SAMPLING RATIO |
|---|---|---|
| 0 | 0 | All |
| 1 | 1/16 | x 16/15 |
| 2 | 1/8 | x 8/7 (x 7/6) |
| 3 | 1/5 | x 5/3 (x 6/5) |
| 4 | 1/4 | x 4/3 , x8/7 (x7/6) |
| 5 | 1/3 | x 3/2, x6/5, ... |
| 6 | 3/8 | x 8/7 |
| 7 | 2/5 | x 5/3 |
| 8 | 1/2 | x 2, x4/3, x6/5, x8/7, ... |
| 9 | 3/5 | x 5/3 |
| 10 | 5/8 | x 8/7 |
| 11 | 2/3 | x 3/2, x6/5 (x7/6) |
| 12 | 3/4 | x 4/3, x8/7 |
| 13 | 4/5 | x 5/3 (x 6/5) |
| 14 | 7/8 | x 8/7 (x 7/6) |
| 15 | 15/16 | x 16/15 |

FIG. 10A

| PHASE SHIFT | FILTER COEFFICIENT | | | | | | | |
|---|---|---|---|---|---|---|---|---|
| | $f_L[p,0]$ | $f_L[p,1]$ | $f_L[p,2]$ | $f_L[p,3]$ | $f_L[p,4]$ | $f_L[p,5]$ | $f_L[p,6]$ | $f_L[p,7]$ |
| 0 | 0 | 0 | 0 | 64 | 0 | 0 | 0 | 0 |
| 1 | 0 | 1 | -3 | 63 | 4 | -2 | 0 | 0 |
| 2* | -1 | 2 | -5 | 62 | 8 | -3 | 1 | 0 |
| 3 | 0 | 2 | -6 | 61 | 9 | -3 | 1 | 0 |
| 4 | -1 | 3 | -8 | 60 | 13 | -4 | 1 | 0 |
| 5 | -1 | 4 | -10 | 58 | 17 | -5 | 1 | 0 |
| 6* | -1 | 4 | -11 | 52 | 26 | -8 | 3 | -1 |
| 7* | -1 | 3 | -9 | 47 | 31 | -10 | 4 | -1 |
| 8 | -1 | 4 | -11 | 50 | 28 | -8 | 2 | 0 |

$f_L[16-p, k] = f_L[p, 7-k]$ ($0 \leq k \leq 7$, $0 \leq p \leq 16$)

Note: rows continue with values for additional phase shifts:

| | -1 | 4 | -11 | 50 | 29 | -9 | 3 | -1 |
| | -1 | 4 | -11 | 44 | 35 | -10 | 4 | -1 |
| | -1 | 4 | -11 | 45 | 34 | -10 | 4 | -1 |
| | -1 | 4 | -11 | 40 | 40 | -11 | 4 | -1 |

FIG. 10B

| PHASE SHIFT | FILTER COEFFICIENT | | | |
|---|---|---|---|---|
| | $f_c[p, 0]$ | $f_c[p, 1]$ | $f_c[p, 2]$ | $f_c[p, 3]$ |
| 0 | 0 | 64 | 0 | 0 |
| 1 | -2 | 62 | 4 | 0 |
| 2 | -2 | 58 | 10 | -2 |
| 3 | -4 | 56 | 14 | -2 |
| 4 | -4 | 54 | 16 | -2 |
| 5 | -6 | 52 | 20 | -2 |
| 6 | -6 | 46 | 28 | -4 |
| 7 | -4 | 42 | 30 | -4 |
| 8 | -4 | 36 | 36 | -4 |

$f_c[16-p, k] = f_c[p, 3-k]$ ($0 \leq k \leq 3$, $0 \leq p \leq 16$)

FIG. 10C

| PHASE SHIFT | FILTER COEFFICIENT | | | | | | | |
|---|---|---|---|---|---|---|---|---|
| | $f_L[p,0]$ | $f_L[p,1]$ | $f_L[p,2]$ | $f_L[p,3]$ | $f_L[p,4]$ | $f_L[p,5]$ | $f_L[p,6]$ | $f_L[p,7]$ |
| 0 | 0 | 0 | 0 | 64 | 0 | 0 | 0 | 0 |
| 1 | -1 | 2 | -5 | 62 | 8 | -3 | 1 | 0 |
| 2 | 0 | 2 | -6 | 61 | 9 | -3 | 1 | 0 |
| 3 | -1 | 4 | -10 | 58 | 17 | -5 | 1 | 0 |
| | -1 | 4 | -11 | 52 | 26 | -8 | 3 | -1 |
| 4 | -1 | 4 | -11 | 40 | 40 | -11 | 4 | -1 |

$f_L[8-p, k] = f_L[p, 7-k]$ ($0 \leq k \leq 7$, $0 \leq p \leq 8$)

| PHASE SHIFT | FILTER COEFFICIENT | | | |
|---|---|---|---|---|
| | $f_c[p, 0]$ | $f_c[p, 1]$ | $f_c[p, 2]$ | $f_c[p, 3]$ |
| 0 | 0 | 64 | 0 | 0 |
| 1 | −2 | 58 | 10 | −2 |
| 2 | −4 | 54 | 16 | −2 |
| 3 | −6 | 46 | 28 | −4 |
| 4 | −4 | 36 | 36 | −4 |

$f_c[8-p, k] = f_c[p, 3-k]$  ($0 \leq k \leq 3$, $0 \leq p \leq 8$)

CODING UNIT (1910)　　TRANSFORMATION UNIT (1920)

PARTITION TYPE (2000)

PREDICTION MODE (2010)

SIZE OF TRANSFORMATION UNIT(820)

CODING UNIT (2210)

PREDICTION UNIT (2260)

SCALABLE VIDEO ENCODING METHOD AND APPARATUS AND SCALABLE VIDEO DECODING METHOD AND APPARATUS USING UP-SAMPLING FILTER ACCOMPANIED BY CONVERSION OF BIT DEPTH AND COLOR FORMAT

TECHNICAL FIELD

The present invention relates to video encoding and decoding methods and apparatuses using image up-sampling.

BACKGROUND ART

Conventional image encoding and decoding methods split one picture into macroblocks to encode an image. Thereafter, inter prediction or intra prediction is used to prediction encode each of the macroblocks.

Inter prediction is a method of compressing an image by removing a temporal redundancy between pictures and has motion estimation encoding as a representative example. Motion estimation encoding predicts each block of a current picture by using at least one reference picture. A predetermined evaluation function is used to search for a reference block that is most similar to a current block within a predetermined search range.

The current block is predicted based on the reference block, and a residual block generated by subtracting a prediction block generated as a result of prediction from the current block is encoded. In this regard, to further accurately perform prediction, interpolation is performed on the search range of the reference picture, sub-pixels of a pixel unit that is smaller than an integer pet unit are generated, and inter prediction is performed based on the generated sub-pixels.

DETAILED DESCRIPTION OF THE INVENTION

Technical Problem

The present invention provides a method of determining an up-sampling filter so as to accurately interpolate a sample value for each sampling position according to an up-sampling ratio. The present invention also provides a scalable video encoding method and a scalable video decoding method of performing interlayer prediction by generating a high resolution prediction image from a low resolution image by using an accurate up-sampling filter selected according to a scalability ratio. The present invention also provides a scalable video encoding method and a scalable video decoding method of converting a color format by making a scalability ratio of a luma pixel different from a scalability ratio of a chroma pixel. The present invention also provides a scalable video encoding method and a scalable video decoding method of performing conversion by magnifying a bit depth when up-sampling is performed by using inter-based calculation.

Technical Solution

According to various embodiments, there is provided a scalable video encoding method including determining a reference layer image from among base layer images so as to inter layer predict an enhancement layer image, wherein the reference layer image corresponds to the enhancement layer image; determining a phase shift between pixels of the enhancement layer image and the reference layer image, according to a scaling factor between the enhancement layer image and the reference layer image and a color format of the enhancement layer; selecting at least one filter coefficient set corresponding to the determined phase shift, from filter coefficient data including filter coefficient sets that respectively correspond to phase shifts; generating an up-sampled reference layer image by extending a resolution of the reference layer image according to the scaling factor by performing interpolation filtering on the reference layer image by using the selected filter coefficient set; obtaining a prediction error between the up-sampled reference layer image and the enhancement layer image; generating an enhancement layer bitstream including the prediction error and a scalable codec that performs the interpolation filtering; and generating a base layer bitstream by encoding the base layer images.

According to various embodiments, the generating of the up-sampled reference layer image may include converting a bit depth of the reference layer image so that the up-sampled reference layer image corresponds to a bit depth of the enhancement layer image.

According to various embodiments, the converting of the bit depth includes converting the bit depth so that the bit depth of the reference layer image becomes greater than 8 bits.

According to various embodiments, the determining of the phase shift between the pixels may include determining a phase shift between a luma pixel of the reference layer image and a luma pixel of the enhancement layer image according to the scaling factor; and determining a phase shift between a chroma pixel of the reference layer image and a chroma pixel of the enhancement layer image according to the scaling factor and the color format of the enhancement layer.

According to various embodiments, the determining of the phase shift between the chroma pixels may include determining a chroma pixel ratio according to the scaling factor and the color format of the enhancement layer; and determining the phase shift between the chroma pixel of the reference layer image and the chroma pixel of the enhancement layer image according to the chroma pixel ratio.

According to various embodiments, in the color format of the enhancement layer, a ratio of a luma pixel to two chroma pixels may be 4:2:2 or 4:4:4.

According to various embodiments, the video encoding method may further include determining, from the reference layer image, positions of samples used in the interpolation filtering.

According to various embodiments, the video encoding method may further include, when a resolution of the up-sampled reference layer image and a resolution of the enhancement layer image are not identical, determining an offset component of the enhancement layer image by obtaining a point of the enhancement layer image which corresponds to an original point of the up-sampled reference layer image, and the determining of the prediction error includes determining the prediction error by comparing the enhancement layer image from which the offset component is removed with the up-sampled reference layer image.

According to various embodiments, there is provided a scalable video decoding method including determining a reference layer image from among base layer images obtained by decoding a base layer bitstream including encoded base layer images, wherein the reference layer image corresponds to an enhancement layer image; decoding an enhancement layer bitstream including a scalable codec that performs interpolation filtering based on a scaling factor between the enhancement layer image and the reference layer image and a color format of the enhancement layer and including a prediction error for inter layer prediction of the enhancement layer image, and obtaining the prediction error and the scalable codec; determining a phase shift between pixels of the enhancement layer image and the reference layer image based on the scaling factor and the color format of the enhancement layer; selecting at least one filter coefficient set corresponding to the determined phase shift, from filter coefficient data including filter coefficient sets that respectively correspond to phase shifts; generating an up-sampled reference layer image by extending a resolution of the reference layer image according to the scaling factor by performing, using the scalable codec, the interpolation filtering on the reference layer image according to the selected filter coefficient set; and reconstructing the enhancement layer image by using the prediction error and the up-sampled reference layer image.

According to various embodiments, the generating of the up-sampled reference layer image may include converting a bit depth of the reference layer image so that the up-sampled reference layer image corresponds to a bit depth of the enhancement layer image.

According to various embodiments, the converting of the bit depth includes converting the bit depth so that the bit depth of the reference layer image becomes greater than 8 bits.

According to various embodiments, the determining of the phase shift between the pixels may include determining a phase shift between a luma pixel of the reference layer image and a luma pixel of the enhancement layer image according to the scaling factor; and determining a phase shift between a chroma pixel of the reference layer image and a chroma pixel of the enhancement layer image according to the scaling factor and the color format of the enhancement layer.

According to various embodiments, the determining of the phase shift between the chroma pixels may include determining a chroma pixel ratio according to the scaling factor and the color format of the enhancement layer; and determining the phase shift between the chroma pixel of the reference layer image and the chroma pixel of the enhancement layer image according to the chroma pixel ratio.

According to various embodiments, the converting of the color format may include converting the color format of the enhancement layer image, so that a ratio of a luma pixel to two chroma pixels is 4:2:2 or 4:4:4.

According to various embodiments, the video decoding method may further include determining, from the reference layer image, positions of samples used in the interpolation filtering.

According to various embodiments, the video decoding method may further include, when a resolution of the up-sampled reference layer image and a resolution of the enhancement layer image are not identical, determining an offset component of the enhancement layer image by obtaining a point of the enhancement layer image which corresponds to an original point of the up-sampled reference layer image, and the reconstructing of the enhancement layer image may include reconstructing other parts of the enhancement layer image excluding the offset component by using the up-sampled reference layer image and the prediction error.

According to various embodiments, there is provided a scalable video encoding apparatus including a filter data storage unit configured to store filter coefficient sets that respectively correspond to phase shifts; a filter selector configured to determine a phase shift between a pixel of a reference layer image and a pixel of an enhancement layer image, based on a scaling factor between the reference layer image selected from a base layer and the enhancement layer image corresponding to the reference layer image, and a color format of the enhancement layer, and to select, from data of the filter coefficient sets, a filter coefficient set corresponding to the determined phase shift; an up-sampling unit configured to perform interpolation filtering on the reference layer image by using the selected filter coefficient set; a prediction error obtainer configured to obtain a prediction error between the up-sampled reference layer image and the enhancement layer image; a base layer encoder configured to generate a base layer bitstream by performing encoding on the base layer image; and an enhancement layer encoder configured to generate an enhancement layer bitstream including the prediction error and a scalable codec that performs the interpolation filtering.

According to various embodiments, there is provided a scalable video decoding apparatus including a filter data storage unit configured to store filter coefficient sets that respectively correspond to phase shifts; an enhancement layer decoder configured to obtain, from an enhancement layer bitstream, a prediction error between an up-sampled reference layer image and an enhancement layer image and a scalable codec that performs interpolation filtering based on a scaling factor between the enhancement layer image and a reference layer image and a color format of the enhancement layer; a base layer bitstream decoder configured to generate a base layer image from a base layer bitstream; a filter selector configured to select, from among filter coefficient sets stored in the filter data storage unit, a filter coefficient set corresponding to a phase shift determined by the scalable codec; an up-sampling unit configured to obtain the up-sampled reference layer image by performing the interpolation filtering on the reference layer image according to the selected filter coefficient set; and an enhancement layer obtainer configured to obtain the enhancement layer image by using the prediction error and the up-sampled reference layer image.

According to various embodiments, there is provided a computer-readable recording medium having recorded thereon a program for executing the video encoding method.

According to various embodiments, there is provided a computer-readable recording medium having recorded thereon a program for executing the video decoding method.

Advantageous Effects

The present invention improves video encoding and decoding efficiency.

BRIEF DESCRIPTION OF THE DRAWINGS

FIG. 9 illustrates s a table of up-sampling ratios corresponding to a phase shift interval of a 1/16 unit according to various embodiments.

FIGS. 10A through 10D illustrate filter coefficients used in an up-sampling filter according to phase shifts of interpolated pixels.

FIG. 11 illustrates an offset between an up-sampled reference layer image and an enhancement layer image.

BEST MODE

Provided is a video encoding method including determining a reference layer image from among base layer images so as to inter layer predict an enhancement layer image, wherein the reference layer image corresponds to the enhancement layer image; determining a phase shift between pixels of the enhancement layer image and the reference layer image, according to a scaling factor between the enhancement layer image and the reference layer image and a color format of the enhancement layer; selecting at least one filter coefficient set corresponding to the determined phase shift, from filter coefficient data including filter coefficient sets that respectively correspond to phase shifts; generating an up-sampled reference layer image by extending a resolution of the reference layer image according to the scaling factor by performing interpolation filtering on the reference layer image by using the selected filter coefficient set; obtaining a prediction error between the up-sampled reference layer image and the enhancement layer image; generating an enhancement layer bitstream including the prediction error and a scalable codec that performs the interpolation filtering; and generating a base layer bitstream by encoding the base layer images.

Mode of the Invention

Hereinafter, in various embodiments described in the present specification, the term 'image' may collectively refer to not only a still image but also refer to a moving picture such as a video.

Hereinafter, with reference to FIGS. 1 through 11, up-sampling with respect to an image by using an up-sampling filter, by taking into account a phase shift, according to various embodiments will be described in detail. Also, with reference to FIGS. 11A through 14, scalable video encoding and decoding using an up-sampling filter according to various embodiments will be described, and with reference to FIGS. 14 through 24, video encoding and decoding that are to be performed on each layer in a scalable video system based on a coding unit having a tree structure will be described.

Hereinafter, with reference to FIGS. 1 through 11, up-sampling with respect to an image by using an up-sampling filter, by taking into account a phase shift, according to various embodiments will now be described in detail.

Figure 1:
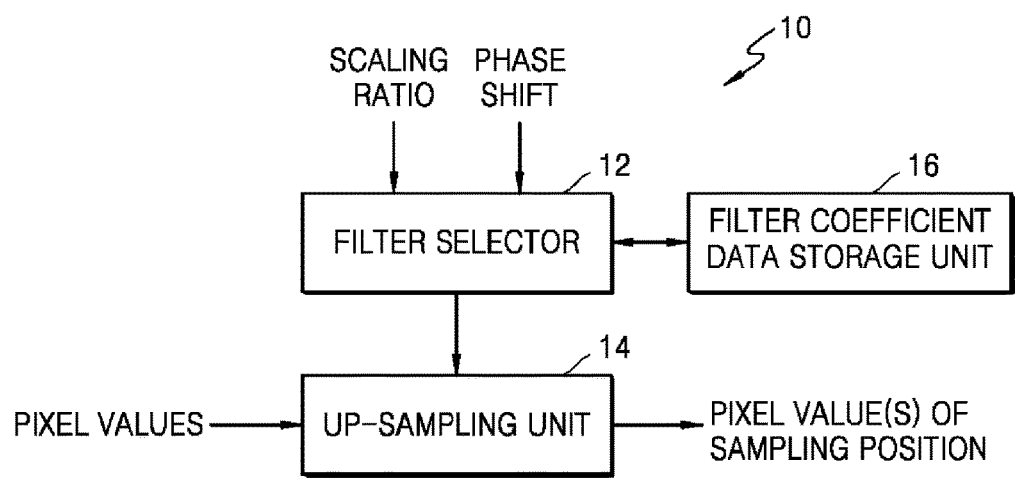
FIG. 1 illustrates a block diagram of an image up-sampling apparatus according to various embodiments.

FIG. 1 illustrates a block diagram of an image up-sampling apparatus 10 according to various embodiments.

The image up-sampling apparatus 10 using symmetrical and asymmetrical up-sampling filters according to various embodiments includes a filter selector 12, an up-sampling unit 14, and a filter data storage unit 16.

Interpolation with respect to an image may be used so as to convert a low resolution image into a high resolution image. Interpolation with respect to the image is used so as to convert an interlaced image into a progressive image and convert a low quality image into a high quality image by up-sampling the low quality image.

When a video encoding apparatus encodes an image, a motion estimation and motion compensation unit may perform inter prediction by using an interpolated reference frame. The motion estimation and motion compensation unit may increase the accuracy of inter prediction by interpolating a reference frame, generating a high quality image, and performing motion estimation and compensation based on the high quality image. Likewise, when an image decoding apparatus decodes the image, a motion compensation unit may increase the accuracy of inter prediction by performing motion compensation by using the interpolated reference frame.

A scalable encoding apparatus may use an image up-sampled by interpolating a base layer image as a prediction image or a reference image of an enhancement layer so as to perform inter-layer prediction between a base layer and the enhancement layer.

The image up-sampling apparatus 10 according to various embodiments may receive a low resolution image, interpolate pel unit pixels of the low resolution image, and generate sub-pel unit pixels. The received image may be a picture sequence, a picture, a frame, and blocks of a low resolution video. The sub-pel unit of the low resolution image may correspond to a pel unit of a high resolution image.

For example, when a scaling factor of the low resolution image and the high resolution image is defined as a width of the high resolution image with respect to a width of the low resolution image, if the scaling factor of the low resolution image and the high resolution image is 1:2, a ½ pel unit pixel positioned between pel unit pixels of the low resolution image may correspond to pel unit pixels of the high resolution image.

Therefore, a sub-pel unit pixel generated by interpolating the pel unit pixels of the low resolution image may correspond to the pel unit pixel of the high resolution image.

The image up-sampling apparatus 10 according to various embodiments may generate the high resolution image by performing up-sampling on the low resolution image through filtering. In particular, sub-pel unit pixels may be generated through interpolation filtering of the low resolution image, and intervals between original pel unit pixels of the low resolution image and the sub-pel unit pixels generated through interpolation filtering may be extended to the pel unit. Accordingly, the original pel unit pixels of the low resolution image and the sub-pel unit pixels may be determined to correspond to positions of the pel unit pixels of the high resolution image. Thus, the pel unit pixels of the high resolution image may be determined through interpolation filtering of the low resolution image, and an interpolation filtering operation may be understood as a filtering operation for up-sampling in the present specification.

The sub-pel unit pixel is newly sampled through interpolation filtering, and thus, a sub-pel unit pixel position determined through interpolation filtering may be a sampling position generated through up-sampling.

The sampling position may be different according to a scaling factor of the high resolution image that is to be generated through up-sampling of the low resolution image. For example, when the scaling factor of the low resolution image and the high resolution image is 1:2, one sampling position may be determined in a pixel position of ½ between two neighboring pixels of the low resolution image so that three pixels may be mapped at an equal interval. As another example, when the scaling factor of the low resolution image and the high resolution image is 2:3, four pixels may be mapped at an equal interval for each of ⅓ and ⅔ pel units between three neighboring pixels of the low resolution image.

A phase shift may be present between a pel unit pixel position of the low resolution image and a pixel position (sampling position) of the high resolution image. The pel unit pixel position of the low resolution image is fixed, and thus, if the sampling position is determined according to the scaling factor of the low resolution image and the high resolution image, the phase shift between the pel unit pixel and a pixel of the high resolution image may be determined.

Thus, the phase shift between a pixel of the low resolution image and the pixel of the high resolution image may be determined according to the scaling factor of the low resolution image and the high resolution image. That is, if the scaling factor between the low resolution image and the high resolution image is different, the phase shift may also be changed.

A filter coefficient set is determined according to the sampling position, and thus, the filter coefficient set may be determined according to the phase shift. Accordingly, the filter data storage unit 16 may store filter coefficient sets mapped for phase shifts between pixels of the low resolution image and pixels of the high resolution image. For example, the filter data storage unit 16 may store the filter coefficient sets individually set for each of phase shifts of 1/16, ⅛, ⅕, ¼, ⅓, ⅜, ⅖, and ½.

The filter selector 12 according to various embodiments may determine the phase shift between the pixel of the low resolution image and the pixel of the high resolution image based on the scaling factor between the low resolution image and the high resolution image. However, at least one sampling position for one ratio is determined, and thus, at least one phase shift may be mapped for one scaling factor. Thus, although the low resolution image is up-sampled to the high resolution image according to one scaling factor, up-sampling filtering may be performed by selecting different filters for phase shifts. Therefore, the filter selector 12 may select different up-sampling filters based on phase shifts among up-sampling filters for generating a pixel value of the sampling position positioned between the pel unit pixels of the low resolution image.

As described above, the sampling position may be determined according to the scaling factor of the low resolution image and the high resolution image. An output value obtained by performing filtering on the low resolution image by using the up-sampling filter may be determined as a pixel value corresponding to the sampling position.

The up-sampling unit 14 according to various embodiments may generate the pixel value of the sampling position by interpolating pel unit pixels neighboring the sampling position by using the up-sampling filter selected by the filter selector 12. Up-sampling filtering with respect to the pel unit pixels may include an operation of performing up-sampling filtering on pel unit reference pixels including the pel unit pixels neighboring the sampling position.

The up-sampling filter according to various embodiments may be a one-dimensional filter. Thus, filtering may be performed on pel unit pixels neighboring the low resolution image in a horizontal direction by using the selected up-sampling filter, and thus, up-sampling in the horizontal direction may be performed. Filtering may be performed on pel unit pixels neighboring the low resolution image in a vertical direction by using the selected up-sampling filter, and thus, up-sampling in the vertical direction may be performed. Thus, up-sampling filtering is continuously performed on the low resolution image in the horizontal direction and in the vertical direction, and thus, pixel values of the high resolution image may be determined.

The filter selector 12 according to various embodiments may individually determine an up-sampling filter according to the sampling position among the up-sampling filters. The up-sampling filters according to various embodiments may include a symmetrical up-sampling filter configured as a same number of filter coefficients and an asymmetrical up-sampling filter configured as different numbers of filter coefficients with respect to the sampling position. The filter selector 12 may individually select the symmetrical up-sampling filter and the asymmetrical up-sampling filter according to the sampling position.

For example, a 7-tap up-sampling filter may be configured as three filter coefficients and four filter coefficients with respect to the sampling position. In this case, the 7-tap up-sampling filter may be regarded as the asymmetrical up-sampling filter.

For example, an 8-tap up-sampling filter may be configured as four filter coefficients and four filter coefficients with respect to the sampling position. In this case, the 8-tap up-sampling filter may be regarded as the symmetrical up-sampling filter.

When the filter selector 12 selects the asymmetrical up-sampling filter, the up-sampling unit 14 may perform filtering by referring to pel unit pixels positioned asymmetrically about the sampling position. When the symmetrical up-sampling filter is selected, the up-sampling unit 14 may perform filtering by referring to pel unit pixels positioned symmetrically about the sampling position.

The filter data storage unit 16 according to various embodiments may store a filter coefficient set of an up-sampling filter that is normalized to minimize a frequency response error that occurs as a result of interpolation using the up-sampling filter among the up-sampling filters. For example, up-sampling having a ratio of 2:3 is necessary to up-sample a low resolution video having resolution of 720p to a high resolution video having resolution of 1080p or up-sample a high definition (HD) video to a full HD video. The filter data storage unit 16 may store 8-tap filter coefficients $\{-1, 4, -11, 52, 26, -8, 3, -1\}$ for a phase shift of $\frac{1}{3}$ or $\frac{2}{3}$ as a filter coefficient set for the ratio of 2:3.

The filter data storage unit 16 according to various embodiments may store filter coefficients when the filter coefficients are magnified to integers. For example, the 8-tap filter coefficients $\{-1, 4, -11, 52, 26, -8, 3, -1\}$ for the phase shift of $\frac{1}{3}$ or $\frac{2}{3}$ described above are filter coefficients that are magnified by 64. In this case, the up-sampling unit 14 may determine the pixel value of the sampling position only by decreasing a filtering output value by 64.

The filter data storage unit 16 according to various embodiments may include filter coefficient sets corresponding to phase shifts according to a phase shift interval of $\frac{1}{16}$. The up-sampling unit 14 may select a filter coefficient set corresponding to a phase shift of 5/16 among filter coefficient data stored in the filter data storage unit 16, for up-sampling for the sampling position having the phase shift of $\frac{1}{3}$ when the ratio is 2:3. The up-sampling unit 14 may select a filter coefficient set corresponding to a phase shift of $\frac{11}{16}$ among the filter coefficient data stored in the filter data storage unit 16, for up-sampling for the sampling position having the phase shift of $\frac{2}{3}0$ when the ratio is 2:3.

As another example, the filter data storage unit 16 may include filter coefficient sets corresponding to phase shifts according to a phase shift interval of $\frac{1}{8}$. The up-sampling unit 14 may select a filter coefficient set corresponding to a phase shift of $\frac{3}{8}$ among the filter coefficient data stored in the filter data storage unit 16, for up-sampling for the sampling position having the phase shift of $\frac{1}{3}$ when the ratio is 2:3. The up-sampling unit 14 may select a filter coefficient set corresponding to a phase shift of $\frac{5}{8}$ among the filter coefficient data stored in the filter data storage unit 16, for up-sampling for the sampling position having the phase shift of $\frac{2}{3}$ when the ratio is 2:3.

The image up-sampling apparatus 10 may perform image interpolation by using different up-sampling filters for each color component. The filter selector 12 may select different up-sampling filters based on the sampling position and a color component of a current pixel among the up-sampling filters. Accordingly, the up-sampling unit 14 may generate pixel values of sampling positions by interpolating pel unit pixels by using the up-sampling filter individually selected for each color component.

For example, the filter selector 12 may differently determine an up-sampling filter of a luma component and an up-sampling filter of a chroma component. A phase shift between a luma pixel of the low resolution image and a luma pixel of the high resolution image may be different than a phase shift between a chroma pixel of the low resolution image and a chroma pixel of the high resolution image. Thus, the up-sampling filter of the luma component and the up-sampling filter of the chroma component may be individually determined according to their phase shifts.

For example, positions of the luma pixel and the chroma pixel may be determined based on a color format such as 4:2:0 or 4:1:1. In particular, the position of the chroma pixel may be determined according to the position of the luma pixel. Thus, positions of luma pixels of the high resolution image may be determined according to the scaling factor between the low resolution image and the high resolution image, whereas positions of chroma pixels of the high resolution image may be determined according to the positions of the luma pixels of the high resolution image. Thus, a phase shift between the chroma pixel of the low resolution image and the chroma pixel of the high resolution image may be different from a phase shift between the luma pixel of the low resolution image and the luma pixel of the high resolution image.

Therefore, the filter selector 12 may first determine the phase shift between the luma pixel of the low resolution image and the luma pixel of the high resolution image based on the scaling factor between the low resolution image and the high resolution image. Then, the filter selector 12 may determine the position of the chroma pixel of the high resolution image compared to the positions of the luma pixels of the high resolution image and determine the phase shift of the chroma pixel of the low resolution image and the chroma pixel of the high resolution image.

In addition, the filter selector 12 may determine the position of the chroma pixel of the high resolution image compared to the positions of the luma pixels of the high resolution image by taking into account a color format conversion. For example, when a color format of the low resolution image is 4:2:0, and a color format of the high resolution image is 4:2:2, an up-sampling ratio in a vertical direction with respect to the chroma pixels may be two times greater than an up-sampling ratio in a vertical direction with respect to the luma pixels. As another example, when the color format of the low resolution image is 4:2:0, and the color format of the high resolution image is 4:4:4, the up-sampling ratio in the vertical direction with respect to the chroma pixels and an up-sampling ratio in a horizontal direction with respect to the chroma pixels may be two times greater than the up-sampling ratio in the vertical direction with respect to the luma pixels and an up-sampling ratio in a horizontal direction with respect to the luma pixels, respectively. The color format conversion will be described in detail with reference to FIGS. 5A through 8.

Accordingly, the filter selector 12 may individually determine a phase shift for the luma pixel and a phase shift for the chroma pixel, thereby individually determining the up-sampling filter for the luma pixel and the up-sampling filter for the chroma pixel according to their phase shifts.

The image up-sampling apparatus 10 according to various embodiments may include a central processor (not shown) generally controlling the filter selector 12, the up-sampling unit 14, and the filter data storage unit 16. Alternatively, the filter selector 12, the up-sampling unit 14, and the filter data storage unit 16 operate by their respective processors (not shown) that organically operate, and thus, the image up-sampling apparatus 10 may generally operate. Alternatively, the filter selector 12, the up-sampling unit 14, and the filter data storage unit 16 may be controlled according to the control of an external processor (not shown) of the image up-sampling apparatus 10 according to various embodiments.

The image up-sampling apparatus 10 according to various embodiments may include one or more data storage units (not shown) that store input and output data of the filter selector 12, the up-sampling unit 14, and the filter data storage unit 16. The image up-sampling apparatus 10 may include a memory control unit (not shown) that controls data input and output of the one or more data storage units (not shown).

The image up-sampling apparatus 10 according to various embodiments may include a separate processor including a circuit performing an image up-sampling operation. The image up-sampling apparatus 10 may include a storage medium storing an image interpolation module. The central processor may call and drive the image interpolation module and thus the image up-sampling operation according to various embodiments may be implemented.

If a phase shift corresponding to the sampling position according to a current up-sampling ratio is specified, and filter coefficients for determining a sample value of a sampling position positioned at a corresponding phase shift are accurately determined, a sample value of an accurate sampling position may be accurately determined through filtering using the filter coefficients.

The image up-sampling apparatus 10 according to various embodiments may previously store the filter data regarding the filter coefficient sets used to determine an accurate sample value for phase shifts necessary for an up-sampling ratio between the low resolution image and the high resolution image. The image up-sampling apparatus 10 may specify a phase shift based on a scaling factor between a current low resolution image and a current high resolution image when up-sampling is performed and may selectively use an up-sampling filter corresponding to the specified phase shift among the filter data.

The image up-sampling apparatus 10 may store only a filter coefficient set for the up-sampling filter corresponding to the specific phase shift according to a frequently used up-sampling ratio, thereby efficiently performing up-sampling filtering. If p is a positive integer, and a phase shift interval is $2^{(-p)}$, each phase shift may be $i*2^{(-p)}$ (where i is an integer smaller than $2^p$). Only filter coefficient sets for the phase shift interval $i*2^{(-p)}$ according to the frequently used up-sampling ratio may be used to select a phase shift that is an approximate value and perform up-sampling filtering in each sampling unit.

Hereinafter, with reference to FIGS. 2 through 4B, interpolation filtering for image up-sampling will now be described in detail.

Figure 2:
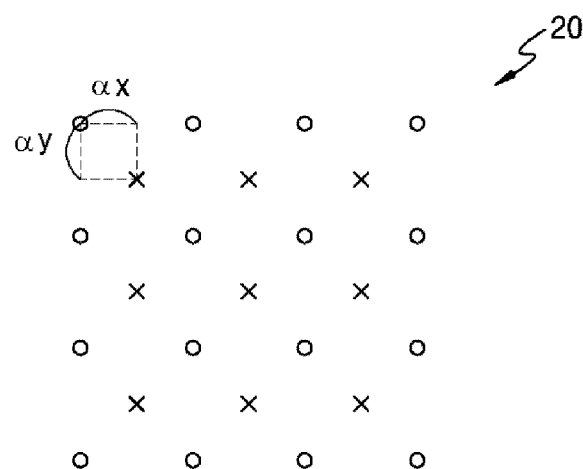
FIG. 2 illustrates sampling positions of pixels.

FIG. 2 illustrates sampling positions of pixels.

Referring to FIG. 2, the image up-sampling apparatus 10 generates pixel values of a position "X" that is a sampling position by interpolating pixel values of a position "O" of a predetermined block 20, i.e., pel unit pixel values of a spatial domain. The pixel values of the position "X" are sub-pel unit pixel values that have sampling locations that are determined according to $\alpha_x$ and $\alpha_y$. A case where the predetermined block 20 is 4×4 is described by way of example in FIG. 2 but a size of a block is not limited to 4×4. It will be understood by one of ordinary skill in the art that the sub-pel unit pixel values may be generated through up-sampling filtering on a bigger or smaller size of a block.

In a video processing field, a motion vector is used for motion compensation and prediction of a current image. According to prediction encoding, a previously encoded image is referred to so as to predict the current image. The motion vector indicates a predetermined point of a reference image. Thus, the motion vector indicates a pel unit pixel of the reference image.

However, a position of a pixel that is to be referred to by the current image may be a point positioned between pel unit pixels of the reference image. Such a point is referred to as a position of a sub-pel unit. No pixel is present in the position of the sub-pel unit, and thus a pixel value of the sub-pel unit may be merely predicted by using pixel values of the pel unit pixels. That is, the pixel value of the sub-pel unit is estimated through interpolation on the pel unit pixels.

When up-sampling is performed through interpolation filtering, the pel unit and the sub-pel unit may be sampling positions.

Hereinafter, with reference to FIGS. 3, 4A, 4B, and 4C, a method of interpolating pixels of a pel unit will now be described in detail.

Figure 3:
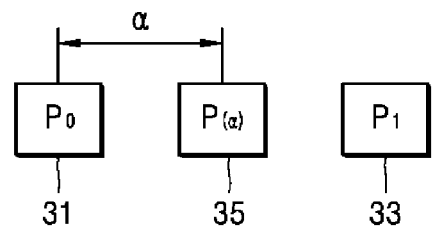
FIG. 3 illustrates a phase shift of an original pixel and a sampling position.

FIG. 3 illustrates a phase shift of an original pixel and a sampling position.

Referring to FIG. 3, the image up-sampling apparatus 10 generates a pixel value 35 of the sampling position by interpolating pixel values 31 and 33 of a pel unit of a low resolution image in a spatial domain. The pixel value 35 is a value of the sampling position determined according to a phase shift $\alpha$.

If up-sampling is performed through interpolation on the low resolution image, a generated sampling position may be a pel unit pixel of a high resolution image, and a pixel value of the sampling position may be a pixel value of the high resolution image.

Figure 4A:
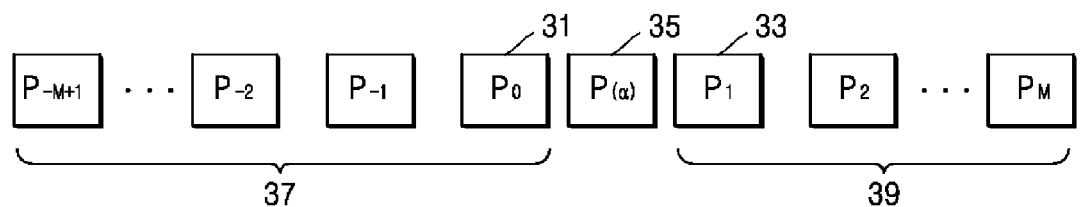
FIGS. 4A and 4B illustrate positions of reference pixels for up-sampling filtering.
Figure 4B:
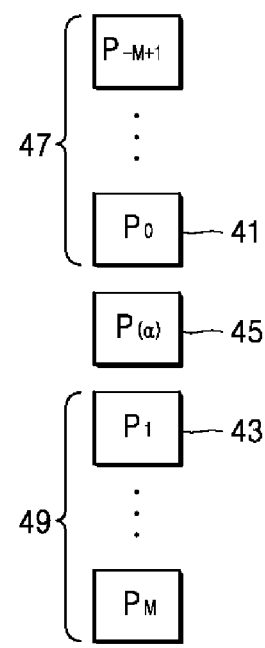

FIGS. 4A and 4B illustrate positions of reference pixels for up-sampling filtering.

Referring to FIG. 4A, to generate the pixel value 35 of the sampling position by performing interpolation between the pixel values 31 and 33 of a low resolution image, pixel values 37 and 39 of a plurality of neighboring pel unit pixels including the pixel values 31 and 33 are used. In other words, a space between a $0^{th}$ pixel and a $1^{st}$ pixel may be interpolated by performing 1D up-sampling filtering on 2M pixel values from −(M−1)th pixel values to Mth pixel values.

FIG. 4A illustrates a case where pixel values in a horizontal direction are interpolated but 1D up-sampling filtering is possible by using pixel values in a vertical direction.

Referring to FIG. 4B, a pixel value P(a) of a sampling position a in the vertical direction may be generated by performing interpolation between $P_0$ 41 and $P_1$ 43 neighboring in the vertical direction. Upon comparing FIGS. 4A and 4B, an up-sampling filtering method may be similar only except that pixel values 47 and 49 arranged in the vertical direction are used to perform interpolation rather than the pixel values 37 and 39 arranged in a horizontal direction.

Not only 1D up-sampling filtering in the direction shown in FIGS. 4A and 4B but also pixel values of sampling positions in more various directions may be generated.

Hereinafter, with reference to FIGS. 5 through 7, a sampling position and a phase shift for up-sampling will now be described.

FIGS. 5A through 5D illustrate distributions of luma pixels and chroma pixels in 4:2:0, 4:2:2, and 4:4:4 color formats.

Figure 5A:
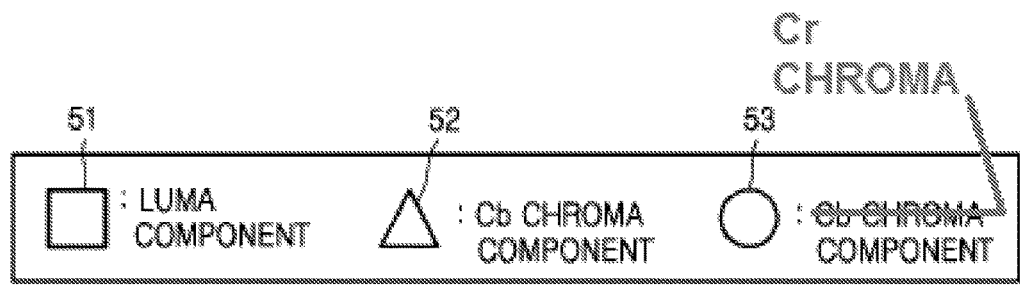
FIGS. 5A through 5D illustrate distributions of luma pixels and chroma pixels in 4:2:0, 4:2:2, and 4:4:4 color formats.

FIG. 5A illustrates each of pixels in a YCbCr color space that is geometrically shown.

The YCbCr color space consists of a Y luma pixel (hereinafter, the luma pixel), and Cb and Cr chroma pixels. Referring to FIG. 5A, a Y luma pixel 51 is illustrated as a square, a Cb chroma pixel 52 is illustrated as a triangle, and a Cr chroma pixel 53 is illustrated as a circle.

By using three figures indicating YCbCr, 4:2:0, 4:2:2, and 4:4:4 color formats will be described with reference to FIGS. 5B through 5D.

Figure 5B:
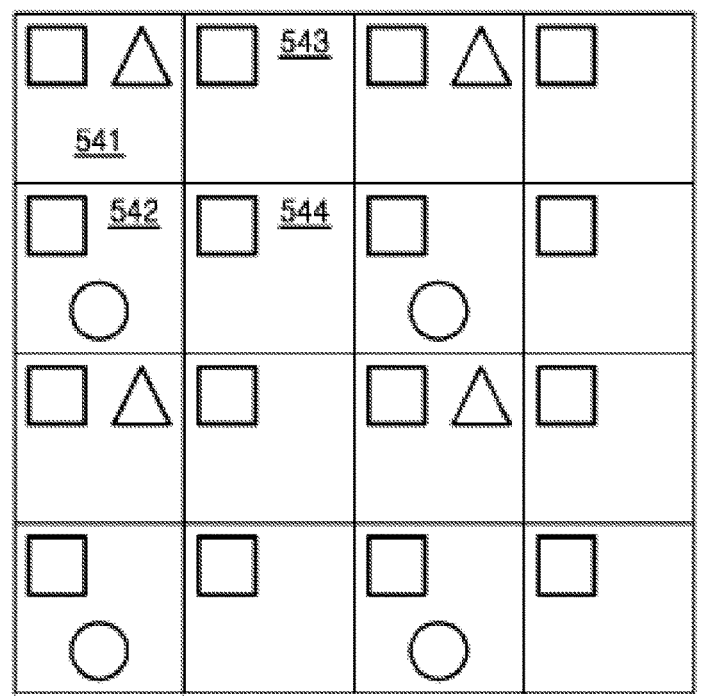
Figure 5C:
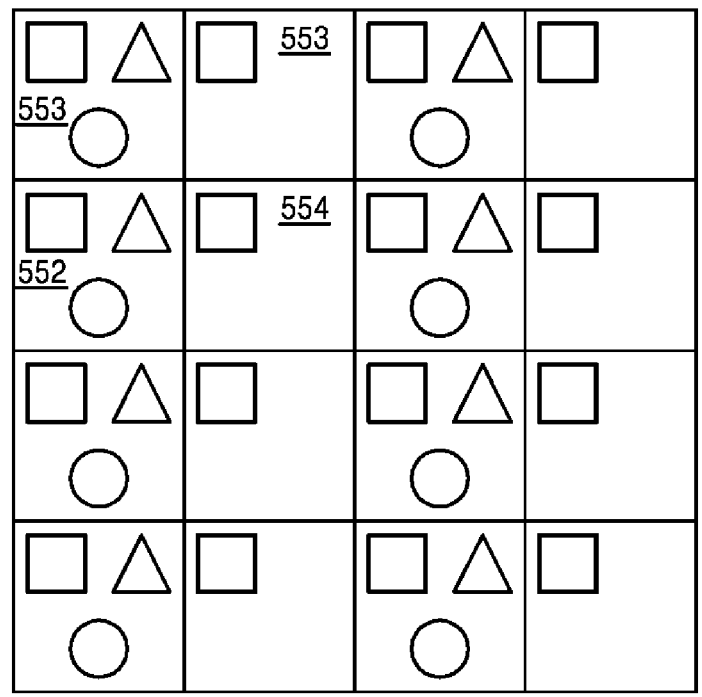
Figure 5D:
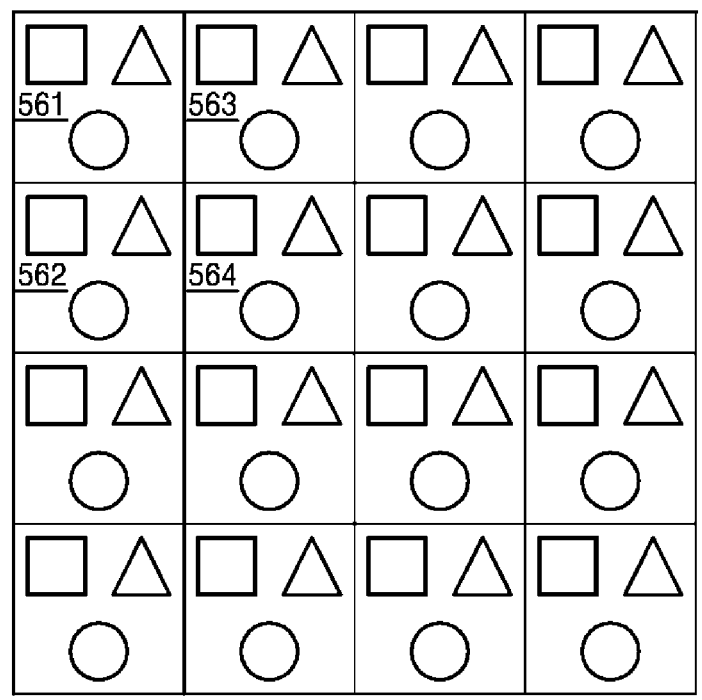

Referring to FIGS. 5B through 5D, each block indicates a pixel. For example, if a block includes only a square figure, it means that only the Y luma pixel 51 is allocated to a pixel corresponding to the block. As another example, if a block includes a square figure and a triangular figure, it means that a pixel has the Y luma pixel 51 and the Cb chroma pixel 52.

FIG. 5B illustrates pixels of a 4:2:0 color format image. In the 4:2:0 color format image, one chroma pixel is mapped to four luma pixels. In more detail, when a size of an array of luma pixels is [W]×[H], a size of an array of chroma pixels may be [W/2]×[H/2]. Thus, with respect to a block having a size of 2×2 consisting four pixels, a luma pixel is allocated to each pixel, and a Cb chroma pixel and a Cr chroma pixel are allocated to only one pixel among the four pixels.

Referring to FIG. 5B, each of blocks 541, 542, 543, and 544 includes a square figure meaning a luma pixel. However, a triangular figure meaning a Cb chroma pixel is allocated to only the block 541, and a circular figure meaning a Cr chroma pixel is allocated to only the block 542. Thus, a chroma pixel is not allocated to the blocks 543 and 544. A structure of the blocks 541, 542, 543, and 544 is repeatedly shown in other blocks.

FIG. 5C illustrates pixels of a 4:2:2 color format image. In the 4:2:2 color format image, two chroma pixels are mapped to four luma pixels. In more detail, when a size of an array of luma pixels is [W]×[H], a size of an array of chroma pixels may be [W/2]×[H]. Thus, with respect to a block having a size of 2×2 consisting four pixels, a luma pixel is allocated to each pixel, and a Cb chroma pixel and a Cr chroma pixel are allocated to two pixels among the four pixels.

Referring to FIG. 5C, each of blocks 551, 552, 553, and 554 includes a square figure meaning a luma pixel. However, a triangular figure meaning a Cb chroma pixel is allocated to only the blocks 551 and 552, and a circular figure meaning a Cr chroma pixel is allocated to only the blocks 551 and 552. Thus, all of a luma pixel and two chroma pixels are allocated to the blocks 551 and 552. However, only a luma pixel is present in the blocks 553 and 554, and a chroma pixel is not allocated thereto. A structure of the blocks 551, 552, 553, and 554 is repeatedly shown in other blocks.

FIG. 5D illustrates pixels of a 4:4:4 color format image. In the 4:4:4 color format image, a chroma pixel is one-to-one mapped to a luma pixel. In more detail, when a size of an array of luma pixels is [W]×[H], a size of an array of chroma pixels may be [W]×[H]. Thus, one luma pixel and two chroma pixels are allocated to each of pixels in a block having a size of 2×2 consisting four pixels.

Referring to FIG. 5D, each of blocks 561, 562, 563, and 564 includes a square figure meaning a luma pixel, a triangular figure meaning a Cb chroma pixel, and a circular figure meaning a Cr chroma pixel. Thus, it is obvious to see all of one luma pixel and two chroma pixels are allocated to each of the blocks 561, 562, 563, and 564. A structure of the blocks 561, 562, 563, and 564 is repeatedly shown in other blocks.

When a width and a height of a high resolution image are iEWidth and iEHeight and a width and a height of the low resolution image are iBWidth and iBHeight, respectively, an up-sampling ratio dsFactor may be determined as a ratio iEWidth/iBWidth of the width of the high resolution image with respect to the width of the low resolution image.

A horizontal distance (a horizontal phase shift) between pixels of an image is denoted by iPhaseX, and a vertical distance (a vertical phase shift) is denoted by iPhaseY.

In general, a phase shift Phase between pixel positions between the low resolution image and the high resolution image may be determined according to the following equation:

$$\text{Phase} = (i + \text{displacement}/2)/\text{dsFactor} - \text{displacement}/2$$

Therefore, if the up-sampling ratio is 2, and a distance between pixels of the low resolution image is 0, the phase shift Phase between the low resolution image and the high resolution image may be 0 and ½. If the up-sampling ratio is 2, and the distance between the pixels of the low resolution image is 1, the phase shift Phase between the low resolution image and the high resolution image may be ⅜ and ⅞.

However, when the up-sampling ratio 2, the phase shift Phase 0, ⅜, ⅞, and 1 may be expressed as a 1/16 sampling unit. Thus, a pixel position of the high resolution image is determined according to an equation indicating up-sampling of the 1/16 sampling unit below.

The horizontal phase shift iPhaseX and the vertical phase shift iPhaseY between the luma pixels 51, 52, 53, and 54 of the low resolution image are respectively 0 and 0. The horizontal phase shift iPhaseX and the vertical phase shift iPhaseY of the chroma pixel 55 are respectively 0 and 1.

In Equation aa, iRefPos16XX and iRefPos16YY denote sampling positions of the 1/16, sampling unit on the low resolution image, $$i\text{RefPos16}XX = ((i * i\text{Scale}X + i\text{Add}X) >> i\text{Shift}XM4) - i\text{Delta}X;$$

$$i\text{RefPos16}YY = ((j * i\text{Scale}Y + i\text{Add}Y) >> i\text{Shift}YM4) - i\text{Delta}Y; \quad \text{[Equation aa]}$$

where i is a number equal to or greater than 0 and smaller than the width iEWidth of the high resolution image, and j is a number equal to greater than 0 and smaller than the height iEHight of the high resolution image.

Variables iScaleX, iAddX, iShiftXM4, iDeltaX, iScaleY, iAddY, iShiftYM4, and iDeltaY for determining iRefPos16XX and iRefPos16YY may be respectively determined according to the following equations:

$$i\text{Shift}X = 16;$$

iShiftY=16;

iAddX=(((iBWidth*iPhaseX)<<(iShiftX−2))+
    (iEWidth>>1))/iEWidth+(1−(iShiftX−5));

iAddY=(((iBHeight*iPhaseY)−(iShiftY−2))+(iE-
    Height>>1))/iEHeight+(1−(iShiftY−5));

iDeltaX=4*iPhaseX;

iDeltaY=4*iPhaseY;

iShiftXM4=iShiftX−4;

iShiftYM4=iShiftY−4;

iScaleX=((iBWidth−iShiftX)+(iEWidth>>1))/iEWidth;

iScaleY=((iBHeight<<iShiftY)+(iEHeight>>1))/iE-
    Height;

iPHaseX and iPhaseY are different according to a luma pixel or a chroma pixel, and thus, sampling positions iRefPos16XX and iRefPos16YY may be different.

If the sampling position for performing up-sampling filtering on the low resolution image is extended, the sampling positions iRefPos16XX and iRefPos16YY indicate corresponding sampling positions for each pixel position of the high resolution image.

Thus, a phase shift iPhaseXX of the high resolution image in the horizontal direction and a pixel position iRefPosXX in the horizontal direction, a phase shift iPhaseYY in the vertical direction and a pixel position iRefPosYY in the vertical direction may be respectively determined by using the following equations iRefPos16XX and iRefPos16YY:

iPhaseXX=iRefPos16XX& 15;

iRefPosXX=iRefPos16XX>>4;

iPhaseYY=iRefPos16YY& 15;

iRefPosYY=iRefPos16YY>>4;

Therefore, a sampling position of the high resolution image, i.e. a pixel position, may be determined according to the equation aa above without a division operation.

Figure 6:
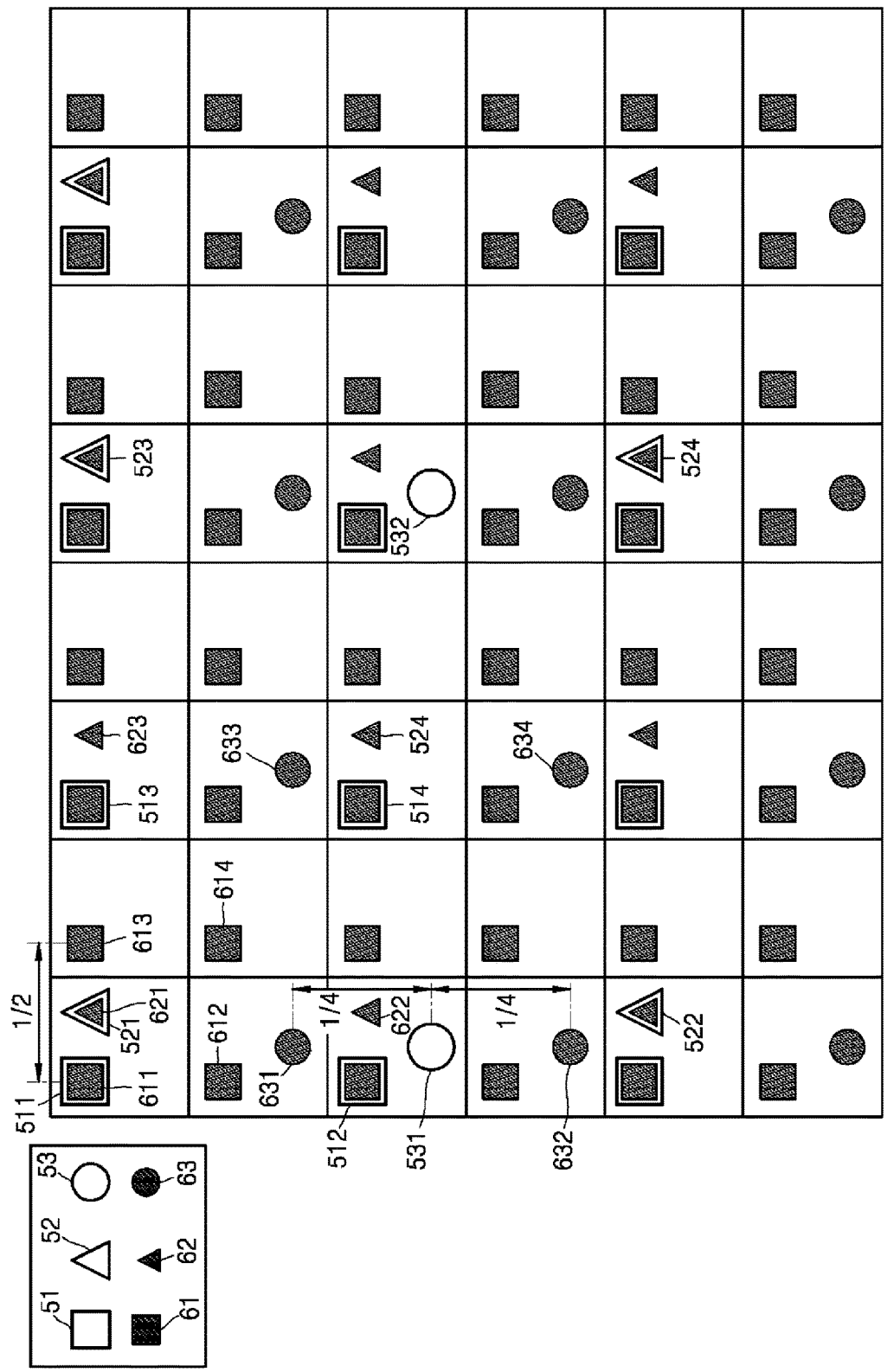
FIG. 6 illustrates a distribution of low and high resolution luma pixels and low and high resolution chroma pixels when a 4:2:0 color format is not changed and a scaling factor between a low resolution image and a high resolution image is 2.
Figure 7:
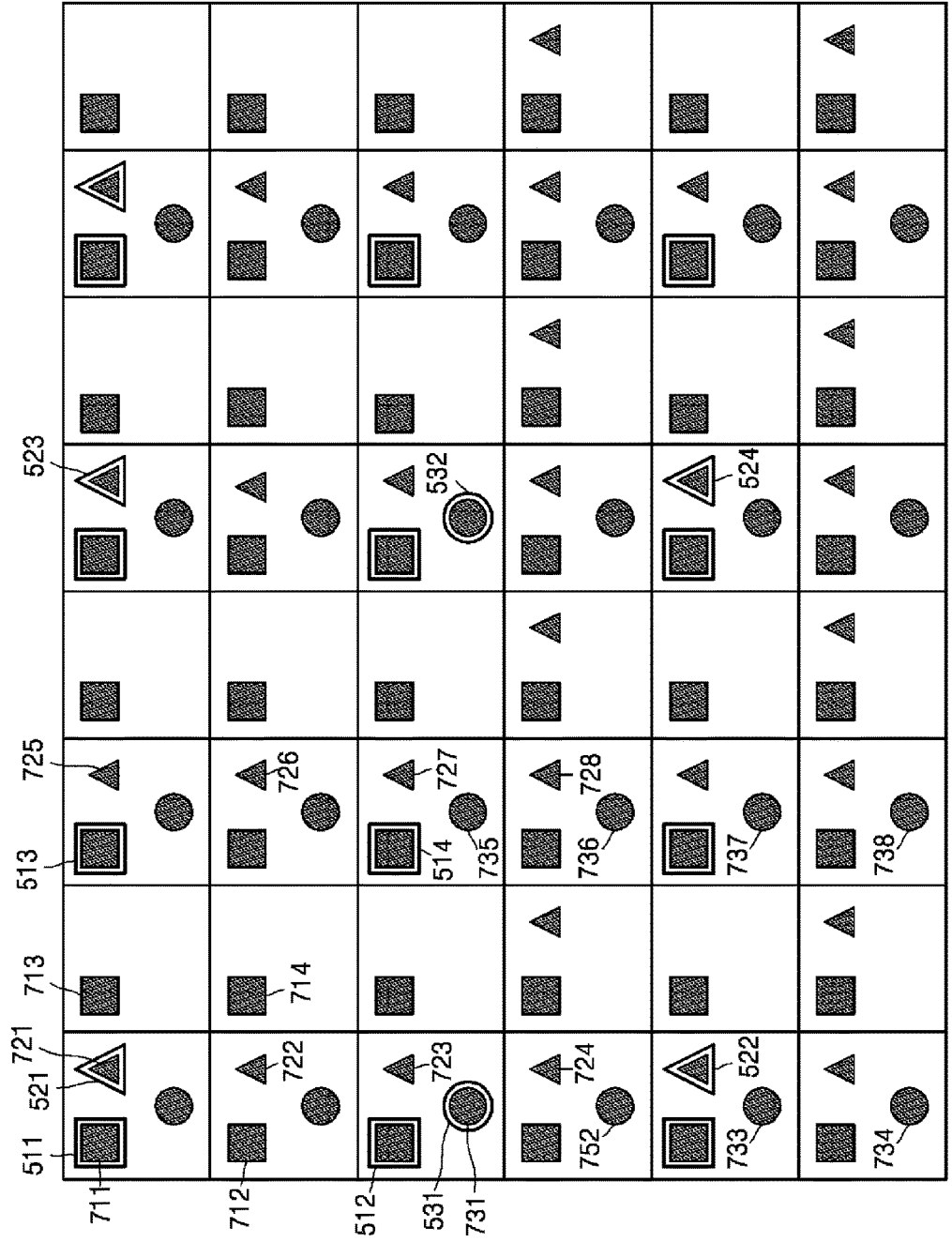
FIG. 7 illustrates a distribution of low and high resolution luma pixels and low and high resolution chroma pixels when a 4:2:0 color format is changed to a 4:2:2 color format and a scaling factor between a low resolution image and a high resolution image is 2.
Figure 8:
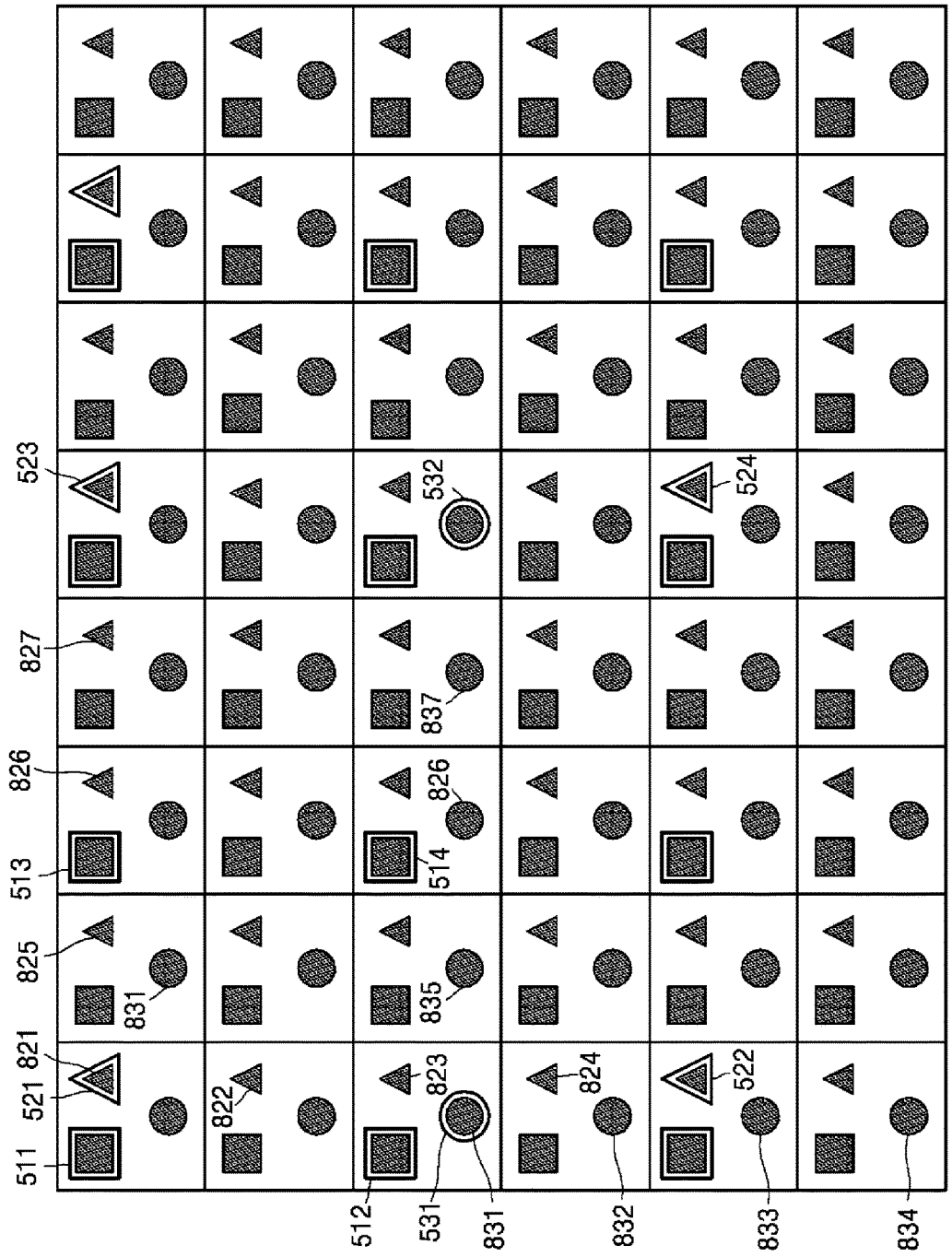
FIG. 8 illustrates a distribution of low and high resolution luma pixels and low and high resolution chroma pixels when a 4:2:0 color format is changed to a 4:4:4 color format and a scaling factor between a low resolution image and a high resolution image is 2.

With reference to FIGS. 6 through 8, when an up-sampling ratio is 2, a phase shift and an up-sampling ratio of a luma pixel and a chroma pixel according to a color format conversion are now described. A big square shape FIG. 51 is a luma pixel of a low resolution image, a big triangular shape FIG. 52 is a Cr chroma pixel of the low resolution image, a big circular shape FIG. 53 is a Cb chroma pixel of the low resolution image, a small square shape FIG. 61 is a luma pixel of a high resolution image, a small triangular shape FIG. 62 is a Cr chroma pixel of the high resolution image, and a small circular shape FIG. 63 is a Cb chroma pixel of the high resolution image.

Based on descriptions of FIGS. 6 through 8, it is possible to know a phase shift between chroma pixels when a low resolution image is up-sampled.

FIG. 6 illustrates a distribution of low and high resolution luma pixels and low and high resolution chroma pixels when a scaling factor between the low resolution image 50 and a high resolution image in a 4:2:0 color format is 2.

According to the 4:2:0 color format, low resolution luma pixels 511, 512, 513, and 514, etc., low resolution Cr chroma pixels 521, 522, 523, and 524, etc., and low resolution Cb chroma pixels 531, 532, 533, and 534, etc. are positioned.

According to an up-sampling ratio of 2, high resolution luma pixels 611, 612, 613, and 614, etc. are positioned based on positions of the low resolution luma pixels 521, 522, 523, and 524, etc. Also, according to the 4:2:0 color format, high resolution chroma pixels 621, 622, 623, 624, 631, 632, 633, and 634, etc. are positioned based on positions of the high resolution luma pixels 611, 612, 613, and 614, etc.

In a luma pixel, phase shifts between a pixel of a low resolution image and a pixel of a high resolution image are 0 and ½. For example, a horizontal phase shift between the low resolution luma pixel 511 and the high resolution luma pixel 611 is 0, and a horizontal phase shift between the low resolution luma pixel 511 and the high resolution luma pixel 613 is ½. A vertical phase shift between the low resolution luma pixel 511 and the high resolution luma pixel 611 is 0, and a vertical phase shift between the low resolution luma pixel 511 and the high resolution luma pixel 617 is ½.

In a Cb chroma pixel, the phase shifts between the pixel of the low resolution image and the pixel of the high resolution image are 0 and ½. For example, a horizontal phase shift between the low resolution Cb chroma pixel 521 and the high resolution Cr chroma pixel 621 is 0, and a horizontal phase shift between the low resolution Cb chroma pixel 521 and the high resolution Cb chroma pixel 623 is ½. A vertical phase shift between the low resolution Cb chroma pixel 521 and the high resolution Cb chroma pixel 621 is 0, and a vertical phase shift between the low resolution Cr chroma pixel 521 and the high resolution Cb chroma pixel 622 is 1/2.

In a Cr chroma pixel, the phase shifts between the pixel of the low resolution image and the pixel of the high resolution image are 0, ¼, ½, and ¾. For example, a horizontal phase shift between the low resolution Cr chroma pixel 531 and the high resolution Cr chroma pixel 631 is 0, and a horizontal phase shift between the low resolution Cr chroma pixel 531 and the high resolution Cr chroma pixel 633 is ½.

A vertical phase shift between the low resolution Cb chroma pixel 531 and the high resolution Cr chroma pixel 631 is ¼, and a vertical phase shift between the low resolution Cr chroma pixel 531 and the high resolution Cr chroma pixel 632 is ¾.

As a result, the luma pixel and the chroma pixel are doubly up-sampled, respectively, in the horizontal direction and the vertical direction. Without a color format conversion, up-sampling ratios of the luma pixel and the chroma pixel may be identical.

FIG. 7 illustrates a distribution of low and high resolution luma pixels and low and high resolution chroma pixels when a 4:2:0 color format is changed to a 4:2:2 color format and a scaling factor between a low resolution image and a high resolution image is 2.

According to the 4:2:0 color format, low resolution luma pixels 511, 512, 513, and 514, etc., low resolution Cr chroma pixels 721, 722, 723, and 724, etc., and low resolution Cb chroma pixels 731, 732, 733, and 734, etc. are positioned.

According to an up-sampling ratio of 2, high resolution luma pixels 711, 712, 713, and 714, etc. are positioned based on positions of the low resolution luma pixels 511, 512, 513, and 514, etc. Also, according to the 4:2:2 color format, high resolution chroma pixels 721, 722, 723, 724, 725, 731, 732, 733, 734, and 735, etc. are positioned based on positions of the high resolution luma pixels 711, 712, 713, and 714, etc.

In a luma pixel, an up-sampling ratio is identical to FIG. 6, and even if a color format is changed, the luma pixel is not different, thus, a phase shift is identical to FIG. 6.

In a Cb chroma pixel, phase shifts between a pixel of the low resolution image and a pixel of the high resolution image are 0, ¼, ½, and ¾. For example, a horizontal phase shift between the low resolution Cb chroma pixel 521 and the high resolution Cr chroma pixel 721 is 0, and a horizontal phase shift between the low resolution Cb chroma pixel 521 and the high resolution Cb chroma pixel 725 is ½. A vertical phase shift between a low resolution Cr chroma pixel 521 and the high resolution Cb chroma pixel 721 is 0, a vertical phase shift between the low resolution Cb chroma pixel 521 and the high resolution Cb chroma pixel 722 is ¼, a vertical phase shift between the low resolution Cb chroma pixel 521 and the high resolution Cb chroma pixel 723 is ½, and a vertical phase shift between the low resolution Cb chroma pixel 521 and the high resolution Cb chroma pixel 724 is ¾.

A Cr chroma pixel is similar to the Cb chroma pixel. In the Cr chroma pixel, phase shifts between the pixel of the low resolution image and the pixel of the high resolution image are 0, ¼, ½, and ¾. For example, a horizontal phase shift between a low resolution Cr chroma pixel 531 and the high resolution Cr chroma pixel 731 is 0, and a horizontal phase shift between the low resolution Cr chroma pixel 531 and the high resolution Cr chroma pixel 735 is ½. A vertical phase shift between the low resolution Cr chroma pixel 531 and the high resolution Cb chroma pixel 731 is 0, a vertical phase shift between the low resolution Cr chroma pixel 531 and the high resolution Cr chroma pixel 732 is ¼, a vertical phase shift between the low resolution Cr chroma pixel 531 and the high resolution Cr chroma pixel 733 is ½, and a vertical phase shift between the low resolution Cr chroma pixel 531 and the high resolution Cr chroma pixel 734 is ¾.

As a result, when the luma pixel is doubly up-sampled in each of the horizontal and vertical direction, the chroma pixel is doubly up-sampled in the horizontal direction and is quadruply up-sampled in the vertical direction. Therefore, if the luma pixel is up-sampled by N times in each of the horizontal and vertical direction, the chroma pixel may be up-sampled by N times in the horizontal direction and may be up-sampled by 2N times in the vertical direction.

FIG. 8 illustrates a distribution of low and high resolution luma pixels and low and high resolution chroma pixels when a 4:2:0 color format is changed to a 4:4:4 color format and a scaling factor between a low resolution image and a high resolution image is 2.

According to the 4:2:0 color format, low resolution luma pixels 511, 512, 513, and 514, low resolution Cr chroma pixels 721, 722, 723, and 724, and low resolution Cb chroma pixels 731, 732, 733, and 734 are positioned.

According to an up-sampling ratio of 2, high resolution luma pixels 811, 812, 813, and 814 are positioned based on positions of the low resolution luma pixels 511, 512, 513, and 514, etc. Also, according to the 4:2:2 color format, high resolution chroma pixels 821, 822, 823, 824, 825, 826, 827, 831, 832, 833, 834, 835, 836, and 837, etc. are positioned based on positions of the high resolution luma pixels 811, 812, 813, and 814, etc.

In a luma pixel, as in FIG. 7, an up-sampling ratio is identical to FIG. 6, and even if a color format is changed, the luma pixel is not different, thus, a phase shift is identical to FIG. 6.

In a Cb chroma pixel, phase shifts between a pixel of the low resolution image and a pixel of the high resolution image are 0, ¼, ½, and ¾. For example, a horizontal phase shift between the low resolution Cb chroma pixel 521 and the high resolution Cb chroma pixel 821 is 0, a horizontal phase shift between the low resolution Cb chroma pixel 521 and the high resolution Cb chroma pixel 825 is ¼, a horizontal phase shift between the low resolution Cr chroma pixel 521 and the high resolution Cb chroma pixel 826 is ½, and a horizontal phase shift between the low resolution Cb chroma pixel 521 and the high resolution Cb chroma pixel 827 is ¾. A vertical phase shift between the low resolution Cb chroma pixel 521 and the high resolution Cb chroma pixel 821 is 0, a vertical phase shift between the low resolution Cb chroma pixel 521 and the high resolution Cb chroma pixel 822 is ¼, a vertical phase shift between the low resolution Cb chroma pixel 521 and the high resolution Cb chroma pixel 823 is ½, and a vertical phase shift between the low resolution Cb chroma pixel 521 and the high resolution Cb chroma pixel 824 is ¾.

In a Cr chroma pixel, a distribution of Cr chroma pixels of the high resolution image with respect to a distribution of Cr chroma pixels of the low resolution image is identical to a distribution of Cb chroma pixels of the high resolution image with respect to a distribution of Cb chroma pixels of the low resolution image. Thus, the Cr chroma pixels have the same phase shifts as the Cb chroma pixels.

As a result, when the luma pixel is doubly up-sampled in each of the horizontal and vertical direction, the chroma pixel is quadruply up-sampled in each of the horizontal and vertical direction. Therefore, when the luma pixel is up-sampled by N times in each of the horizontal and vertical direction, the chroma pixel may be up-sampled by 2N times in each of the horizontal and vertical direction.

When the color format is changed from 4:2:2 to 4:4:4, the luma pixel is doubly up-sampled in each of the horizontal and vertical direction, and the chroma pixel is quadruply up-sampled in the horizontal direction and is doubly up-sampled in the vertical direction. Therefore, when the luma pixel is up-sampled by N times in each of the horizontal and vertical direction, the chroma pixel may be up-sampled by 2N times in the horizontal direction and may be up-sampled by N times in the vertical direction.

The image up-sampling apparatus 10 according to various embodiments may perform image up-sampling by determining filters according to phase shifts between a low resolution image and a high resolution image. The image up-sampling apparatus 10 may store filter coefficient sets mapped for phase shifts and select a filter coefficient corresponding to a current phase shift among the stored filter coefficient sets.

A phase shift needs a filter configured as filter coefficients used to determine an accurate interpolation value in a corresponding phase in order to determine a sampling position and accurately determine a sample value in the sampling position. Thus, it is necessary to pre-store filter coefficient sets having good performance in the image up-sampling apparatus 10. Hereinafter, an operation of determining filter coefficient sets for outputting an accurate interpolation value for phase shifts will now be described in detail.

<Basis for Determining Up-Sampling Filter Coefficients>

Interpolation on pel unit pixels for generating a pixel value of a sampling position may be implemented through up-sampling filtering. Up-sampling filtering is expressed according to the following expression:

$$p(\alpha) = f(\alpha) \times p = \sum_{-M+1}^{M} f_m \cdot p_m$$

A pixel value p(x) generated as a result of interpolation is derived according to a vector p of 2M pel unit reference pixels $\{p_m\}=\{p_{-M+1}, p_{-M+2}, \ldots, p_0, p_1, \ldots, p_M\}$ and a dot product of a vector f(x) of filter coefficients $\{f_m\}=\{f_{-M+1}, f_{-M+2}, \ldots, f_0, f_1, \ldots, f_M\}$. A filter coefficient f(α) is changed according to a sampling position α, which determines an interpolation result pixel value p(α), and thus, which up-sampling filter is selected, i.e. how the filter coefficient f(x) is determined, greatly influences the performance of up-sampling filtering.

Methods of generating various up-sampling filters according to various embodiments are based on an operation equation used to generate a floating point number other than an integer and use an absolute value of filter coefficients that is not generally greater than 1. In particular, an operation result of a real number other than the integer may be produced by the sampling position α.

Integer-based operation efficiency is higher than a floating point number based operation efficiency. Accordingly, the image up-sampling apparatus 10 according to various embodiments magnifies filter coefficients to the integer by using an up-sampling ratio, thereby improving the operation efficiency of up-sampling filtering. As a bit depth of a pixel value increases, the accuracy of up-sampling may be improved. In addition, in the integer-based operation, a bit depth of a reference layer may be increased by maintaining the magnified bit depth.

The image up-sampling apparatus 10 according to various embodiments may interpolate an image by multiplying a predetermined value to filter coefficients $f_m(\alpha)$ and using filter coefficients $F_m(\alpha)$ having a great value. For example, the filter coefficients $F_m(\alpha)$ may be magnified from the filter coefficients $f_m(\alpha)$ according to the following Equation i:

$$F_m(\alpha) = int(f_m(\alpha) * 2^n) \quad \text{[Equation i]}$$

A scaling rate for operation efficiency may be in the form of 2'. n may be 0 and a positive integer. An up-sampling filtering result by a filter coefficient magnified by $2^n$ may be magnified by an n bit in a bit depth compared to a filtering result by an original filter coefficient.

Integer operation up-sampling filtering using the magnified filter coefficients $F_m(\alpha)$ may follow Equation ii below. That is, a magnified bit depth needs to be reconstructed to an original bit depth after up-sampling filtering is performed by using the magnified filter coefficients $F_m(\alpha)$.

$$p(\alpha) = \left( \sum_{-M+1}^{M} F_m(\alpha) \cdot p_m + \text{offset} \right) \gg n \quad \text{[Equation ii]}$$

In this regard, offset may be $2^{n-1}$.

That is, a result of filtering magnified by using a magnified upsampling filter according to various embodiments needs to be reduced by the scaling rate of $2^n$ in order to reconstruct a magnified bit depth to an original bit depth, and thus the bit depth magnified by the n bit as the result of filtering may be reduced by the n bit.

When the bit depth is magnified by the n bit according to the integer-based operation, and the bit depth is decreased by n−1 by dividing each of interpolated pixels by $2^{n-1}$, a bit depth of the interpolated pixels is increased, compared to an original bit depth. According to a same scheme, the bit depth may be increased or decreased by at least 2, compared to the original bit depth.

If 2-step up-sampling filtering is performed by 1D up-sampling filtering in a horizontal direction and 1D up-sampling filtering in a vertical direction in serial, the bit depth may be reduced by 2n bits. Thus, when a first 1D up-sampling filter is expanded by an n1 bit, and a second 1D up-sampling filter is expanded by an n2 bit, the bit depth may be reduced by 2n that is a sum of n1 and n2 after performing 2-step up-sampling filtering through first 1D up-sampling filtering and second 1D up-sampling filtering. The first 1D up-sampling filter may be a non-expanded up-sampling filter.

When the bit depth is not decreased by a 2n bit but is decreased by a 2n−2 bit, the bit depth of the interpolated pixels may be increased by 2. For example, when a bit depth of an original pixel is 8, a bit depth of an interpolated pixel may be increased by 2 and thus may become 10.

A sum of the up-sampling filter coefficients $f_m(\alpha)$ is 1 as shown in an equation iii below.

$$\sum_{-M+1}^{M} f_m(\alpha) = 1 \quad \text{[Equation iii]}$$

A normalization condition for the filter coefficients $F_m(\alpha)$ of the expanded up-sampling filter needs to follow the following Equation iv:

$$\sum_{-M+1}^{M} F_m(\alpha) = 2^n \quad \text{[Equation iv]}$$

However, the normalization condition following Equation iv above may cause an error due to a rounding error. The image up-sampling apparatus 10 according to various embodiments may round off the expanded filter coefficients $F_m(\alpha)$ based on the normalization condition following Equation iv. Some of the expanded filter coefficients $F_m(\alpha)$ for normalization may be adjusted within a predetermined range compared to an original value. For example, the expanded filter coefficients $F_m(\alpha)$ may be adjusted within a range of ±1 to correct the round error.

FIG. 9 illustrates s a table of up-sampling ratios corresponding to a phase shift interval of a 1/16 unit according to various embodiments.

A pixel position and a phase shift of a high resolution image generated by up-sampling a low resolution image according to Equation aa are determined without a division operation as described above. According to Equation aa, phase shifts that may occur in each sampling position may be determined when performing up-sampling according to a frequently used scaling factor. To the contrary, a sampling position for the high resolution image may be determined after being estimated from a pel unit pixel position of the low resolution image if the phase shift is determined.

FIG. 9 illustrates a relationship of the up-sampling ratios in which phase shifts may occur when the phase shift interval is 1/16.

If the phase shift interval is 1/16, since selectable phase shifts are 16, phase shifts may be mapped to different phase shift indexes. Thus, phase shift index information may be signaled so as to transmit and receive information indicating which phase shift corresponding to a filter coefficient set is used to perform up-sampling filtering.

A phase shift 0 occurs when up-sampling of all scaling factors is theoretically performed.

A phase shift 1/16 may accurately determine a sampling position necessary for up-sampling of a ratio ×16/15.

A phase shift 1/8 (=2/16) may accurately determine a sampling position necessary for up-sampling of a ratio ×8/7. Although the sampling position necessary for up-sampling of the ratio ×8/7 has an error of about 0.02, compared to a sampling position necessary for up-sampling of a ratio ×7/6, since the error is an ignorable value, the phase shift 1/8 may be used in up-sampling of the ratio ×7/6.

A phase shift 1/5 (=3/15≈3/16) may accurately determine a sampling position necessary for up-sampling of a ratio ×5/3. Although the sampling position necessary for up-sampling of the ratio ×5/3 has an error of about −0.03, compared to a sampling position necessary for up-sampling of a ratio ×6/5, since the error is an ignorable value, the phase shift 1/5 may be used in up-sampling of the ratio ×6/5.

A phase shift 1/4 (=4/16) may accurately determine a sampling position necessary for up-sampling of scaling factors ×4/3 and ×8/7. Although the sampling position necessary for up-sampling of the scaling factors ×4/3 and ×8/7 has an error of about 0.04, compared to a sampling position necessary for up-sampling of the ratio ×7/6, since the error is an ignorable value, the phase shift 1/4 may be used in up-sampling of the ratio ×7/6.

When an up-sampling ratio is 2:3, a sampling position having the phase shift 1/3 is necessary. However, when the phase shift is 1/16, no phase shift index accurately matches the phase shift 1/3. Thus, for the sampling position having the phase shift 1/3, an index of a phase shift 5/16 (≈5/15=1/3) among phase shift indexes may be allocated. That is, the phase shift 1/3 (≈5/16) may accurately determine a sampling position necessary for up-sampling of scaling factors ×3/2 and ×6/5.

A phase shift 3/8 (=6/16) may accurately determine a sampling position necessary for up-sampling of the ratio ×8/7. A phase shift 2/5 (=6/15≈7/16) may accurately determine the sampling position necessary for up-sampling of the ratio ×5/3.

A phase shift 1/2 (=8/16) may accurately determine sampling positions necessary for up-sampling of scaling factors ×2, ×4/3, ×6/5, and ×8/7.

When a phase shift index i is greater than 8, since a sum of a phase shift θ1 indicated by the phase shift index i and a phase shift θ2 indicated by a phase shift index 16−i is 1, the phase shift index i and the phase shift index 15−i may simultaneously occur in a same up-sampling ratio. Thus, the phase shift θ2 may also be used in an up-sampling ratio using the phase shift θ1. Therefore, phase shift index i and the phase shift index 15−i may be used in the same up-sampling ratio.

Accordingly, the phase shift 3/5 may be used in up-sampling of the ratio ×5/3 like the phase shift 2/5. The phase shift 5/8 may be used in up-sampling of the ratio ×8/7 like the phase shift 3/8. The phase shift 2/3 may be used in up-sampling of the scaling factors ×3/2 and ×6/5 like the phase shift 1/3. The phase shift 3/4 may be used in up-sampling of the scaling factors ×4/3 and ×8/7, like the phase shift 1/4. The phase shift 4/5 may be used in up-sampling of the scaling factors ×5/3 and ×6/5, like the phase shift 1/5. The phase shift 7/8 may be used in up-sampling of the scaling factors ×8/7 and ×7/6, like the phase shift 1/8. The phase shift 15/16 may be used in up-sampling of the scaling factors ×16/15, like the phase shift 1/16.

According to the table of FIG. 9, if a specific phase shift is necessary in each up-sampling ratio, an up-sampling filter for determining a sampling position indicating a corresponding phase shift is necessary. Hereinafter, with reference to FIGS. 10A through 10D, filter coefficient sets of the up-sampling filter which are for determining sampling positions indicated by each of phase shifts are shown.

FIGS. 10A through 10D illustrate filter coefficients, according to various embodiments. A total sum of the filter coefficients in FIGS. 10A through 10D is $2^6$=64. Therefore, when up-sampling is performed by applying the filter coefficients presented in FIGS. 10A through 10D, a bit depth is increased by 6 bits.

FIG. 10A illustrates 8-tap up-sampling filter coefficients having a phase shift interval of 1/16, according to various embodiments.

A filter coefficient set for a phase shift 0 is {0, 0, 0, 64, 0, 0, 0, 0}.

A filter coefficient set for a phase shift 1/16 is {0, 1, −3, 63, 4, −2, 1, 0}.

A filter coefficient set for a phase shift 1/8 is {−1, 2, −5, 62, 8, −3, 1, 0} or {0, 2, −6, 61, 9, −3, 1, 0}.

A filter coefficient set for a phase shift 3/16 is {−1, 3, −8, 60, 13, −4, 1, 0}.

A filter coefficient set for a phase shift 1/4 is {−1, 4, −10, 58, 17, −5, 1, 0}.

A filter coefficient set for a phase shift 5/16 is {−1, 4, −11, 52, 26, −8, 3, −1}.

A filter coefficient set for a phase shift 3/8 is {−1, 4, −11, 50, 29, −9, 3, −1}, {−1, 4, −11, 50, 28, −8, 2, 0}, or {−1, 3, −9, 47, 31, −10, 4, −1}.

A filter coefficient set for a phase shift 7/16 is {−1, 4, −11, 45, 34, −10, 4, −1} or {−1, 4, −11, 44, 35, −10, 4, −1}.

A filter coefficient set for a phase shift 1/2 is {−1, 4, −11, 40, 40, −11, 4, −1}.

As described with reference to FIG. 9 above, the phase shift index i and the phase shift index 16−i may simultaneously occur in up-sampling of a same scaling factor, and filter coefficients for the phase shift index i and filter coefficients for the phase shift index 16−i have an inverse order relationship. For example, the filter coefficient set for the phase shift 5/16 may be {−1, 4, −11, 52, 26, −8, 3, −1}, whereas the filter coefficient set for the phase shift 7/16 may be {−1, 3, −8, 26, 52, −11, 4, −1}.

Therefore, the image up-sampling apparatus 10 according to various embodiments may store a lookup table of the phase shift index (or phase shifts) and the filter coefficient sets described with reference to FIG. 10A above in the filter data storage unit 16.

FIG. 10B illustrates 4-tap up-sampling filter coefficients having a phase shift interval of 1/16, according to various embodiments.

A filter coefficient set for a phase shift 0 is {0, 64, 0, 0}.

A filter coefficient set for a phase shift 1/16 is {−2, 62, 4, 0}.

A filter coefficient set for a phase shift 1/8 is {−2, 58, 10, −2}.

A filter coefficient set for a phase shift 3/16 is {−4, 56, 14, −2}.

A filter coefficient set for a phase shift 1/4 is {−4, 54, 16, −2}.

A filter coefficient set for a phase shift 5/16 is {−6, 52, 20, −2}.

A filter coefficient set for a phase shift 3/8 is {−6, 46, 28, −4}.

A filter coefficient set for a phase shift 7/16 is {−4, 42, 30, −4}.

A filter coefficient set for a phase shift 1/2 is {−4, 36, 36, −4}.

The 8-tap filter coefficient set presented in FIG. 10A is applied to a luma pixel when the phase shift interval is 1/16.

The 4-tap filter coefficient set presented in FIG. 10B is applied to a chroma pixel when the phase shift interval is 1/16.

FIG. 10C illustrates 8-tap up-sampling filter coefficients having a phase shift interval of 1/8, according to various embodiments.

A filter coefficient set for a phase shift 0 is {0, 0, 0, 64, 0, 0, 0, 0}.

A filter coefficient set for a phase shift 1/8 is {−1, 2, −5, 62, 8, −3, 1, 0} or {0, 2, −6, 61, 9, −3, 1, 0}.

A filter coefficient set for a phase shift 1/4 is {−1, 4, −10, 58, 17, −5, 1, 0}.

A filter coefficient set for a phase shift 3/8 is {−1, 4, −11, 52, 26, −8, 3, −1}.

A filter coefficient set for a phase shift 1/2 is {−1, 4, −11, 40, 40, −11, 4, −1}.

Figures 10D, 11:
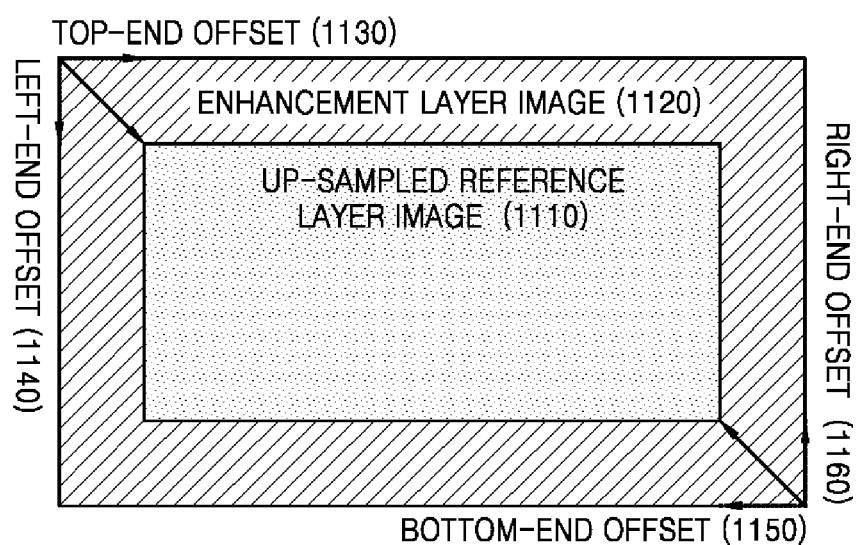

FIG. 10D illustrates 4-tap up-sampling filter coefficients having a phase shift interval of 1/8, according to various embodiments.

A filter coefficient set for a phase shift 0 is {0, 64, 0, 0}.

A filter coefficient set for a phase shift 1/8 is {−2, 58, 10, −2}.

A filter coefficient set for a phase shift 1/4 is {−4, 54, 16, −2}.

A filter coefficient set for a phase shift 3/8 is {−6, 46, 28, −4}.

A filter coefficient set for a phase shift 1/2 is {−4, 36, 36, −4}.

The 8-tap filter coefficient set presented in FIG. 10C is applied to a luma pixel when the phase shift interval is 1/8. The 4-tap filter coefficient set presented in FIG. 10D is applied to a chroma pixel when the phase shift interval is 1/8.

The filter data storage unit 16 may store a lookup table of phase shifts and filter coefficient sets according to a phase shift interval other than 1/16 or a lookup table of filter coefficient sets of which filter tap number is not 8 and that phase shifts.

A phase shift interval may be 2^(−p) (where p is a positive integer) such as 1/16, , 1/8, or 1/32. A larger phase shift interval is preferable for a small memory, and a smaller phase shift interval is preferable for improving accuracy of up-sampling. For example, when the phase shift interval is 1/8, memory occupancy is decreased, and when the phase shift interval is 1/16, the accuracy of up-sampling is improved.

The filter coefficient set of the up-sampling filter may be pre-designated as in FIGS. 10A through 10D, or may be an undesignated variable.

Thus, the filter selector 14 may determine a necessary phase shift based on a current up-sampling ratio (a scaling factor or a scalability factor), and the filter data storage unit 16 may select a filter coefficient set corresponding to phase shifts and perform up-sampling filtering for each sampling position indicated by phase shifts.

A scalable video system may encode a low resolution image as a base layer image sequence and a high resolution image as an enhancement layer image sequence.

Even if a reference layer image from among base layer images which corresponds to an enhancement layer image is up-sampled and thus resolution of the reference layer image is equalized to resolution of the enhancement layer image, the resolution of the up-sampled reference layer image and the resolution of the enhancement layer image are not always identical. Therefore, there is a demand for a process of obtaining an offset between the up-sampled reference layer image and the enhancement layer image, and equalizing the resolution of the up-sampled reference layer image and the resolution of the enhancement layer image, based on the offset.

FIG. 11 illustrates an offset between an up-sampled reference layer image and an enhancement layer image. FIG. 11 illustrates an up-sampled reference layer image 1110 and an enhancement layer image 1120 whose resolutions are not identical. In addition, a top-end offset 1130, a left-end offset 1140, a bottom-end offset 1150, and a right-end offset 1160 are between the up-sampled reference layer image 1110 and the enhancement layer image 1120. A relationship among the up-sampled reference layer image 1110, the enhancement layer image 1120, and the offsets 1130, 1140, 1150, and 1160 may be expressed using formulas below.

SW=$W$−ScaledRefLayerLeftOffset(SRLO)−ScaledRefLayerRightOffset(SRRO)

SH=$H$−ScaledRefLayerTopOffset(SRTO)−ScaledRefLayerBottomOffset(SRBO)

In the formulas, W and H mean a width and a height of the enhancement layer image 1120, respectively. SRLO, SRRO, SRTO, and SRBO mean the top-end offset 1130, the left-end offset 1140, the bottom-end offset 1150, and the right-end offset 1160, respectively. SW and SH mean a width and a height of the up-sampled reference layer image 1110, respectively.

A position of a random luma sample included in the enhancement layer image 1120 may be defined as (xL, yL). In order to equalize the resolutions, it is required to search for, in the up-sampled reference layer image 1110, a position ($xL_R$, $yL_R$) corresponding to the position (xL, yL) of the luma sample of the enhancement layer image 1120. Likewise, when a position of a random chroma sample included in the enhancement layer image 1120 is defined as (xC, yC), in order to equalize the resolutions, it is required to search for, in the up-sampled reference layer image 1110, a position ($xC_R$, $yC_R$) corresponding to the position (xC, yC) of the chroma sample of the enhancement layer image 1120. A method of obtaining ($xL_R$, $yL_R$) and ($xC_R$, $yC_R$) may be expressed as formulas below.

$$xL_R = (xL - SRLO) * W_R / SW \qquad (1)$$

$$yL_R = (yL - SRTO) * H_R / SH \qquad (2)$$

$$xC_R = (xC - SRLO/denomX + deltaXC/denomX) * W_R / (diff\_scale * SW) - deltaXC_R/2 \qquad (3)$$

$$yCR = (yC - SRTO/denomY + deltaYC/denomY) * H_R / SH - deltaYC_R/2 \qquad (4)$$

In the formulas, $W_R$ and $H_R$ mean a width and a height of a reference layer image. When a color format is 4:2:0 or 4:2:2, a value of denomX is 2, and when the color format is 4:4:4, the value is 1. When the color format is 4:2:0, the value of denomX is 2, and when the color format is 4:2:2 or 4:4:4, the value is 1. When the color format is changed from 4:2:0 to 4:2:2, a value of diff_scale is 2, and when a color format conversion does not occur or the color format is not changed from 4:2:0 to 4:2:2, the value is 1.

The formulas (1) through (4) may be generalized and may be expressed as formulas (5) and (6).

$$x_R = (x - (SRLO - deltaX)/denomX) * W_R / (diff\_scale * SW) - deltaX_R/2 \qquad (5)$$

$$yR = (y - (SRTO - deltaY)/denomY) * H_R / SH - deltaY_R/2 \qquad (6)$$

In the luma pixel, if it is assumed as diff_scale=denomX=denomX=1, deltaX=deltaY=0, deltaX$_R$=deltaY$_R$=0 in the formulas, formulas regarding $xL_R$ and $yL_R$ are derived.

In the chroma pixel, formulas of $xL_R$ and $yL_R$ are equal to formulas of xR and yR, respectively.

While (x,y) and (xC,yC) input to the formulas are integers, output reference layer positions $(x_R,y_R)$ and $(xC_R,yC_R)$ are not always integers. Thus, when values of $(x_R,y_R)$ and $(xC_R,yC_R)$ are not integers, the positions $(x_R,y_R)$ and $(xC_R,yC_R)$ are interpolated by using a sample of reference layers.

A process of integerizing a reference sample position by using formulas below is described. First, ScaleFactorX and ScaleFactorY each having an integer value are defined below.

$$\text{ScaleFactor}X=((WR\ll 16)+((\text{diff\_scale}*SW)\gg 1))/(\text{diff\_scale}*SW)$$

$$\text{ScaleFactor}Y=((HR\ll 16)+(SH\gg 1))/SH$$

In the above formulas, result values of ScaleFactorX and ScaleFactorY are rounded off. Each of ScaleFactorX and ScaleFactorY has a value between 0 and $2^{16}$. A method of integerizing result values of the formulas (5) and (6) by using ScaleFactorX and ScaleFactorY is expressed in formulas below.

$$xR=((x-(SRLO-\text{delta}X)/\text{denom}X)*\text{ScaleFactor}X-\text{delta}X_R/2+(1\ll 15))\gg 16$$

$$yR=((y-(SRTO-\text{delta}Y)/\text{denom}Y)*\text{ScaleFactor}Y-\text{delta}Y_R/2+(1\ll 15))\gg 16$$

Variables offsetX and offsetY with respect to the luma sample are expressed as formulas below.

$$\text{offset}X=(SRLO+\text{denom}X/2)/\text{denom}X$$

$$\text{offset}Y=(SRTO+\text{denom}Y/2)/\text{denom}Y$$

When a phase shift interval is 1/16, variables xRef16, yRef16, addX16, and addY16 are derived using formulas below.

$$\text{add}X16=(((W_R*\text{delta}X)\ll 14)+(SW\gg 1))/SW$$

$$\text{add}Y16=(((W_R*\text{delta}Y)\ll 14)+(SH\gg 1))/SH$$

The variables xRef16 and yRef16 are obtained by multiplying 16 by xR and yR, respectively. xRef16 and yRef16 are used in interpolation where the phase shift interval is 1/16.

$$x\text{Ref}16=(((x-\text{offset}X)*\text{ScaleFactor}X+\text{add}X16+(1\ll 11))\gg 12)\gg(\text{delta}X-2)$$

$$y\text{Ref}16=(((y-\text{offset}Y)*\text{ScaleFactor}Y+\text{add}Y16+(1\ll 11))\gg 12)-(\text{delta}Y\ll 2)$$

When the phase shift interval is 1/8, variables xRef8, yRef8, addX8, and addY8 are derived using formulas below.

$$\text{add}X8=(((WR*\text{delta}X)\ll 13)+(SW\gg 1))/SW$$

$$\text{add}Y8=(((WR*\text{delta}Y)\ll 13)+(SH\gg 1))/SH$$

The variables xRef8 and yRef8 are obtained by multiplying 8 by xR and yR, respectively. xRef8 and yRef8 are used in interpolation where the phase shift interval is 1/8. xRef8 and yRef8 are derived in an equal manner as xRef16 and yRef16.

$$x\text{Ref}8=(((x-\text{offset}X)*\text{ScaleFactor}X+\text{add}X8+(1\ll 12))\gg 13)-(\text{delta}X\ll 1)$$

$$y\text{Ref}8=(((y-\text{offset}Y)*\text{ScaleFactor}Y+\text{add}Y8+(1\ll 12))\gg 13)-(\text{delta}Y\ll 1)$$

An interpolation method when the phase shift interval is 1/16 is described by using formulas below. An integer part (ixR,iyR) of a reference position (xR,yR) is derived below.

$$ixR=(x\text{Ref}16\gg 4)$$

$$iyR=(y\text{Ref}16\gg 4)$$

A decimal part (xPhase, yPhase) of the reference position (xR,yR) is derived below.

(xPhase, yPhase) are fractional numbers where each denominator is 16.

$$x\text{Phase}=(x\text{Ref}16)\%16$$

$$y\text{Phase}=(y\text{Ref}16)\%16$$

According to values of xPhase and yPhase, a filter coefficient set of FIG. 10A for a luma interpolation pixel is determined. According to the values of xPhase and yPhase, a filter coefficient set of FIG. 10B for a chroma interpolation pixel is determined.

The interpolation method when the phase shift interval is 1/8 is described by using formulas below. The integer part (ixR,iyR) of the reference position (xR,yR) is derived below.

$$ixR=(x\text{Ref}8\gg 3)$$

$$iyR=(y\text{Ref}8\gg 3)$$

The decimal part (xPhase, yPhase) of the reference position (xR,yR) is derived below. (xPhase, yPhase) are fractional numbers where each denominator is 8.

$$x\text{Phase}=(x\text{Ref}8)\%8$$

$$y\text{Phase}=(y\text{Ref}8)\%8$$

According to values of xPhase and yPhase, a filter coefficient set of FIG. 10C for a luma interpolation pixel is determined. According to the values of xPhase and yPhase, a filter coefficient set of FIG. 10D for a chroma interpolation pixel is determined.

The interpolation method performed by using formulas below based on the derived variables is described. In order to obtain an interpolated luma sample, 1-step interpolation is performed in a horizontal direction. The 1-step interpolation is derived in formulas below.

tempArray[n], n=0 . . . 7, is a set of sample values to be used in interpolation in a vertical direction. In Clip3(A, B,C), when a third variable C is greater than A and is less than B, C is input. In $\text{Luma}_R$ [x, y] means a pixel value of a luma pixel allocated to a (x,y) position.

$$iyRL=\text{Clip3}(0,H_R-1,iyR+n-1)$$

$$\text{tempArray}[n]=f_L[x\text{Phase},0]*\text{Luma}_R[\text{Clip3}(0,W_R-1,ixR-3),iyRL]+f_L[x\text{Phase},1]*\text{Luma}_R[\text{Clip3}(0,W_R-1,xR-2),iyRL]+f_L[x\text{Phase},2]*\text{Luma}_R[\text{Clip3}(0,W_R-1,xR-1),iyRL]+f_L[x\text{Phase},3]*\text{Luma}_R[\text{Clip3}(0,W_R-1,xR),iyRL]+f_L[x\text{Phase},4]*\text{Luma}_R[\text{Clip3}(0,W_R-1,xR+1),iyRL]+f_L[x\text{Phase},5]*\text{Luma}_R[\text{Clip3}(0,W_R-1,xR+2),iyRL]+f_L[x\text{Phase},6]*\text{Luma}_R[\text{Clip3}(0,W_R-1,xR+3),iyRL]+f_L[x\text{Phase},7]*\text{Luma}_R[\text{Clip3}(0,W_R-1,xR+4),iyRL]$$

An interpolated luma sample Luma(x,y) is used in 2-step interpolation in a vertical direction. The 2-step interpolation is derived in formulas below.

$$\text{Luma}(x,y)=\text{Clip3}(0,(1\ll B)-1),(f_L[y\text{Phase},0]*\text{tempArray}[0]+f_L[y\text{Phase},1]*\text{tempArray}[1]+f_L[y\text{Phase},2]*\text{tempArray}[2]+f_L[y\text{Phase},3]*\text{tempArray}[3]+f_L[y\text{Phase},4]*\text{tempArray}[4]+f_L[y\text{Phase},5]*\text{tempArray}[5]+f_L[y\text{Phase},6]*\text{tempArray}[6]+f_L[y\text{Phase},7]*\text{tempArray}[7]+(1\ll(11+8-B))\gg(12+8-B))$$

In the above formulas, B means a bit depth of an interpolation pixel. Thus, when a value of B is 10, the bit depth of the interpolation pixel is 10.

An interpolation method with respect to a chroma pixel is same as the interpolation method with respect to the luma pixel. However, since a density of chroma pixels is lower than a density of luma pixels in a 4:2:0 color format or a 4:2:2 color format, a 4-tap filter may be used, unlike that an 8-tap filter is used to interpolate the luma pixel.

A coefficient of a resampling filter may be predetermined from filter coefficient sets of FIGS. 10A through 10D, or a variable coefficient that is not predetermined may be used. As one of methods of transmitting the variable coefficient to a decoder, a difference between filter coefficients of FIGS. 10A through 10D may be transmitted to a bitstream.

For example, a method of determining the variable coefficient as a filter coefficient set by using a formula below is described. In the formula below, $f_L$[xPhase, k] means a predetermined filter coefficient of FIGS. 10A through 10D. $\Delta$[xPhase, k] means a value randomly set by an encoder.

$$f_LA[xPhase,k]=f_L[xPhase,k]+\Delta[xPhase,k]. \text{ (where, } k \text{ is an integer between 0 and 7).}$$

In formulas below, SumNegL[xPhase] means a sum of $f_L$[xPhase, k] less than 0, when a phase shift is xPhase. SumPosL[xPhase] means a sum of $f_L$[xPhase, k] greater than 0, when the phase shift is xPhase.

$$\text{SumNeg}L[xPhase]=(f_L[xPhase,0]<0?f_L[xPhase,0]:0)+\\(f_L[xPhase,1]<0?f_L[xPhase,1]:0)+(f_L[xPhase,2]\\<0?f_L[xPhase,2]:0)+(f_L[xPhase,3]<0?f_L[xPhase,3]:0)+(f_L[xPhase,4]<0?f_L[xPhase,4]:0)+(f_L[xPhase,5]<0?f_L[xPhase,5]:0)+(f_L[xPhase,6]<0?f_L[xPhase,6]:0)+(f_L[xPhase,7]<0?f_L[xPhase,7]:0)$$

$$\text{SumPos}L[xPhase]=(f_L[xPhase,0]>0?f_L[xPhase,0]:0)+\\(f_L[xPhase,1]>0?f_L[xPhase,1]:0)+(f_L[xPhase,2]\\>0?f_L[xPhase,2]:0)+(f_L[xPhase,3]>0?f_L[xPhase,3]:0)+(f_L[xPhase,4]>0?f_L[xPhase,4]:0)+(f_L[xPhase,5]>?f_L[xPhase,5]:0)+(f_L[xPhase,6]>0?f_L[xPhase,6]:0)+(f_L[xPhase,7]>0?f_L[xPhase,7]:0)$$

Max means a maximum value of LumaR. For example, in an 8-bit signal, 255 is a maximum. Min means a minimum value of LumaR. For example, in the 8-bit signal, 0 is a minimum. When interpolation is performed, a size of tempArray[n] has a range below.

$$\text{Max}*\text{SumNeg}L[xPhase]<\text{Min}*\text{SumPos}L[xPhase]\\<\text{tempArray}[n]<\text{Max}*\text{SumPos}L[xPhase]\\<\text{Min}*\text{SumNeg}L[xPhase]$$

With respect to an 8-bit signal of a reference layer, the size of tempArray[n] has a range below.

$$255*\text{SumNeg}L[xPhase]<\text{tempArray}[n]<255*\text{SumPos}L[xPhase]$$

Thus, a range of tempArray[n] is 255*(SumPosL [xPhase]−SumNegL[xPhase]). A bit size usable to tempArray[n] may be limited. For example, when a size of the range of the tempArray[n] has to be less than 16 bits, a condition below has to be satisfied.

$$(\text{SumPos}L[xPhase]-\text{SumNeg}L[xPhase])<(2^{16}-1)/\\255=257$$

If Max and Min are predetermined according to a signal of the reference layer, and it is required to verify whether the range of the tempArray[n] exceeds K bits, a formula below is used.

$$(\text{Max}*\text{SumPos}L[xPhase]<\text{Min}*\text{SumNeg}L[xPhase])\leq\\(\text{Max}*\text{SumNeg}L[xPhase]<\text{Min}*\text{SumPos}L\\[xPhase])<(2^K-1)$$

For example, it is assumed that SumPosL=88 and SumNegL=−24 are satisfied in the filter coefficient sets of FIGS. 10A through 10D. When the reference layer is the 8-bit signal, $$\text{SumPos}L[xPhase]-\text{SumNeg}L[xPhase]=112<257$$

According to the above formula, the size of the range of the tempArray[n] may be less than 16 bits.

If an adaptive filter coefficient is different from a predetermined filter coefficient of FIGS. 10A through 10D, by using an absolute value of a difference $\Delta$, a range of $\Delta$ may be determined. Formulas below are a process of obtaining the range of $\Delta$.

$$\text{SumPosLA}[xPhase]\leq 8*|\Delta|+88$$

$$\text{SumNegLA}[xPhase]\geq -8|\Delta|-24$$

$$(\text{SumPosLA}[xPhase]-\text{SumNegLA}[xPhase])=112+\\16*|\Delta|$$

When the size of the range of the tempArray[n] has to be less than 16 bits, a condition below has to be satisfied.

$$112+16*|\Delta|\leq 257$$

$$|\Delta|\leq 9.0625$$

According to results of the above formulas, a maximum integer value of $|\Delta|$ may be 9. Thus, unless $|\Delta|$ is an integer greater than 9, the size of the range of the tempArray[n] is less than 16 bits.

Figure 12A:
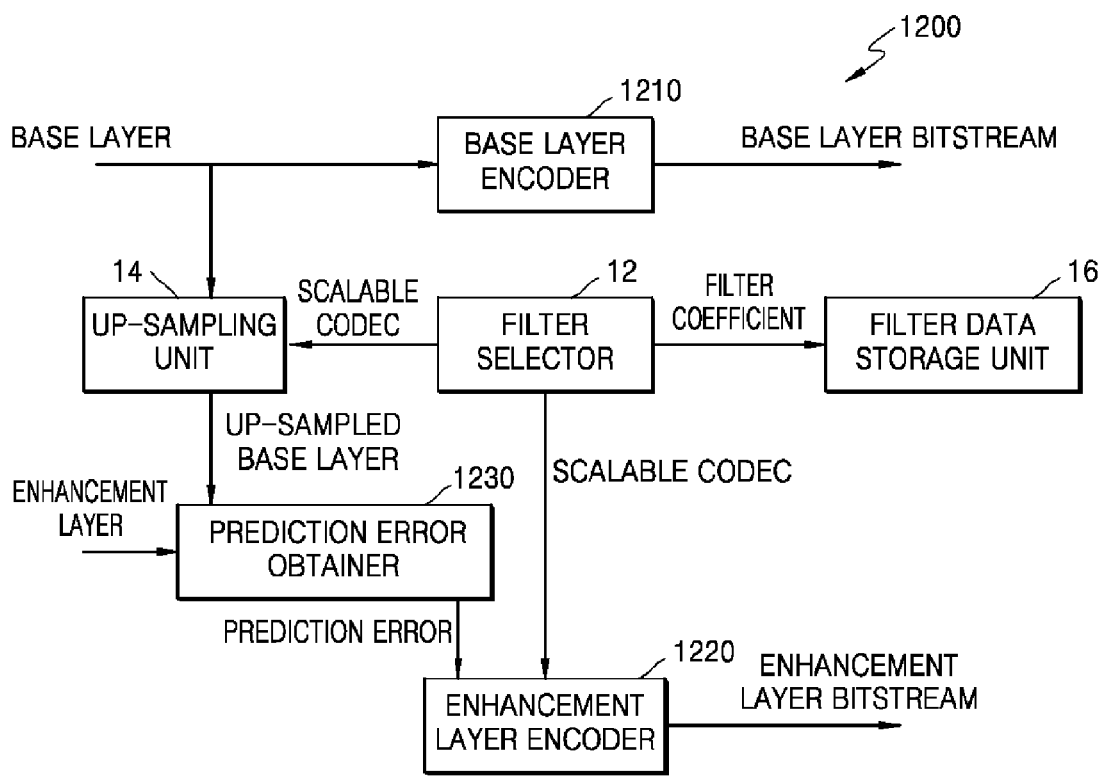
FIG. 12A illustrates a block diagram of a scalable video encoding apparatus, according to various embodiments.

FIG. 12A illustrates a block diagram of a scalable video encoding apparatus 1200, according to various embodiments.

The scalable video encoding apparatus 1200 according to various exemplary embodiments includes a base layer encoder 1210, an enhancement layer encoder 1220, a prediction error obtainer 1230, a filter selector 12, an up-sampling unit 14, and a filter data storage unit 16.

The scalable video encoding apparatus 1200 according to various exemplary embodiments may classify and encode a plurality of image streams for each layer according to scalable video coding and may output data encoded for each layer as a separate stream. The scalable video encoding apparatus 1200 may encode base layer image sequences and enhancement layer image sequences according to different layers.

The base layer encoder 1210 may encode base layer images and may output a base layer bitstream including encoded data of the base layer images. A base layer may be used as a reference layer required in encoding an enhancement layer.

The enhancement layer encoder 1220 may encode a scalable codec selected by the filter selector 12 and prediction errors obtained by the prediction error obtainer 1230, and may output an enhancement layer bitstream including encoded data of enhancement layer images.

The prediction error obtainer 1230 obtains a prediction error between an up-sampled base layer obtained by the up-sampling unit 14 and the enhancement layer. The obtained prediction error is transmitted to the enhancement layer encoder 1220.

For example, according to scalable video coding based on spatial scalability, low resolution images may be encoded as base layer images, and high resolution images may be encoded as enhancement layer images. An encoding result of the base layer images may be output in the base layer bitstream, and an encoding result of the enhancement layer images may be output in the enhancement layer bitstream.

Also, scalable video coding may be performed on a base layer and a plurality of enhancement layers. In the presence of three or more enhancement layers, base layer images, first enhancement layer images, second enhancement layer images, through $K_{th}$ enhancement layer images may be encoded. Thus, an encoding result of the base layer images may be output in the base layer bitstream and an encoding result of the first, second, through $K_{th}$ enhancement layer images may be output in first, second, through $K_{th}$ enhancement layer bitstreams, respectively.

The scalable video encoding apparatus 1200 according to various embodiments may perform inter prediction for predicting a current image by referring to images of a single layer. Through inter prediction, a motion vector indicating motion information between the current image and a reference image, and a residual between the current image and the reference image may be generated.

Also, the scalable video encoding apparatus 1200 according to various embodiments may perform inter-layer prediction for predicting enhancement layer images by referring to the base layer images. The scalable video encoding apparatus 1200 may perform inter-layer prediction for predicting second enhancement layer images by referring to the first enhancement layer images. Through inter-layer prediction, a position differential component between the current image and a reference image of a different layer, and a residual between the current image and the reference image of the different layer may be generated.

When the scalable video encoding apparatus 1200 according to various embodiments allows two or more enhancement layers, the video stream encoding apparatus 10 may perform inter-layer prediction between one base layer image and two or more enhancement layer images according to a multi-layer prediction structure.

The inter-layer prediction structure between the base layer sequence and the enhancement layer sequence will be described in detail with reference to FIG. 14 at a later time.

The scalable video encoding apparatus 1200 according to various embodiments encodes each video image for each respective block according to each layer. A block may have a square shape, a rectangular shape, or any geometric shape and is not limited to a data unit having a predetermined size. According to various embodiments, a block may be a largest coding unit, a coding unit, a prediction unit, a transformation unit, or the like from among coding units according to a tree structure. The largest coding unit including coding units having the tree structure is diversely referred to as a coding block unit, a block tree, a root block tree, a coding tree, a coding root or a tree trunk. Video encoding and decoding methods based on coding units having the tree structure will now be described with reference to FIGS. 14 through 24.

Inter prediction and inter layer prediction may be performed based on a data unit of the coding unit, the prediction unit, or the transformation unit.

The base layer encoder 1210 according to various exemplary embodiments may perform source coding operations including inter prediction or intra prediction on the base layer images to generate symbol data. For example, the base layer encoder 1210 may perform inter prediction, or intra prediction, transformation and quantization on samples in a data unit of the base layer images, generate symbol data, perform entropy encoding on the symbol data, and generate a base layer bitstream.

The enhancement layer encoder 1220 may encode the enhancement layer images based on the coding units having the tree structure. The enhancement layer encoder 1220 may perform inter/intra prediction, transformation and quantization on samples in a data unit of the enhancement layer images, generate symbol data, perform entropy encoding on the symbol data, and generate an enhancement layer bitstream.

The enhancement layer encoder 1220 according to various embodiments may perform inter layer prediction that predicts an enhancement layer image by using a reconstructed sample of a base layer image. The enhancement layer encoder 1220 may generate an enhancement layer prediction image by using a base layer reconstruction image to encode a prediction error between an enhancement layer original image and the enhancement layer prediction image, in order to encode the enhancement layer original image among the enhancement layer image sequences through the inter layer prediction structure.

The enhancement layer encoder 1220 may perform inter layer prediction on the enhancement layer image for each block such as the coding unit or the prediction unit. A block of the base layer image to which a block of the enhancement layer image is to refer may be determined. For example, a reconstruction block of the base layer image positioned in correspondence to a position of a current block image in the enhancement layer image may be determined. The enhancement layer encoder 1220 may determine an enhancement layer prediction block by using the base layer reconstruction block corresponding to the enhancement layer block.

The enhancement layer encoder 1220 may use the enhancement layer prediction block determined by using the base layer reconstruction block according to the inter layer prediction structure as a reference image for inter layer prediction of the enhancement layer original block.

In order to determine the enhancement layer prediction image (block) by using the base layer image (block) in the manner as described above, an up-sampling operation for expanding the base layer image to a size of the enhancement layer image is necessary.

The scalable video encoding apparatus 1200 according to various embodiments may include the filter selector 12, the up-sampling unit 14, and the filter data storage unit 16 of the image up-sampling apparatus 10. Operations of the filter selector 12, the up-sampling unit 14, and the filter data storage unit 16 included in the scalable video encoding apparatus 1200 will be described in detail with reference to FIG. 12A below.

Figure 13A:
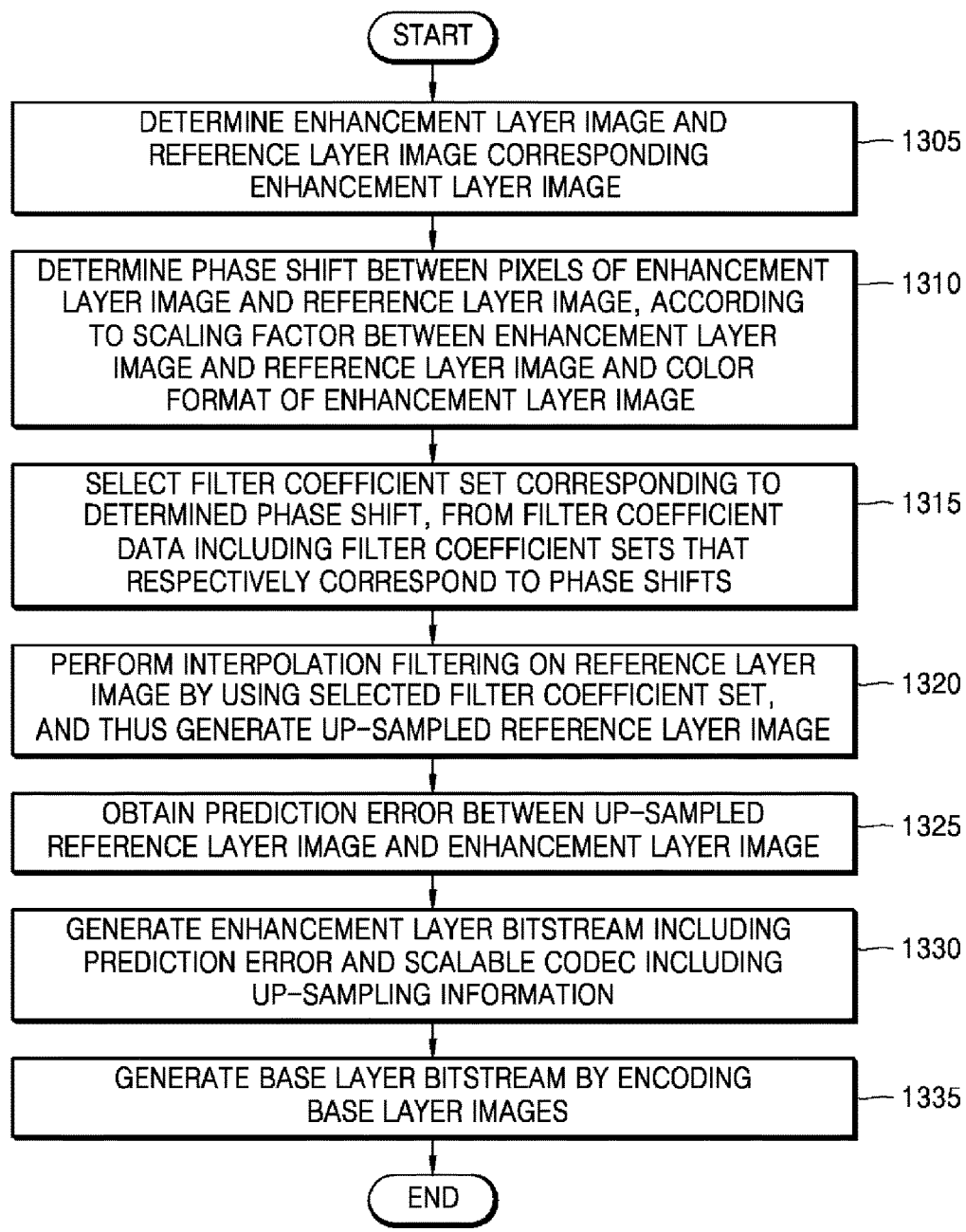
FIG. 13A illustrates a flowchart of a scalable video encoding method, according to various embodiments.

FIG. 13A illustrates a flowchart of a scalable video encoding method, according to various embodiments.

First, the base layer encoder 1210 may determine coding units having a tree structure on a low resolution image of a base layer sequence. The base layer encoder 1210 may perform intra or inter prediction on a prediction unit for each coding unit having the tree structure and may perform transformation and quantization for each transformation unit to encode samples of a coding unit. A base layer bitstream including base layer image encoding information generated by encoding a base layer image that is a low resolution image may be output.

In operation S1305, the enhancement layer encoder 1220 determines an enhancement layer image and a reference layer image from among base layer images which corresponds to the enhancement layer image.

In operation S1310, a phase shift between pixels of the enhancement layer image and the reference layer image is determined, according to a scaling factor between the enhancement layer image and the reference layer image and a color format of the enhancement layer image.

The filter selector 12 may determine the phase shift necessary for up-sampling filtering based on the scaling factor between the low resolution image processed by the base layer encoder 1210 and a high resolution image processed by the enhancement layer encoder 1220.

Also, according to the color format of the enhancement layer image, a phase shift between luma pixels of the enhancement layer image and the reference layer image is determined, and based on the phase shift between the luma pixels, a phase shift between chroma pixels of the enhancement layer image and the reference layer image may be determined.

In operation S1315, the filter selector 12 selects a filter coefficient set from the filter data storage unit 16 where a plurality of pieces of filter coefficient data are stored while corresponding to phase shifts, wherein the filter coefficient set corresponds to the phase shift determined in operation S1310. That is, the filter selector 12 may select a filter necessary for a current up-sampling ratio.

In operation S1320, the up-sampling unit 16 may perform filtering on a low resolution reconstruction image generated by the base layer encoder 1210 by using the up-sampling filter selected by the filter selector 12 and thus may generate an up-sampled reference layer image.

During an up-sampling process, a bit depth of pixels may be extended.

In operation S1325, the prediction error obtainer 1230 obtains a prediction error from the up-sampled reference layer image and the enhancement layer image.

In operation S1330, the enhancement layer encoder 1220 generates an enhancement layer bitstream by encoding the prediction error obtained by the prediction error obtainer 1230 and a scalable codec including the filter coefficient set selected by the filter selector 12.

In operation S1335, the base layer encoder 1210 generates a base layer bitstream by encoding the base layer images.

The up-sampling filter information may be recorded in a sequence parameter set (SPS), a picture parameter set (PPS), and a slice segment header.

The scalable video encoding apparatus 1200 according to various embodiments may include a central processor (not shown) that generally controls the base layer encoder 1210, the enhancement layer encoder 1220, the prediction error obtainer 1230, the filter selector 12, the up-sampling unit 14, and the filter data storage unit 16. Alternatively, the base layer encoder 1210, the enhancement layer encoder 1220, the prediction error obtainer 1230, the filter selector 12, the up-sampling unit 14, and the filter data storage unit 16 may operate by their respective processors (not shown), and the scalable video encoding apparatus 1200 may generally operate according to interactions of the processors (not shown). Alternatively, the base layer encoder 1210, the enhancement layer encoder 1220, the prediction error obtainer 1230, the filter selector 12, the up-sampling unit 14, and the filter data storage unit 16 may be controlled according to the control of an external processor (not shown) of the scalable video encoding apparatus 1200.

The scalable video encoding apparatus 1200 according to various embodiments may include one or more data storage units (not shown) in which input and output data of the base layer encoder 1210, the enhancement layer encoder 1220, the prediction error obtainer 1230, the filter selector 12, the up-sampling unit 14, and the filter data storage unit 16 is stored. The scalable video encoding apparatus 1200 may include a memory control unit (not shown) that observes data input and output of the data storage units (not shown).

The scalable video encoding apparatus 1200 according to various embodiments may operate in connection with an internal video encoding processor or an external video encoding processor so as to output video encoding results, thereby performing a video encoding operation including transformation. The internal video encoding processor of the scalable video encoding apparatus 1200 according to an embodiment may be implemented by a central processor a graphic processor as well as a separate processor.

Figure 12B:
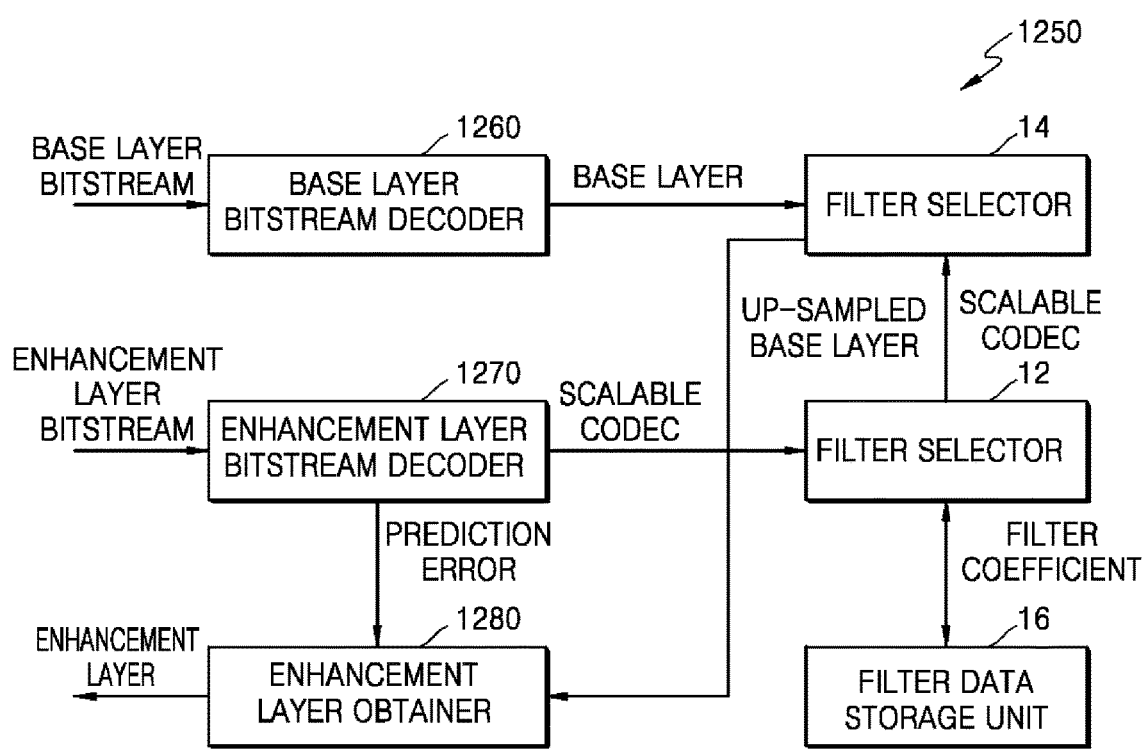
FIG. 12B illustrates a block diagram of a scalable video decoding apparatus, according to various embodiments.

FIG. 12B illustrates a block diagram of a scalable video decoding apparatus 1250, according to various embodiments.

The scalable video decoding apparatus 1250 according to various embodiments includes an inter layer SAO parameter obtainer 22, an inter layer offset determiner 24, a base layer bitstream decoder 1260, an enhancement layer bitstream decoder 1270, and an enhancement layer obtainer 1280.

The scalable video decoding apparatus 1250 according to various embodiments may receive bitstreams for each layer according to scalable encoding. The number of layers of the bitstreams received by the scalable video decoding apparatus 1250 is not limited. However, for convenience of description, hereinafter, an embodiment in which the base layer bitstream decoder 1260 of the scalable video decoding apparatus 1250 receives and decodes a base layer bitstream, and the enhancement layer bitstream decoder 1270 receives and decodes an enhancement layer bitstream. The enhancement layer obtainer 1280 obtains an enhancement layer, based on a base layer obtained by the base layer bitstream decoder 1260 and a prediction error and a scalable codec obtained by the enhancement layer bitstream decoder 1270.

The scalable video decoding apparatus 1250 based on spatial scalability may receive streams in which image sequences of different resolutions are encoded according to different layers. A low resolution image sequence may be reconstructed by decoding the base layer bitstream, and a high resolution image sequence may be reconstructed by decoding the enhancement layer bitstream.

In the presence of three or more enhancement layers, first enhancement layer images with respect to a first enhancement layer may be reconstructed from a first enhancement layer bitstream, and, if a second enhancement layer bitstream is further decoded, second enhancement layer images may be further reconstructed. If a Kth enhancement layer bitstream is further decoded from the first enhancement layer bitstream, Kth enhancement layer images may be further reconstructed.

For example, the scalable video decoding apparatus 1250 may obtain encoded data of base layer images and enhancement layer images from the base layer bitstream and the enhancement layer bitstream and may further obtain a motion vector generated through inter prediction and prediction information generated through inter layer prediction.

For example, the scalable video decoding apparatus 1250 may decode inter-predicted data for each layer and may decode inter layer-predicted data between a plurality of layers. Reconstruction may be performed through motion compensation and inter layer decoding based on a coding unit or a prediction unit according to an embodiment.

Motion compensation for a current image is performed by referring to reconstruction images predicted through inter prediction of a same layer on each layer stream, and thus images may be reconstructed. Motion compensation means an operation of synthesizing a reference image determined by using a motion vector of the current image and a residual of the current image and reconfiguring a reconstruction image of the current image.

The scalable video decoding apparatus 1250 according to an exemplary embodiment may perform inter-layer decoding with reference to base layer images so as to reconstruct an enhancement layer image predicted through inter-layer prediction. Inter-layer decoding means an operation of synthesizing a reference image of a different layer determined by using the disparity information of the current image and the residual of the current image and reconfiguring the reconstruction image of the current image.

The scalable video decoding apparatus 1250 according to an exemplary embodiment may perform inter-layer decoding for reconstructing the second enhancement layer images predicted with reference to the enhancement layer images. An inter layer prediction structure will be described in detail with reference to FIG. 13 at a later time.

The scalable video decoding apparatus 1250 decodes each image of a video for each block. A block according to an exemplary embodiment may include a largest coding unit, a coding unit, a prediction unit, a transformation unit, etc. among coding units according to a tree structure.

The base layer bitstream decoder 1260 may decode the base layer image by using encoding symbols of a parsed base layer image. If the scalable video decoding apparatus 1250 receives encoded streams based on coding units having a tree structure, the base layer bitstream decoder 1260 may perform decoding based on the coding units having the tree structure for each largest coding unit of the base layer bitstream.

The base layer bitstream decoder 1260 may perform entropy encoding for each largest coding unit and may obtain encoding information and encoded data. The base layer bitstream decoder 1260 may perform inverse quantization and inverse transformation on the encoded data obtained from streams to reconstruct a residual. The base layer bitstream decoder 1260 according to another embodiment may directly receive a bitstream of quantized transformation coefficients. A residual of the images may be reconstructed as a result of performing inverse quantization and inverse transformation on the quantized transformation coefficients.

The base layer bitstream decoder 1260 may reconstruct the base layer images by combining a prediction image and the residual through motion compensation between same layer images.

The enhancement layer bitstream decoder 1270 obtains a scalable codec and a prediction error by decoding the enhancement layer bitstream. The filter selector 12 selects filter coefficient data, based on the obtained scalable codec. The up-sampling unit 14 up-samples the base layer, according to the selected filter coefficient data. The enhancement layer obtainer 1280 obtains an enhancement layer, based on the prediction error obtained by the enhancement layer bitstream decoder 1270 and the up-sampled base layer image obtained by the up-sampling unit 14.

The base layer bitstream decoder 1260 according to various embodiments may obtain an SAO parameter from the base layer bitstream so as to compensate for an encoding error between a base layer original image and the base layer reconstruction image.

In more detail, the base layer bitstream decoder 1260 may perform inverse quantization and inverse transformation based on a transformation unit on encoded samples for the coding units having the tree structure of the base layer image and may reconstruct samples through decoding that performs intra prediction or motion compensation based on a prediction unit. The base layer bitstream decoder 1260 may reconstruct samples of each largest coding unit, thereby generating a reconstruction image. A reconstruction image of a previous slice segment may be referred to for inter prediction of a current slice segment. Thus, the reconstruction image of the previous slice segment may be used as a prediction image for the current slice segment.

The enhancement layer bitstream decoder 1270 may obtain enhancement layer encoding information from the enhancement layer bitstream. A prediction error between an enhancement layer prediction block and an enhancement layer original block, i.e. a residual, according to the inter layer prediction structure may be obtained from high resolution encoding information.

The enhancement layer obtainer 1280 according to various embodiments may perform inter layer prediction that reconstructs an enhancement layer image by using a reconstructed sample of a base layer image. The enhancement layer obtainer 1280 may use the enhancement layer prediction image generated by using the base layer reconstruction image as a reference image for inter layer prediction, in order to reconstruct the enhancement layer original image among the enhancement layer image sequences through the inter layer prediction structure.

The enhancement layer obtainer 1280 may perform inter layer prediction on the enhancement layer image for each block such as the coding unit or the prediction unit. A block of the base layer image to which a block of the enhancement layer image is to refer may be determined. For example, a reconstruction block of the base layer image positioned in correspondence to a position of a current block image in the enhancement layer image may be determined. The enhancement layer obtainer 1280 may determine the enhancement layer prediction block by using the base layer reconstruction block corresponding to the enhancement layer block.

The enhancement layer obtainer 1280 may use the enhancement layer prediction block determined by using the base layer reconstruction block according to the inter layer prediction structure as a reference image for inter layer prediction of the enhancement layer original block.

In order to determine the enhancement layer prediction image (block) by using the base layer reconstruction image (block) in the manner as described above, an up-sampling operation for expanding the base layer reconstruction image to a size of the enhancement layer image is necessary.

The scalable video decoding apparatus 1250 according to various embodiments may include the filter selector 12, the up-sampling unit 14, and the filter data storage unit 16 of the image up-sampling apparatus 10. Operations of the filter selector 12, the up-sampling unit 14, and the filter data storage unit 16 included in the scalable video decoding apparatus 1250 will be described in detail with reference to FIG. 12B below.

Figure 13B:
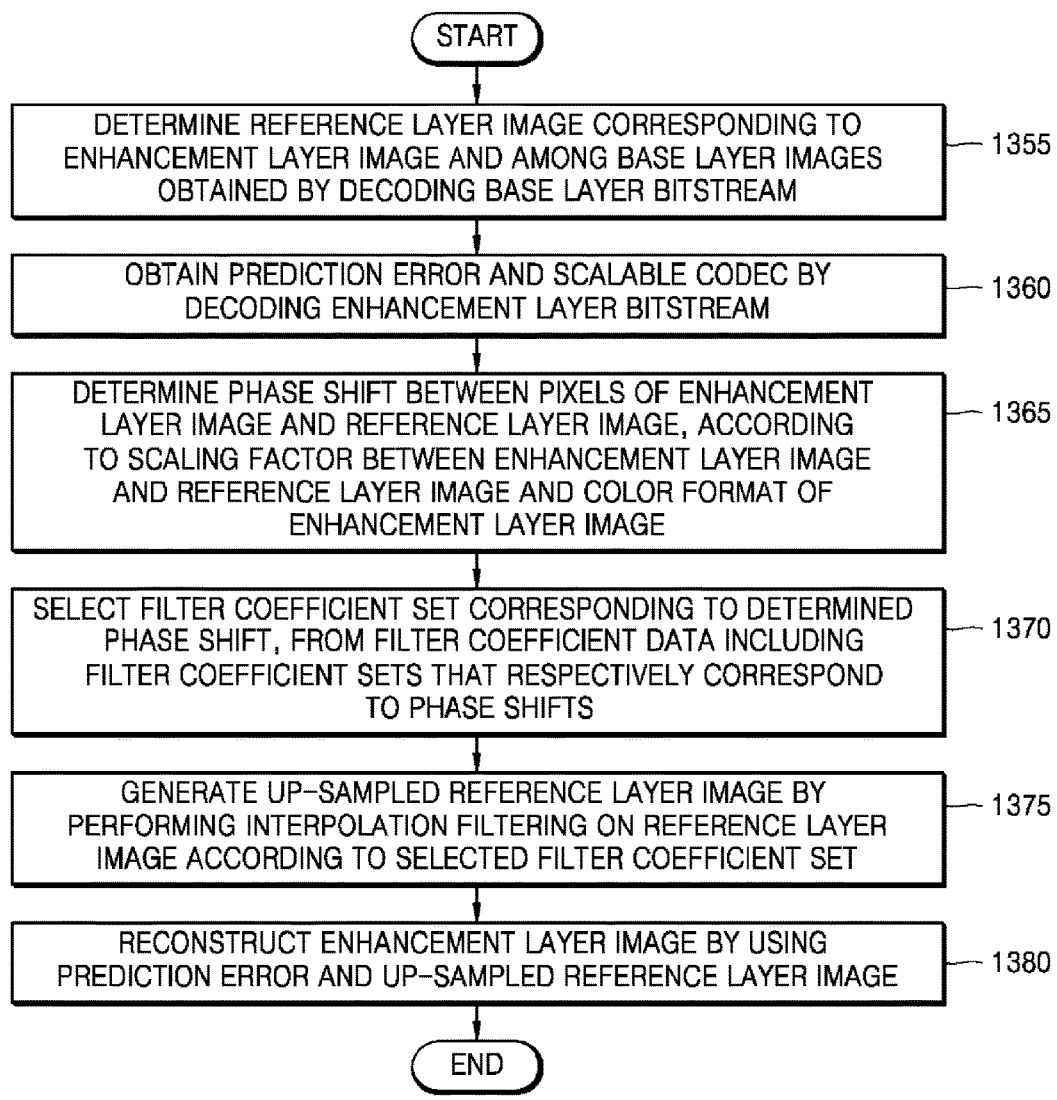
FIG. 13B illustrates a flowchart of a scalable video decoding method, according to various embodiment.

FIG. 13B illustrates a flowchart of a scalable video decoding method, according to various embodiment.

First, the base layer bitstream decoder 1260 may obtain base layer image encoding information from a base layer bitstream to determine coding units having a tree structure on a low resolution image of a base layer sequence.

The base layer bitstream decoder 1260 may parse symbols from encoding information for each coding unit, may perform inverse transformation and inverse quantization on the symbols based on a transformation unit, and may perform intra prediction or motion compensation based on a prediction unit to reconstruct each sample. Thus, the base layer bitstream decoder 1260 may generate a base layer image that is a low resolution reconstruction image.

In operation S1355, the base layer bitstream decoder 1260 reconstructs base layer images by decoding the base layer bitstream. Then, the enhancement layer obtainer 1280 determines a reference layer image from among the base layer images which corresponds to an enhancement layer.

In operation S1360, the enhancement layer bitstream decoder 1270 may decode an enhancement layer bitstream and thus may obtain enhancement layer encoding information including a prediction error between an up-sampled reference layer image and an enhancement layer original image, and a scalable codec including up-sampling information of the reference layer image.

Also, the enhancement layer bitstream decoder 1270 may transfer, to the filter selector 12, up-sampling filter information including information about a filter used to up-sample a high resolution image from a low resolution image. The up-sampling filter information may be obtained from an SPS, a PPS, and a slice segment header.

In operation S1365, a phase shift between pixels of the enhancement layer image and the reference layer image is determined, according to a scaling factor between the enhancement layer image and the reference layer image and a color format of the enhancement layer image.

Information about the scaling factor between the enhancement layer image and the base layer image and the color format of the enhancement layer image is included in the scalable codec.

In operation S1370, the filter selector 12 selects a filter coefficient set from the filter data storage unit 16 where a plurality of pieces of filter coefficient data are stored while corresponding to phase shifts, wherein the filter coefficient set corresponds to the phase shift determined in operation S1310. That is, the filter selector 12 may select a filter necessary for a current up-sampling ratio. Information about a filter coefficient set used in the scalable video encoding apparatus 1200 may be included in the scalable codec. Thus, the filter selector 12 may determine, based on the scalable codec, the filter coefficient set corresponding to the phase shift by using a lookup table stored in the filter data storage unit 16, thereby selecting a filter necessary for a current up-sampling ratio.

In operation S1375, the up-sampling unit 16 may perform filtering on the reference layer image reconstructed by the base layer bitstream decoder 1260 by using the up-sampling filter selected by the filter selector 12 and thus may generate the up-sampled reference layer image. During the up-sampling process, a bit depth of pixels may extend.

In operation S1380, the enhancement layer obtainer 1280 reconstructs the enhancement layer image by using the prediction error and an up-sampled base layer image.

The scalable video decoding apparatus 1250 according to various embodiments may include a central processor (not shown) that generally controls the base layer bitstream decoder 1260, the enhancement layer bitstream decoder 1270, the filter selector 12, the up-sampling unit 14, and the filter data storage unit 16. Alternatively, the base layer encoder 1260, the enhancement layer encoder 1270, the filter selector 12, the up-sampling unit 14, and the filter data storage unit 16 may operate by their respective processors (not shown), and the scalable video decoding apparatus 1250 may generally operate according to interactions of the processors (not shown). Alternatively, the base layer bitstream decoder 1260, the enhancement layer bitstream decoder 1270, the filter selector 12, the up-sampling unit 14, and the filter data storage unit 16 may be controlled according to the control of an external processor (not shown) of the scalable video decoding apparatus 1250.

The scalable video decoding apparatus 1250 according to various embodiments may include one or more data storage units (not shown) in which input and output data of the base layer bitstream decoder 1260, the enhancement layer bitstream decoder 1270, the filter selector 12, the up-sampling unit 14, and the filter data storage unit 16 is stored. The scalable video decoding apparatus 1250 may include a memory control unit (not shown) that observes data input and output of the data storage units (not shown).

The scalable video decoding apparatus 1250 according to various embodiments may operate in connection with an internal video encoding processor or an external video encoding processor so as to output video encoding results, thereby performing a video encoding operation including transformation. The internal video encoding processor of the scalable video decoding apparatus 1250 according to various embodiments may perform a video encoding operation as a separate processor. The scalable video decoding apparatus 1250, a central processor, or a graphic process may include a video encoding processing module, thereby performing a basic video restoring operation.

The scalable video encoding apparatus 1200 according to various embodiments described with reference to FIGS. 12A and 14A and the scalable video decoding apparatus 1250 according to various embodiments described with reference to FIGS. 12B and 14B may select an accurate up-sampling filter for inter layer prediction.

In order to accurately up-sample a resolution image of a base layer to generate a prediction image for a high resolution image of an enhancement layer, sampling positions according to a scalability ratio, i.e. an up-sampling ratio, may be different, and phase shifts between the sampling position and an original pixel position may be different. A filter coefficient for sample the sampling position of a predetermined phase shift may be specified.

Therefore, the scalable video encoding apparatus 1200 and the scalable video decoding apparatus 1250 store corresponding filter coefficient sets for phase shifts and select the filter coefficient sets for phase shifts necessary for a current scalability ratio when up-sampling a base layer reconstruction image to perform filtering, thereby determining a filter value of an accurate sampling position. Thus, an enhancement layer prediction image may be accurately generated from the base layer reconstruction image according to the scalability ratio. Therefore, inter layer prediction may be further accurately performed by using the accurately predicted enhancement layer image.

Hereinafter, with reference to FIG. 14, an inter layer prediction structure that may be implemented by the base layer encoder 1210, the enhancement layer encoder 1220, and the prediction error obtainer 1230 of the scalable video encoding apparatus 1200 according to various embodiments will now be described in detail.

Figure 14:
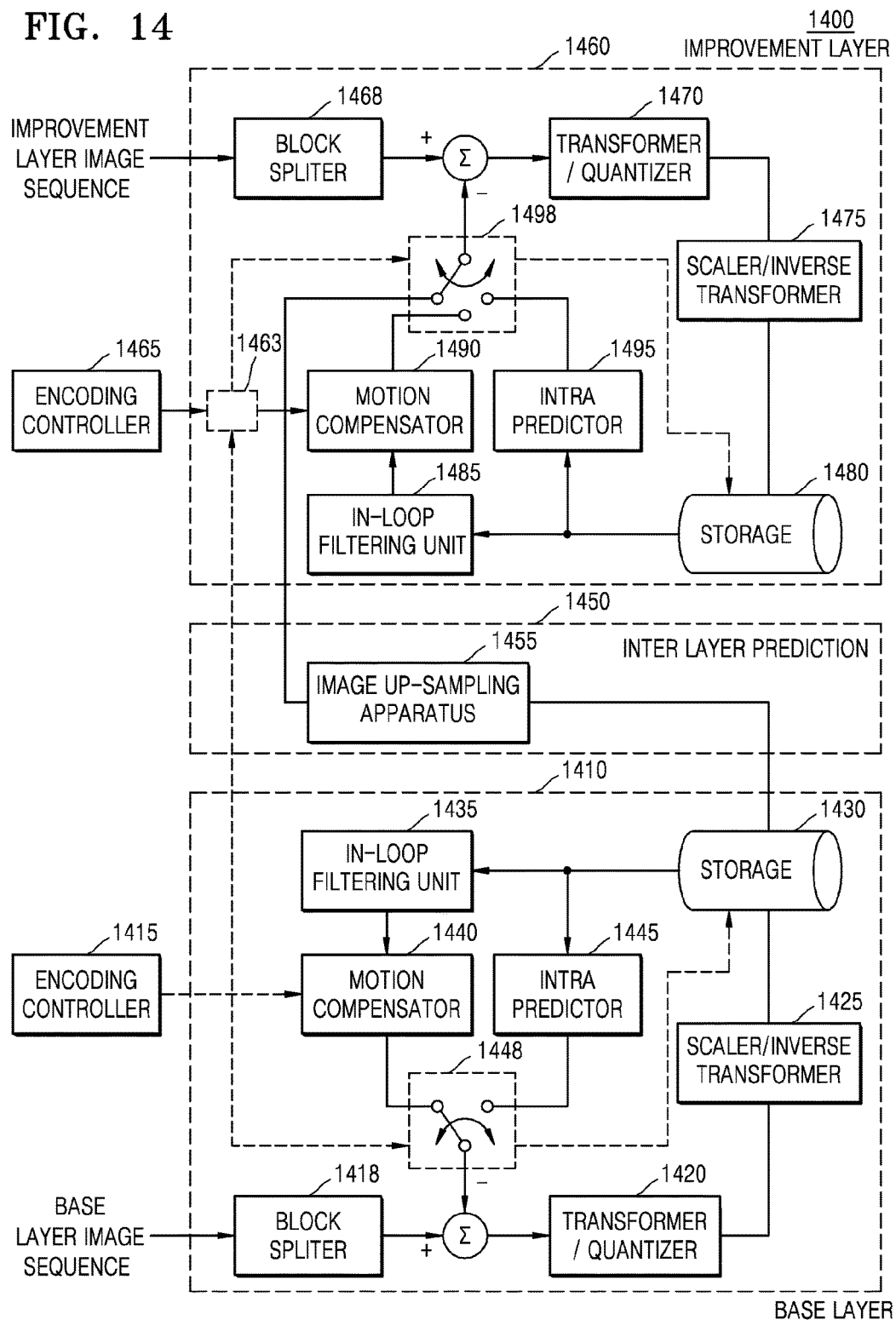
FIG. 14 illustrates a block diagram of a scalable video encoding system, according to various embodiments.

FIG. 14 illustrates a block diagram of a scalable video encoding system 1400, according to various embodiments.

The scalable video encoding system 1400 may include a base layer encoding end 1410, an improvement layer encoding end 1460, and an inter-layer prediction end 1450 between the base layer encoding end 1410 and the improvement layer encoding end 1460. The base layer encoding end 1410 and the improvement layer encoding end 1460 may be analyzed as detailed structures of the base layer encoder 1210 and the enhancement layer encoder 1220, respectively.

The base layer encoding end 1410 receives an input of a base layer image sequence and encodes each image of the base layer image sequence. The improvement layer encoding end 1460 receives an input of an improvement layer image sequence and encodes each image of the improvement layer image sequence. Redundant operations performed by both the base layer encoding end 1410 and the improvement layer encoding end 1460 will be concurrently described later.

Block splitters 1418 and 1468 split the input images (the low resolution image and the high resolution image) into largest coding units, coding units, prediction units, and transformation units. In order to encode the coding units output from the block splitters 1418 and 1468, intra prediction or inter prediction may be performed for each prediction unit of the coding units. Prediction switches 1448 and 1498 may perform inter prediction by referring to a previously reconstructed image output from motion compensators 1440 and 1490 or may perform intra prediction by using a neighboring prediction unit of a current prediction unit within a current input image output from intra predictors 1445 and 1495, according to whether a prediction mode of each prediction unit is an intra prediction mode or an inter prediction mode. Residual information may be generated for each prediction unit through inter prediction.

Residual information between the prediction units and peripheral images are input to transformers/quantizers 1420 and 1470 for each prediction unit of the coding units. The transformers/quantizers 1420 and 1470 may perform transformation and quantization for each transformation unit and output quantized transformation coefficients based on transformation units of the coding units.

Scalers/inverse transformers 1425 and 1475 may perform scaling and inverse transformation on the quantized coefficients for each transformation unit of the coding units again and generate residual information of a spatial domain. In a case where the prediction switches 1448 and 1498 is controlled to the inter mode, the residual information may be combined with the previous reconstructed image or the neighboring prediction unit so that a reconstructed image including the current prediction unit may be generated and a current reconstructed image may be stored in storage units 1430 and 1480. The current reconstructed image may be transferred to the intra predictors 1445 and 1495 and the motion compensators 1440 and 1490 again according to a prediction mode of a prediction unit that is to be encoded next.

In particular, in the inter mode, in-loop filters 1435 and 1485 may perform at least one of deblocking filtering and sample adaptive offset (SAO) operation for compensating for an encoding error between an original image and a reconstruction image on the current reconstructed image stored in the storage units 1430 and 1480 for each coding unit. At least one of the deblocking filtering and the SAO operation may be performed on at least one of the coding units, the prediction units included in the coding units, and the transformation units.

The deblocking filtering is filtering for reducing blocking artifact of data units. The SAO operation is filtering for compensating for a pixel value modified by data encoding and decoding. Data filtered by the in-loop filters 1435 and 1485 may be transferred to the motion compensators 1440 and 1490 for each prediction unit. In order to encode the coding unit having a next sequence that is output from the block splitters 1418 and 1468 again, residual information between the current reconstructed image and the next coding unit that are output from the motion compensators 1418 and 1468 and the block splitters 1418 and 1468 may be generated.

The above-described encoding operation for each coding unit of the input images may be repeatedly performed in the same manner as described above.

In addition, the improvement layer encoding end 1460 may refer to the reconstructed image stored in the storage unit 1430 of the base layer encoding end 1410 for the inter-layer prediction. An encoding controller 1415 of the base layer encoding end 1410 may control the storage unit 1430 of the base layer encoding end 1410 and transfer the reconstructed image of the base layer encoding end 1410 to the improvement layer encoding end 1460. The transferred base layer reconstruction image may be used as an improvement layer prediction image.

In a case where a base layer image and an improvement layer image have different resolutions, the image up-sampling apparatus 1455 may up-sample and transfer the base layer reconstructed image to the improvement layer encoding end 1460. Thus, the up-sampled base layer image may be used as the improvement layer prediction image. The image up-sampling apparatus 1455 may correspond to the image up-sampling apparatus 10 described with reference to FIGS. 1 through 13B.

In a case where an encoding controller 1465 of the improvement layer encoding end 1460 performs inter-layer prediction by controlling the switch 1498, an improvement layer image may be predicted by referring to base layer reconstruction image transferred through the inter-layer prediction end 1450.

For image encoding, diverse coding modes may be set for the coding units, prediction units, and transformation units. For example, a depth or a split flag may be set as a coding mode for the coding units. A prediction mode, a partition type, an intra direction flag, a reference list flag may be set as a coding mode for the prediction units. The transformation depth or the split flag may be set as a coding mode of the transformation units.

The base layer encoding end 1410 may determine a coding depth, a prediction mode, a partition type, an intra direction and reference list, and a transformation depth having the highest coding efficiency according to a result obtained by performing encoding by applying diverse depths for the coding units, diverse prediction modes for the prediction units, diverse partition types, diverse intra directions, diverse reference lists, and diverse transformation depths for the transformation units. However, the exemplary embodiments are not limited to the above-described coding modes determined by the base layer encoding end 1410.

The encoding controller 1415 of the base layer encoding end 1410 may control diverse coding modes to be appropriately applied to operations of elements. For inter layer encoding of the improvement layer encoding end 1460, the encoding controller 1415 may control the improvement layer encoding end 1460 to determine a coding mode or residual information by referring to the encoding result of the base layer encoding end 1410.

For example, the improvement layer encoding end 1460 may use the coding mode of the base layer encoding end 1410 as a coding mode of the improvement layer image or may determine the coding mode of the improvement layer image by referring to the coding mode of the base layer encoding end 1410. The encoding controller 1415 of the base layer encoding end 1410 may control a control signal of the encoding controller 1415 of the base layer encoding end 1410 and, to determine a current coding mode of the improvement layer encoding end 1460, may use the current coding mode based on the coding mode of the base layer encoding end 1410.

In particular, the improvement layer encoding end 1460 according to an embodiment may encode an inter layer prediction error by using an SAO parameter. Thus, a prediction error between an improvement layer prediction image determined from the base layer reconstruction image and an improvement layer reconstruction image may be encoded as an offset of the SAO parameter.

Similarly to the scalable video encoding system 1400 according to the inter-layer prediction method of FIG. 14, a scalable video decoding system according to the inter-layer prediction method may be also implemented. That is, the scalable video decoding system may receive a base layer bitstream and an improvement layer bitstream. A base layer decoding end of the scalable video decoding system may decode the base layer bitstream to generate base layer reconstruction images. An improvement layer decoding end of the scalable video decoding system may decode the improvement layer bitstream by using the base layer reconstruction image and parsed encoding information to generate improvement layer reconstruction images.

If the encoder 12 of the scalable video decoding apparatus 1200 according to various embodiments perform inter layer prediction, the decoder 26 of the scalable video decoding apparatus 1250 may also reconstruct multilayer images according to the above described scalable video decoding system.

As described above, in the scalable video encoding apparatus 1200 according to an embodiment and the scalable video decoding apparatus 1250 according to an embodiment, blocks obtained by splitting video data are split into coding units according to a tree structure, and coding units, prediction units, and transformation units are used for inter-layer prediction or inter prediction for a coding unit. Hereinafter, with reference to FIGS. 15A through 25, a method and apparatus for encoding a video and a method and apparatus for decoding a video, based on a coding unit and a transformation unit according to a tree structure will be described.

In principle, during encoding/decoding for multi-layer video, encoding/decoding processes for base layer images and encoding/decoding processes for enhancement layer images are separately performed. That is, when inter-layer prediction is performed on a multi-layer video, encoding/decoding results of a single-layer video are referred to each other, but separate encoding/decoding processes are performed for respective single-layer videos.

Therefore, for convenience of description, since a video encoding process and a video decoding process based on a coding unit according to a tree structure, which will be described with reference to FIGS. 15A through 25, are performed on a single-layer video, only inter prediction and motion compensation will be described. However, as described with reference to FIGS. 12A through 14, inter-layer prediction and compensation between base layer images and enhancement layer images are performed to encode/decode a video stream.

Figure 15A:
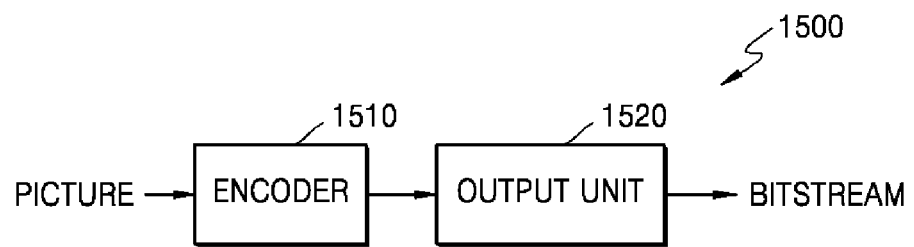
FIG. 15A illustrates a block diagram of a video encoding apparatus based on a coding unit having a tree structure, according to various embodiments.

When the encoder 12 of the scalable video encoding apparatus 1200 encodes a multi-layer video based on a coding unit according to a tree structure, in order to encode a video for each respective single-view video, the scalable video encoding apparatus 1200 includes as many video encoding apparatuses 1500 of FIG. 15A as the number of layers of the multi-layer video in order to encode a video such that each video encoding apparatus 1500 may be controlled to encode an assigned single-layer video. In addition, the scalable video encoding apparatus 1250 may perform inter-view prediction by using the encoding results of separate single-views of each video encoding apparatus 1500. Thus, the encoder 12 of the scalable video encoding apparatus 1250 may generate a base layer video stream and an improvement layer video stream, in which the encoding results for respective layers are recorded, for each respective hierarchy.

Figure 15B:
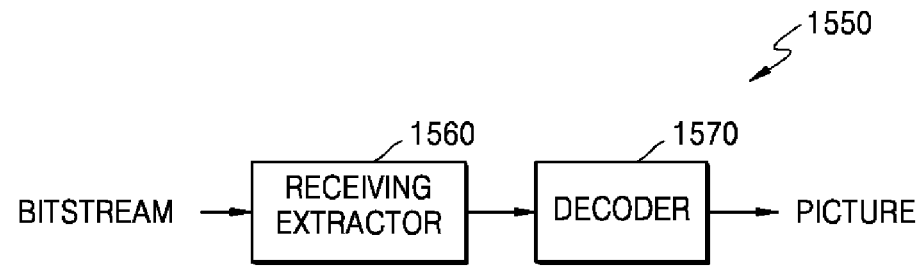
FIG. 15B illustrates a block diagram of a video decoding apparatus based on a coding unit having a tree structure, according to various embodiments.

Similarly, when the decoder 26 of the scalable video decoding apparatus 1250 according to an embodiment decodes a multi-layer video based on a coding unit according to a tree structure, in order to decode the received base layer video stream and improvement layer video stream for each respective layer, the scalable video decoding apparatus 1250 may include as many video decoding apparatuses 1550 of FIG. 15B as the number of layers of the multi-view video and the video decoding apparatuses 1550 may be controlled to perform decoding on single-layer videos that are respectively assigned to the video decoding apparatuses 1550. In addition, the scalable video decoding apparatus 1250 may perform inter-view compensation by using the decoding result of separate single-layer of each video decoding apparatuses 1550. Thus, the scalable video decoding apparatus 1250 may generate base layer reconstruction images and enhancement layer images, which are restored for respective layers.

FIG. 15A illustrates a block diagram of a video encoding apparatus based on a coding unit having a tree structure 1500, according to various embodiments.

The video encoding apparatus via video prediction based on a coding unit according to a tree structure 1500 includes an encoder 1510 and an output unit 1520. Hereinafter, for convenience of description, the video encoding apparatus that uses video prediction based on a coding unit according to a tree structure 1500 is referred to as 'the video encoding apparatus 1500'.

The encoder 1510 may split a current picture based on a largest coding unit for the current picture. If the current picture is larger than the largest coding unit, image data of the current picture may be split into the at least one largest coding unit. The largest coding unit according to an exemplary embodiment may be a data unit having a size of 32×32, 64×64, 128×128, 256×256, etc., wherein a shape of the data unit is a square having a width and length in squares of 2.

A coding unit according to an exemplary embodiment may be characterized by a maximum size and a depth. The depth denotes a number of times the coding unit is spatially split from the largest coding unit, and as the depth deepens, deeper coding units according to depths may be split from the largest coding unit to a smallest coding unit. A depth of the largest coding unit may be an uppermost depth and the smallest coding unit may be a lowermost coding unit. Since a size of a coding unit corresponding to each depth decreases as the depth of the largest coding unit deepens, a coding unit corresponding to an upper depth may include a plurality of coding units corresponding to lower depths.

As described above, the image data of the current picture is split into the largest coding units according to a maximum size of the coding unit, and each of the largest coding units may include deeper coding units that are split according to depths. Since the largest coding unit according to an exemplary embodiment is split according to depths, the image data of a spatial domain included in the largest coding unit may be hierarchically classified according to depths.

A maximum depth and a maximum size of a coding unit, which limit the total number of times a height and a width of the largest coding unit are hierarchically split may be predetermined.

The encoder 1510 encodes at least one split region obtained by splitting a region of the largest coding unit according to depths, and determines a depth to output finally encoded image data according to the at least one split region. That is, the encoder 1510 determines a coded depth by encoding the image data in the deeper coding units according to depths, according to the largest coding unit of the current picture, and selecting a depth having the least encoding error. Thus, the encoded image data of the coding unit corresponding to the determined coded depth is finally output. Also, the coding units corresponding to the coded depth may be regarded as encoded coding units. The determined coded depth and the encoded image data according to the determined coded depth are output to the output unit 1520.

The image data in the largest coding unit is encoded based on the deeper coding units corresponding to at least one depth equal to or below the maximum depth, and results of encoding the image data are compared based on each of the deeper coding units. A depth having the least encoding error may be selected after comparing encoding errors of the deeper coding units. At least one coded depth may be selected for each largest coding unit.

The size of the largest coding unit is split as a coding unit is hierarchically split according to depths, and as the number of coding units increases. Also, even if coding units correspond to the same depth in one largest coding unit, it is determined whether to split each of the coding units corresponding to the same depth to a lower depth by measuring an encoding error of the image data of the each coding unit, separately. Accordingly, even when image data is included in one largest coding unit, the image data is split into regions according to the depths and the encoding errors may differ according to regions in the one largest coding unit, and thus the coded depths may differ according to regions in the image data. Thus, one or more coded depths may be determined in one largest coding unit, and the image data of the largest coding unit may be divided according to coding units of at least one coded depth.

Accordingly, the encoder 1510 may determine coding units having a tree structure included in the largest coding unit. The 'coding units having a tree structure' according to an embodiment include coding units corresponding to a depth determined to be the coded depth, from among all deeper coding units included in the largest coding unit. A coding unit of a coded depth may be hierarchically determined according to depths in the same region of the largest coding unit, and may be independently determined in different regions. Likewise, a coded depth in a current region may be independently determined from a coded depth in another region.

A maximum depth according to an embodiment is an index related to the number of times splitting is performed from a largest coding unit to a smallest coding unit. A maximum depth according to an embodiment may denote the total number of times splitting is performed from the largest coding unit to the smallest coding unit. For example, when a depth of the largest coding unit is 0, a depth of a coding unit, in which the largest coding unit is split once, may be set to 1, and a depth of a coding unit, in which the largest coding unit is split twice, may be set to 2. Here, if the smallest coding unit is a coding unit in which the largest coding unit is split four times, 5 depth levels of depths 0, 1, 2, 3 and 4 exist, and thus the maximum depth may be set to 4.

Prediction encoding and transformation may be performed according to the largest coding unit. The prediction encoding and the transformation are also performed based on the deeper coding units according to a depth equal to or depths less than the maximum depth, according to the largest coding unit. Transformation may be performed according to a method of orthogonal transformation or integer transformation.

Since the number of deeper coding units increases whenever the largest coding unit is split according to depths, encoding including the prediction encoding and the transformation is performed on all of the deeper coding units generated as the depth deepens. Hereinafter, for convenience of description, the prediction encoding and the transformation will now be described based on a coding unit of a current depth, in a largest coding unit.

The video encoding apparatus 1500 according to an embodiment may variously select a size or shape of a data unit for encoding the image data. In order to encode the image data, operations, such as prediction encoding, transformation, and entropy encoding, are performed, and at this time, the same data unit may be used for all operations or different data units may be used for each operation.

For example, the video encoding apparatus 1500 may select not only a coding unit for encoding the image data, but also a data unit different from the coding unit so as to perform the prediction encoding on the image data in the coding unit.

In order to perform prediction encoding on the largest coding unit, the prediction encoding may be performed based on a coding unit corresponding to a coded depth, i.e., based on a coding unit that is no longer split into coding units corresponding to a lower depth. Hereinafter, the coding unit that is no longer split and becomes a basis unit for prediction encoding will now be referred to as a 'prediction unit'. A partition obtained by splitting the prediction unit may include a prediction unit or a data unit obtained by splitting at least one of a height and a width of the prediction unit. The partition is a data unit obtained by dividing the prediction unit of the coding unit and the prediction unit may be a partition having the same size as the coding unit.

For example, when a coding unit of 2N×2N (where N is a positive integer) is no longer split and becomes a prediction unit of 2N×2N, a size of a partition may be 2N×2N, 2N×N, N×2N, or N×N. Examples of a partition type include symmetrical partitions that are obtained by symmetrically splitting a height or width of the prediction unit, partitions obtained by asymmetrically splitting the height or width of the prediction unit, such as 1:n or n:1, partitions that are obtained by geometrically splitting the prediction unit, and partitions having arbitrary shapes.

A prediction mode of the prediction unit may be at least one of an intra mode, a inter mode, and a skip mode. For example, the intra mode or the inter mode may be performed on the partition of 2N×2N, 2N×N, N×2N, or N×N. Also, the skip mode may be performed only on the partition of 2N×2N. The encoding is independently performed on one prediction unit in a coding unit, thereby selecting a prediction mode having a least encoding error.

Also, the video encoding apparatus 1500 according to an embodiment may also perform the transformation on the image data in a coding unit based not only on the coding unit for encoding the image data, but also based on a transformation unit that is different from the coding unit. In order to perform the transformation in the coding unit, the transformation may be performed based on a data unit having a size smaller than or equal to the coding unit. For example, the transformation unit for the transformation may include a transformation unit for an intra mode and a data unit for an inter mode.

Similarly to the coding unit according to the tree structure according to the present embodiment, the transformation unit in the coding unit may be recursively split into smaller sized regions and residual data in the coding unit may be divided according to the transformation having the tree structure according to transformation depths.

According to an exemplary embodiment, the transformation unit of the coding unit is obtained by splitting the height and width of the coding unit and a transformation depth indicating the number of times splitting is performed may also be set in the transformation unit. For example, when the size of a transformation unit of a current coding unit is 2N×2N, a transformation depth may be set to 0. When the size of a transformation unit is N×N, the transformation depth may be set to 1. In addition, when the size of the transformation unit is N/2×N/2, the transformation depth may be set to 2. That is, the transformation unit according to the tree structure may also be set according to the transformation depth.

Encoding information according to coding units corresponding to a coded depth requires not only information about the coded depth, but also about information related to prediction encoding and transformation. Accordingly, the encoder 1510 not only determines a coded depth having a least encoding error, but also determines a partition type in a prediction unit, a prediction mode according to prediction units, and a size of a transformation unit for transformation.

Coding units and a prediction unit/partition according to a tree structure in a largest coding unit, and a method of determining a transformation unit, according to an embodiment, will be described in detail with reference to FIGS. 15 through 24.

The encoder 1510 may measure an encoding error of deeper coding units according to depths by using Rate-Distortion Optimization based on Lagrangian multipliers.

The output unit 1520 outputs the image data of the largest coding unit, which is encoded based on the at least one coded depth determined by the encoder 1510, and information about the encoding mode according to the coded depth, in bitstreams.

The encoded image data may be obtained by encoding residual data of an image.

The information about the encoding mode according to the coded depth may include information about the coded depth, the partition type in the prediction unit, the prediction mode, and the size of the transformation unit.

The information about the coded depth may be defined by using split information according to depths, which indicates whether encoding is performed on coding units of a lower depth instead of a current depth. If the current depth of the current coding unit is the coded depth, image data in the current coding unit is encoded and output, and thus the split information may be defined not to split the current coding unit to a lower depth. On the other hand, if the current depth of the current coding unit is not the coded depth, the encoding is performed on the coding unit of the lower depth, and thus the split information may be defined to split the current coding unit to obtain the coding units of the lower depth.

If the current depth is not the coded depth, encoding is performed on the coding unit that is split into the coding unit of the lower depth. Since at least one coding unit of the lower depth exists in one coding unit of the current depth, the encoding is repeatedly performed on each coding unit of the lower depth, and thus the encoding may be recursively performed for the coding units having the same depth.

Since the coding units having a tree structure are determined for one largest coding unit, and information about at least one encoding mode is determined for a coding unit of a coded depth, information about at least one encoding mode may be determined for one largest coding unit. Also, a coded depth of the image data of the largest coding unit may be different according to locations since the image data is hierarchically split according to depths, and thus information about the coded depth and the encoding mode may be set for the image data.

Accordingly, the output unit 1520 may assign encoding information about a corresponding coded depth and an encoding mode to at least one of the coding unit, the prediction unit, and a minimum unit included in the largest coding unit.

The minimum unit according to an embodiment is a rectangular data unit obtained by splitting the smallest coding unit constituting the lowermost depth by 4. Alternatively, the minimum unit may be a maximum rectangular data unit having a maximum size, which is included in all of the coding units, prediction units, partition units, and transformation units included in the largest coding unit.

For example, the encoding information output through the output unit 1520 may be classified into encoding information according to coding units, and encoding information according to prediction units. The encoding information according to the coding units may include the information about the prediction mode and about the size of the partitions. The encoding information according to the prediction units may include information about an estimated direction of an inter mode, about a reference image index of the inter mode, about a motion vector, about a chroma component of an intra mode, and about an interpolation method of the intra mode.

Also, information about a maximum size of the coding unit defined according to pictures, slices, or GOPs, and information about a maximum depth may be inserted into a header of a bitstream, a sequence parameter set (SPS) or a picture parameter set (PPS).

In addition, information about a maximum size of a transformation unit and information about a minimum size of a transformation, which are acceptable for a current video may also be output via a header of a bitstream, an SPS or a PPS. The output unit 1520 may encode and output reference information, prediction information, and information about a slice type, which are related to prediction.

According to a simplest embodiment of the video encoding apparatus 1500, the deeper coding unit may be a coding unit obtained by dividing a height or width of a coding unit of an upper depth, which is one level higher than the current depth, by two. That is, when the size of the coding unit of the current depth is 2N×2N, the size of the coding unit of the lower depth is N×N. Also, the coding unit of the current depth having the size of 2N×2N may include a maximum value 4 of the coding unit of the lower depth.

Accordingly, the video encoding apparatus 1500 may form the coding units having the tree structure by determining coding units having an optimum shape and an optimum size for each largest coding unit, based on the size of the largest coding unit and the maximum depth determined considering characteristics of the current picture. Also, since encoding may be performed on each largest coding unit by using any one of various prediction modes and transformations, an optimum encoding mode may be determined considering characteristics of the coding unit of various image sizes.

Thus, if an image having high resolution or large data amount is encoded in a conventional macroblock, a number of macroblocks per picture excessively increases. Accordingly, a number of pieces of compressed information generated for each macroblock increases, and thus it is difficult to transmit the compressed information and data compression efficiency decreases. However, by using the video encoding apparatus 100, image compression efficiency may be increased since a coding unit is adjusted while considering characteristics of an image while increasing a maximum size of a coding unit while considering a size of the image.

The scalable video encoding apparatus 1100 described with reference to FIG. 11A may include as many video encoding apparatuses 1500 as the number of layers in order to encode single-layer images for respective layers of a multi-layer video. For example, the base layer encoder 12 may include a single video encoding apparatus 1500 and the enhancement layer encoder 14 may include as many video encoding apparatuses 1500 as the number of additional views.

When the video encoding apparatus 1500 encodes base layer images, the encoder 1510 may determine a prediction unit for inter prediction for each respective coding unit according to a tree structure for each largest coding unit and may perform inter prediction for each respective prediction unit.

When the video encoding apparatus 1500 encodes enhancement layer images, the encoder 1510 may also determine a prediction unit and a coding unit according to a tree structure for each largest coding unit and may perform inter prediction for each respective prediction unit.

The video encoding apparatus 1500 may encode an inter layer prediction error for predicting an improvement layer image by using an SAO. Thus, a prediction error of the improvement layer image may be encoded by using information regarding an SAO type and an offset based on a sample value distribution of the prediction error without having to encoding the prediction error for each pixel position.

FIG. 15B illustrates a block diagram of a video decoding apparatus based on a coding unit having a tree structure 1550, according to various embodiments.

The video decoding apparatus based on the coding unit according to the tree structure 1550 includes a receiver 210, an image data and encoding information receiving extractor 1560, and a decoder 1570. Hereinafter, for convenience of description, the video decoding apparatus using video prediction based on a coding unit according to a tree structure 1550 will be referred to as the 'video decoding apparatus 1550'.

Definitions of various terms, such as a coding unit, a depth, a prediction unit, a transformation unit, and information about various encoding modes, for decoding operations of the video decoding apparatus 1550 are identical to those described with reference to FIG. 8 and the video encoding apparatus 1500.

The receiving extractor 1560 receives and parses a bitstream of an encoded video. The image data and encoding information receiving extractor 1560 extracts encoded image data for each coding unit from the parsed bitstream, wherein the coding units have a tree structure according to each largest coding unit, and outputs the extracted image data to the decoder 1570. The image data and encoding information receiving extractor 1560 may extract information about a maximum size of a coding unit of a current picture, from a header about the current picture, an SPS, or a PPS.

Also, the image data and encoding information receiving extractor 1560 extracts information about a coded depth and an encoding mode for the coding units having a tree structure according to each largest coding unit, from the parsed bitstream. The extracted information about the coded depth and the encoding mode is output to the decoder 1570. That is, the image data in a bitstream is split into the largest coding unit so that the decoder 1570 decodes the image data for each largest coding unit.

The information about the coded depth and the encoding mode according to the largest coding unit may be set for information about at least one coding unit corresponding to the coded depth, and information about an encoding mode may include information about a partition type of a corresponding coding unit corresponding to the coded depth, about a prediction mode, and a size of a transformation unit. Also, splitting information according to depths may be extracted as the information about the coded depth.

The information about the coded depth and the encoding mode according to each largest coding unit extracted by the image data and encoding information receiving extractor 1560 is information about a coded depth and an encoding mode determined to generate a minimum encoding error when an encoder, such as the video encoding apparatus 1500 according to an embodiment, repeatedly performs encoding for each deeper coding unit according to depths according to each largest coding unit. Accordingly, the video decoding apparatus 1550 may restore an image by decoding the image data according to a coded depth and an encoding mode that generates the minimum encoding error.

Since encoding information about the coded depth and the encoding mode according to an embodiment may be assigned to a predetermined data unit from among a corresponding coding unit, a prediction unit, and a minimum unit, the image data and encoding information receiving extractor 1560 may extract the information about the coded depth and the encoding mode according to the predetermined data units. The predetermined data units to which the same information about the coded depth and the encoding mode is assigned may be inferred to be the data units included in the same largest coding unit.

The decoder 1570 restores the current picture by decoding the image data in each largest coding unit based on the information about the coded depth and the encoding mode according to the largest coding units. That is, the decoder 1570 may decode the encoded image data based on the extracted information about the partition type, the prediction mode, and the transformation unit for each coding unit from among the coding units having the tree structure included in each largest coding unit. A decoding process may include prediction including intra prediction and motion compensation, and inverse transformation. Inverse transformation may be performed according to a method of inverse orthogonal transformation or inverse integer transformation.

The decoder 1570 may perform intra prediction or motion compensation according to a partition and a prediction mode of each coding unit, based on the information about the partition type and the prediction mode of the prediction unit of the coding unit according to coded depths.

In addition, the decoder 1570 may read transformation unit information according to a tree structure for each coding unit so as to determine transform units for each coding unit and perform inverse transformation based on transformation units for each coding unit for each largest coding unit. Via the inverse transformation, a pixel value of a spatial region of the coding unit may be restored.

The decoder 1570 may determine at least one coded depth of a current largest coding unit by using split information according to depths. If the split information indicates that image data is no longer split in the current depth, the current depth is a coded depth. Accordingly, the decoder 1570 may decode encoded data of at least one coding unit corresponding to each coded depth in the current largest coding unit by using the information about the partition type of the prediction unit, the prediction mode, and the size of the transformation unit for each coding unit corresponding to the coded depth, and output the image data of the current largest coding unit.

That is, data units containing the encoding information including the same split information may be gathered by observing the encoding information set assigned for the predetermined data unit from among the coding unit, the prediction unit, and the minimum unit, and the gathered data units may be considered to be one data unit to be decoded by the decoder 1570 in the same encoding mode. For each coding unit determined as described above, information about an encoding mode may be obtained so as to decode the current coding unit.

The scalable video decoding apparatus 1250 described with reference to FIG. 12B may include as many video decoding apparatuses 1550 as the number of views in order to decode the received base layer image stream and improvement layer image stream to restore base layer images and enhancement layer images.

When a base layer image stream is received, the decoder 1570 of the video decoding apparatus 1550 may split samples of base view images that are extracted from the base view image stream by the image data and encoding information receiving extractor 1560 into coding units according to a tree structure of a largest coding unit. The decoder 1570 may perform motion compensation on respective prediction units for inter prediction for each respective coding unit according to a tree structure of the samples of the base view images, to restore the base view images.

When an enhancement layer image stream is received, the decoder 1570 of the video decoding apparatus 1550 may split samples of additional view images that are extracted from the additional layer image stream by the receiving extractor 1560 into coding units according to a tree structure of a largest coding unit. The decoder 1570 may perform motion compensation on respective prediction units for inter prediction of the samples of the additional view images to restore the additional view images.

The receiving extractor 1560 may obtain an SAO type and an offset from the received enhancement layer bitstream and determine an SAO category according to a distribution of sample values for each pixel of an enhancement layer prediction image, thereby obtaining an offset for each SAO category by using the SAO type and the offset. Thus, the decoder 1570 may compensate for an offset of a corresponding category for each pixel of the enhancement layer prediction image without receiving a prediction error for each pixel, and may determine an enhancement layer reconstruction image by referring to the compensated enhancement layer prediction image.

The video decoding apparatus 1550 may obtain information about at least one coding unit that generates the minimum encoding error when encoding is recursively performed for each largest coding unit, and may use the information to decode the current picture. That is, the coding units having the tree structure determined to be the optimum coding units in each largest coding unit may be decoded. Also, the maximum size of a coding unit is determined considering a resolution and an amount of image data.

Accordingly, even if image data has high resolution and a large amount of data, the image data may be efficiently decoded and restored by using a size of a coding unit and an encoding mode, which are adaptively determined according to characteristics of the image data, by using information about an optimum encoding mode received from an encoder.

Figure 16:
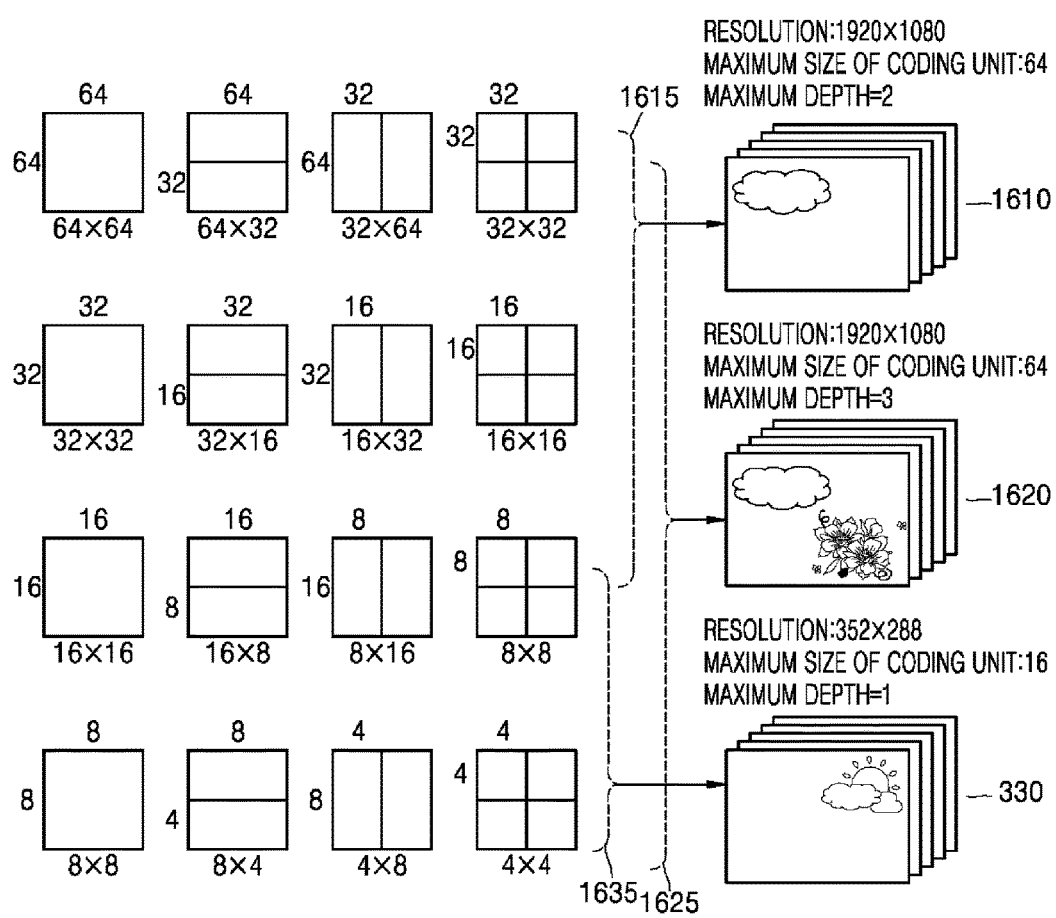
FIG. 16 illustrates a diagram for describing a concept of coding units, according to various embodiments.

FIG. 16 illustrates a diagram for describing a concept of coding units, according to various embodiments.

A size of a coding unit may be expressed in width×height, and may be 64×64, 32×32, 16×16, and 8×8. A coding unit of 64×64 may be split into partitions of 64×64, 64×32, 32×64, or 32×32, a coding unit of 32×32 may be split into partitions of 32×32, 32×16, 16×32, or 16×16, a coding unit of 16×16 may be split into partitions of 16×16, 16×8, 8×16, or 8×8, and a coding unit of 8×8 may be split into partitions of 8×8, 8×4, 4×8, or 4×4.

In video data 1610, a resolution is 1920×1080, a maximum size of a coding unit is 64, and a maximum depth is 2. In video data 1620, a resolution is 1920×1080, a maximum size of a coding unit is 64, and a maximum depth is 3. In video data 1630, a resolution is 352×288, a maximum size of a coding unit is 16, and a maximum depth is 1. The maximum depth shown in FIG. 15 denotes a total number of splits from a largest coding unit to a minimum decoding unit.

If a resolution is high or a data amount is large, a maximum size of a coding unit may be large so as to not only increase encoding efficiency but also to accurately reflect characteristics of an image. Accordingly, the maximum size of the coding unit of the video data 1610 and 320 having a higher resolution than the video data 1630 may be selected as 64.

Since the maximum depth of the video data 1610 is 2, coding units 1615 of the video data 1610 may include a largest coding unit having a long axis size of 64, and coding units having long axis sizes of 32 and 16 since depths are deepened to two layers by splitting the largest coding unit twice. On the other hand, since the maximum depth of the video data 1630 is 1, coding units 1635 of the video data 1630 may include a largest coding unit having a long axis size of 16, and coding units having a long axis size of 8 since depths are deepened to one layer by splitting the largest coding unit once.

Since the maximum depth of the video data 1620 is 3, coding units 1625 of the video data 1620 may include a largest coding unit having a long axis size of 64, and coding units having long axis sizes of 32, 16, and 8 since the depths are deepened to 3 layers by splitting the largest coding unit three times. As a depth deepens, detailed information may be precisely expressed.

Figure 17A:
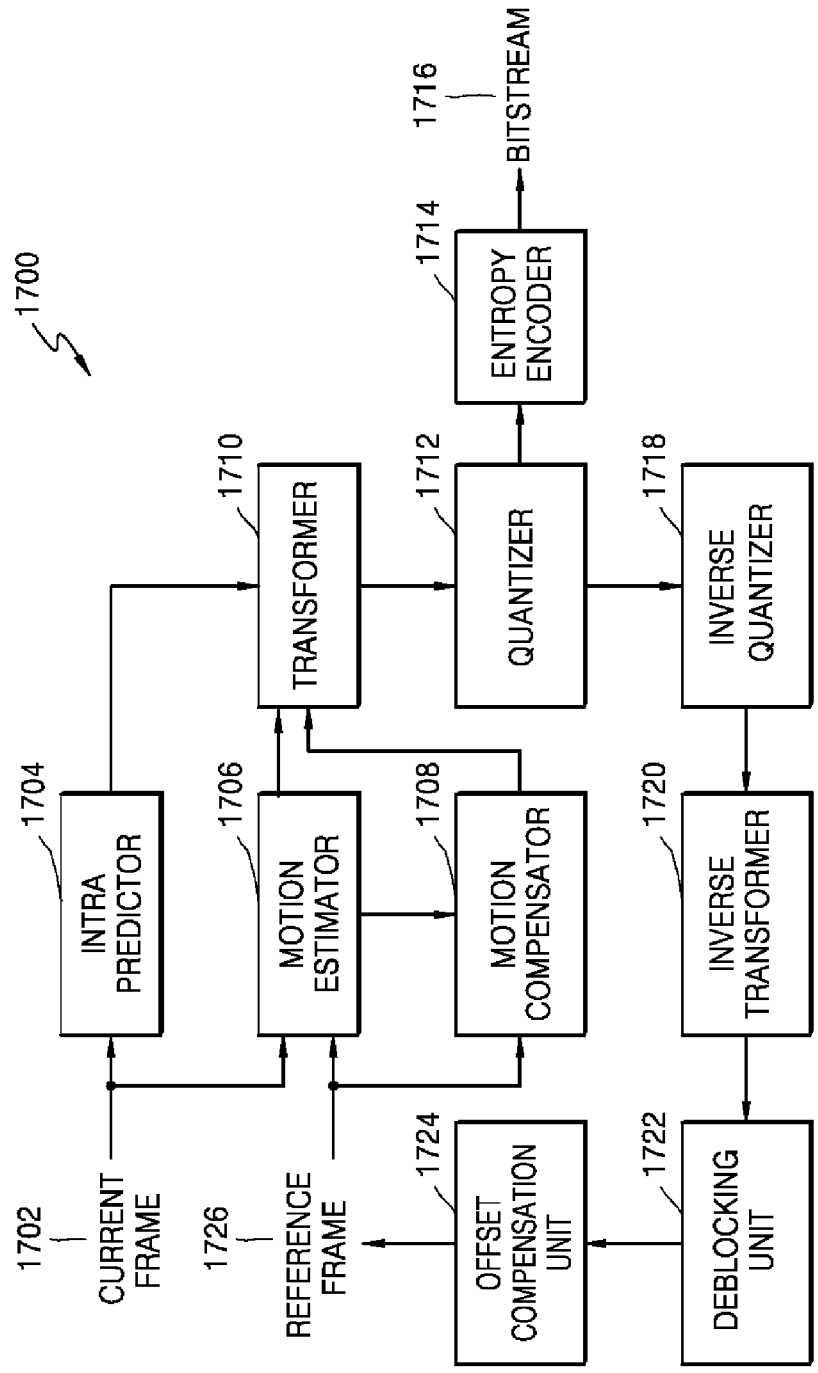
FIG. 17A illustrates a block diagram of an image encoder based on coding units, according to various embodiments.

FIG. 17A illustrates a block diagram of an image encoder 1700 based on coding units, according to various embodiments.

The image encoder 1700 according to an embodiment performs operations of the encoder 1610 of the video encoding apparatus 1600 to encode image data. That is, an intra predictor 1704 performs intra prediction on coding units in an intra mode, from among a current frame 1702, and a motion estimator 1706 and a motion compensator 1708 perform inter estimation and motion compensation on coding units in an inter mode from among the current frame 1702 by using the current frame 1702 and a reference frame 1726.

Data output from the intra predictor 1704, the motion estimator 1706, and the motion compensator 1708 is output as quantized transformation coefficients through a transformer 1710 and a quantizer 1712. The quantized transformation coefficients are restored as data in a spatial domain through an inverse quantizer 1718 and an inverse transformer 1720, and the restored data in the spatial domain is output as the reference frame 1726 after being post-processed through a deblocking unit 1722 and an offset compensation unit 1724. The quantized transformation coefficients may be output as a bitstream 1716 through an entropy encoder 1714.

In order for the image encoder 1700 to be applied in the video encoding apparatus 100, all elements of the image encoder 1700, i.e., the intra predictor 1704, the motion estimator 1706, the motion compensator 1708, the transformer 1710, the quantizer 1712, the entropy encoder 1714, the inverse quantizer 1718, the inverse transformer 1720, the deblocking unit 1722, and the offset compensation unit 1724 perform operations based on each coding unit from among coding units having a tree structure while considering the maximum depth of each largest coding unit.

Specifically, the intra predictor 1704, the motion estimator 1706, and the motion compensator 1708 determines partitions and a prediction mode of each coding unit from among the coding units having a tree structure while considering the maximum size and the maximum depth of a current largest coding unit, and the transformer 1710 determines the size of the transformation unit in each coding unit from among the coding units having a tree structure.

Figure 17B:
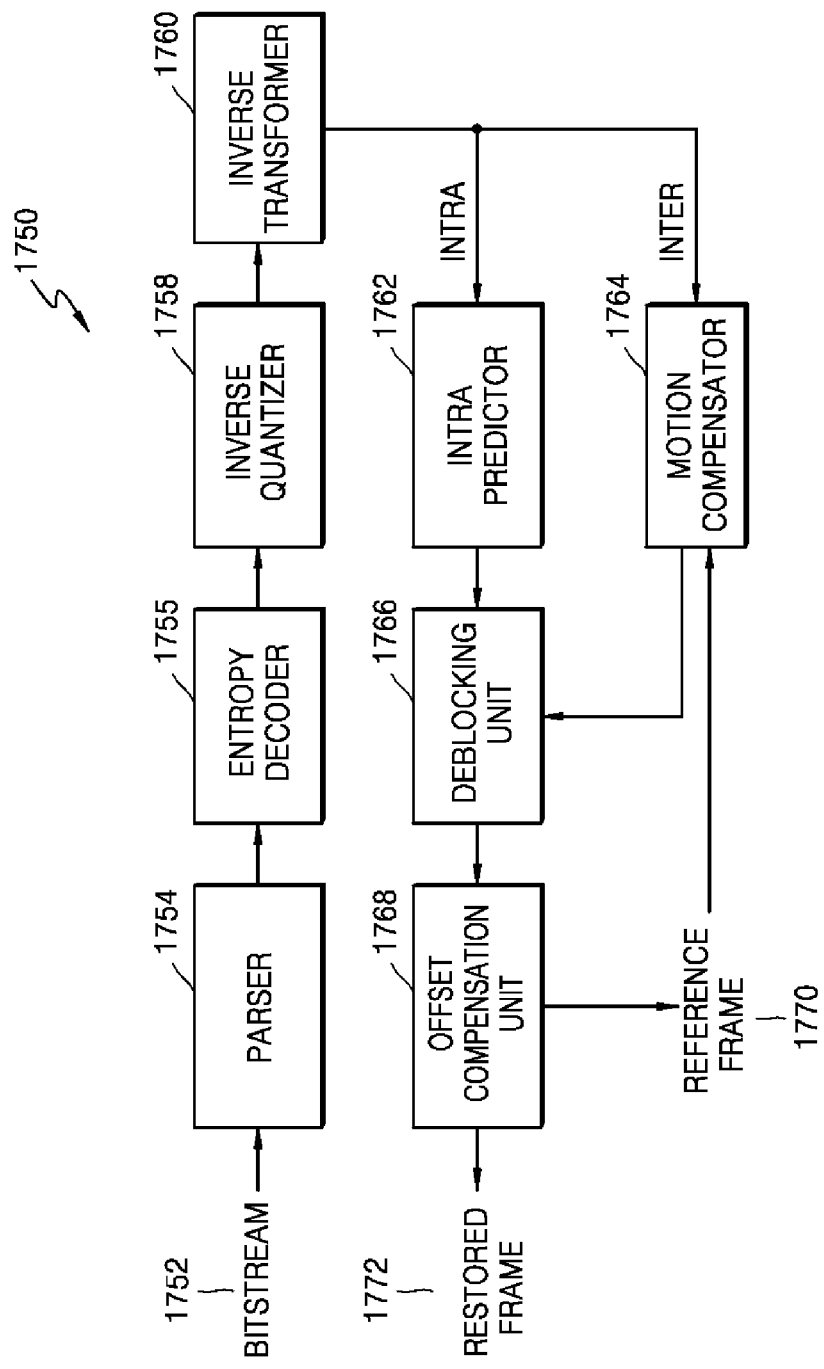
FIG. 17B illustrates a block diagram of an image decoder based on coding units, according to various embodiments.

FIG. 17B illustrates a block diagram of an image decoder 1750 based on coding units, according to various embodiments.

A parser 1754 parses encoded image data to be decoded and information about encoding required for decoding from a bitstream 1752. The encoded image data is output as inverse quantized data through an entropy decoder 1756 and an inverse quantizer 1758, and the inverse quantized data is restored to image data in a spatial domain through an inverse transformer 1760.

An intra predictor 1762 performs intra prediction on coding units in an intra mode with respect to the image data in the spatial domain, and a motion compensator 1764 performs motion compensation on coding units in an inter mode by using a reference frame 1770.

The image data in the spatial domain, which passed through the intra predictor 1762 and the motion compensator 1764, may be output as a restored frame 1772 after being post-processed through a deblocking unit 1766 and an offset compensation unit 1768. Also, the image data that is post-processed through the deblocking unit 1766 and the offset compensation unit 1768 may be output as the reference frame 1770.

In order to decode the image data in the decoder 1670 of the video decoding apparatus 6550, the image decoder 1750 according to an embodiment may perform operations that are performed after the parser 1754 performs an operation.

In order for the image decoder 1750 to be applied in the video decoding apparatus 1650, all elements of the image decoder 1750, i.e., the parser 1754, the entropy decoder 1756, the inverse quantizer 1758, the inverse transformer 1760, the intra predictor 1762, the motion compensator 1764, the deblocking unit 1766, and the offset compensation unit 1768 perform operations based on coding units having a tree structure for each largest coding unit.

Specifically, the intra predictor 1762 and the motion compensator 1764 perform operations based on partitions and a prediction mode for each of the coding units having a tree structure, and the inverse transformer 1760 perform operations based on a size of a transformation unit for each coding unit.

The encoding operation of FIG. 17A and the decoding operation of FIG. 17B describe in detail a video stream encoding operation and a video stream decoding operation in a single layer, respectively. Thus, if the scalable video encoding apparatus 1200 of FIG. 12A encodes a video stream of two or more layers, the image encoder 1700 may be provided for each layer. Similarly, if the scalable video decoding apparatus 1250 of FIG. 12B decodes a video stream of two or more layers, the image decoder 1750 may be provided for each layer.

Figure 18:
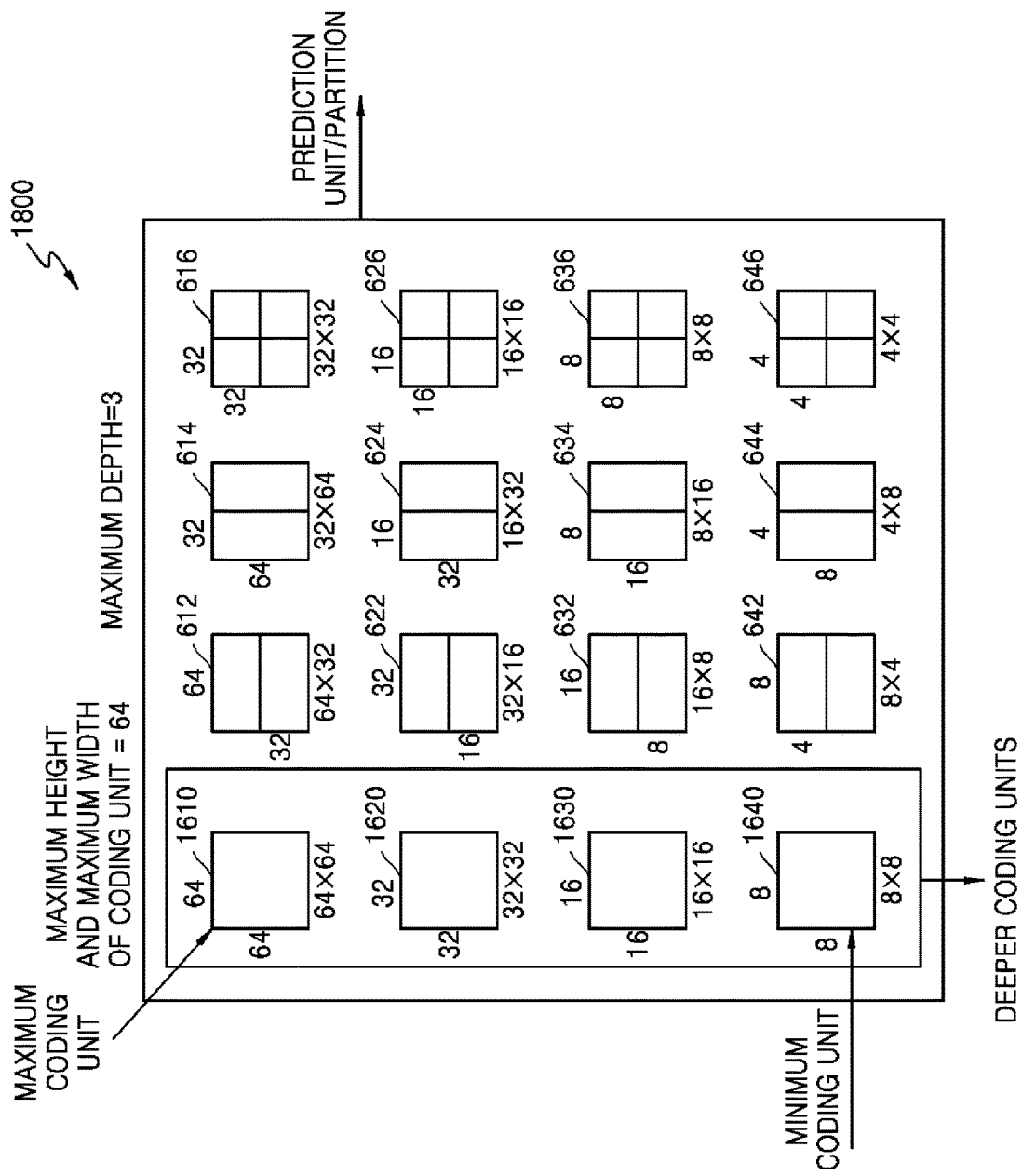
FIG. 18 illustrates a diagram illustrating deeper coding units according to depths, and partitions, according to various embodiments.

FIG. 18 illustrates a diagram illustrating deeper coding units according to depths, and partitions, according to various embodiments.

The video encoding apparatus 1500 according to an embodiment and the video decoding apparatus 1550 according to an embodiment use hierarchical coding units so as to consider characteristics of an image. A maximum height, a maximum width, and a maximum depth of coding units may be adaptively determined according to the characteristics of the image, or may be differently set by a user. Sizes of deeper coding units according to depths may be determined according to the predetermined maximum size of the coding unit.

In a hierarchical structure 1800 of coding units, according to an embodiment, the maximum height and the maximum width of the coding units are each 64, and the maximum depth is 4. In this case, the maximum depth refers to a total number of times the coding unit is split from the largest coding unit to the smallest coding unit. Since a depth deepens along a vertical axis of the hierarchical structure 1800, a height and a width of the deeper coding unit are each split. Also, a prediction unit and partitions, which are bases for prediction encoding of each deeper coding unit, are shown along a horizontal axis of the hierarchical structure 1800.

That is, a coding unit 1810 is a largest coding unit in the hierarchical structure 1800, wherein a depth is 0 and a size, i.e., a height by width, is 64×64. The depth deepens along the vertical axis, and a coding unit 1820 having a size of 32×32 and a depth of 1, a coding unit 1830 having a size of 16×16 and a depth of 2, and a coding unit 1840 having a size of 8×8 and a depth of 3. The coding unit 1840 having the size of 8×8 and the depth of 3 is a smallest coding unit.

The prediction unit and the partitions of a coding unit are arranged along the horizontal axis according to each depth. In other words, if the coding unit 1810 having the size of 64×64 and the depth of 0 is a prediction unit, the prediction unit may be split into partitions included in the coding unit 1810, i.e. a partition 1810 having a size of 64×64, partitions 1812 having the size of 64×32, partitions 1814 having the size of 32×64, or partitions 1816 having the size of 32×32.

Likewise, a prediction unit of the coding unit 1820 having the size of 32×32 and the depth of 1 may be split into partitions included in the coding unit 1820, i.e. a partition 1820 having a size of 32×32, partitions 1822 having a size of 32×16, partitions 1824 having a size of 16×32, and partitions 1826 having a size of 16×16.

Likewise, a prediction unit of the coding unit 1830 having the size of 16×16 and the depth of 2 may be split into partitions included in the coding unit 1830, i.e. a partition having a size of 16×16 included in the coding unit 1830, partitions 1832 having a size of 16×8, partitions 1834 having a size of 8×16, and partitions 1836 having a size of 8×8.

Likewise, a prediction unit of the coding unit 1840 having the size of 8×8 and the depth of 3 may be split into partitions included in the coding unit 1840, i.e. a partition having a size of 8×8 included in the coding unit 1840, partitions 1842 having a size of 8×4, partitions 1844 having a size of 4×8, and partitions 1846 having a size of 4×4.

In order to determine the at least one coded depth of the coding units constituting the largest coding unit 1810, the encoder 1510 of the video encoding apparatus 100 performs encoding for coding units corresponding to each depth included in the largest coding unit 1810.

A number of deeper coding units according to depths including data in the same range and the same size increases as the depth deepens. For example, four coding units corresponding to a depth of 2 are required to cover data that is included in one coding unit corresponding to a depth of 1. Accordingly, in order to compare encoding results of the same data according to depths, the coding unit corresponding to the depth of 1 and four coding units corresponding to the depth of 2 are each encoded.

In order to perform encoding for a current depth from among the depths, a least encoding error may be selected for the current depth by performing encoding for each prediction unit in the coding units corresponding to the current depth, along the horizontal axis of the hierarchical structure 1800. Alternatively, the minimum encoding error may be searched for by comparing the least encoding errors according to depths, by performing encoding for each depth as the depth deepens along the vertical axis of the hierarchical structure 1800. A depth and a partition having the minimum encoding error in the coding unit 1810 may be selected as the coded depth and a partition type of the coding unit 1810.

Figure 19:
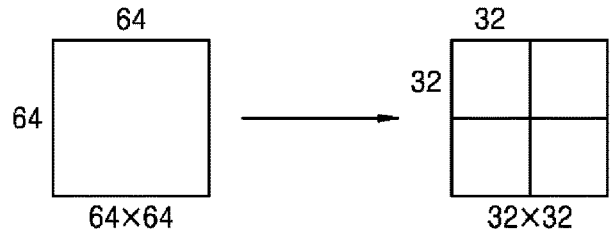
FIG. 19 illustrates a diagram for describing a relationship between a coding unit and transformation units, according to various embodiments.

FIG. 19 illustrates a diagram for describing a relationship between a coding unit and transformation units, according to various embodiments.

The video encoding apparatus 1500 according to an embodiment or the video decoding apparatus 1550 according to an embodiment encodes or decodes an image according to coding units having sizes smaller than or equal to a largest coding unit for each largest coding unit. Sizes of transformation units for transformation during encoding may be selected based on data units that are not larger than a corresponding coding unit.

For example, in the video encoding apparatus 1500 or the video decoding apparatus 1550, if a size of a current coding unit 1910 is 64×64, transformation may be performed by using the transformation units 1920 each having a size of 32×32.

Also, data of the coding unit 1910 having the size of 64×64 may be encoded by performing the transformation on each of the transformation units having the size of 32×32, 16×16, 8×8, and 4×4, which are smaller than 64×64, and then a transformation unit having the least coding error may be selected.

Figure 20:
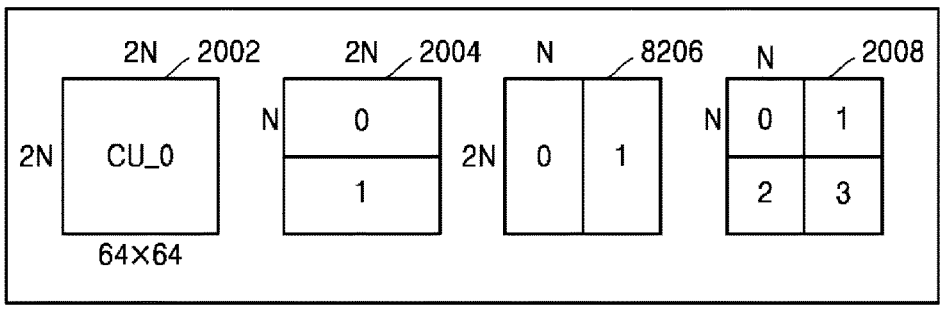
FIG. 20 illustrates a plurality of pieces of encoding information of coding units corresponding to a coded depth, according to various embodiments.
Figure 20:
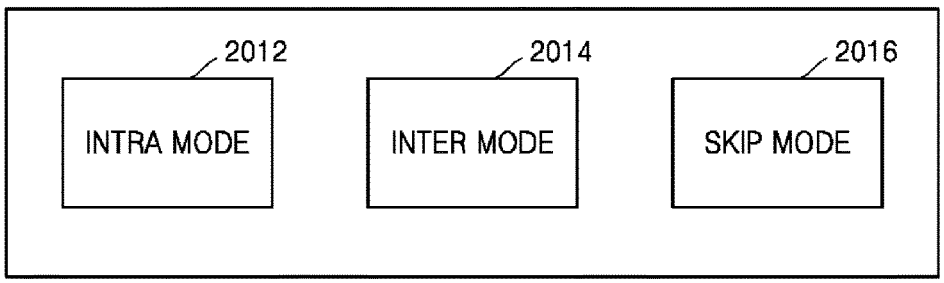
Figure 20:
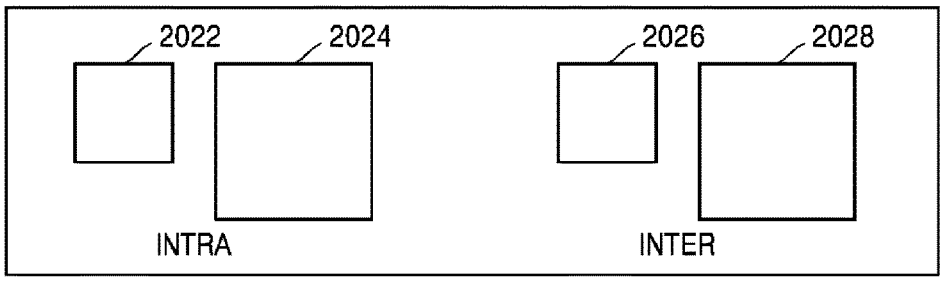

FIG. 20 illustrates a plurality of pieces of encoding information of coding units corresponding to a coded depth, according to various embodiments.

The output unit 1520 of the video encoding apparatus 100 according to an embodiment may encode and transmit partition type information 2000, prediction mode information 2010, and transformation unit size information 2020 for each coding unit corresponding to a coded depth, as information about an encoding mode.

The partition type information 2000 indicates information about a shape of a partition obtained by splitting a prediction unit of a current coding unit, wherein the partition is a data unit for prediction encoding the current coding unit. For example, a current coding unit CU_0 having a size of 2N×2N may be split into any one of a partition 2002 having a size of 2N×2N, a partition 2004 having a size of 2N×N, a partition 2006 having a size of N×2N, and a partition 2008 having a size of N×N. In this case, the partition type information 2000 about a current coding unit is set to indicate one of the partition 2002 having a size of 2N×2N, the partition 2004 having a size of 2N×N, the partition 2006 having a size of N×2N, and the partition 2008 having a size of N×N.

The prediction mode information 2010 indicates a prediction mode of each partition. For example, the prediction mode information 2010 may indicate a mode of prediction encoding performed on a partition indicated by the partition type information 2000, i.e., one of an intra mode 2012, an inter mode 2014, and a skip mode 2016.

In addition, the transformation unit size information 2020 indicates a transformation unit to be based on when transformation is performed on a current coding unit. For example, the transformation unit may be one of a first intra transformation unit 2022, a second intra transformation unit 2024, a first inter transformation unit 2026, and a second inter transformation unit 2028.

The receiving extractor 1560 of the video decoding apparatus 1550 according to an embodiment may extract and use the partition type information 2000, the prediction mode information 2010, and the transformation unit size information 2020 for decoding, according to each deeper coding unit.

Figure 21:
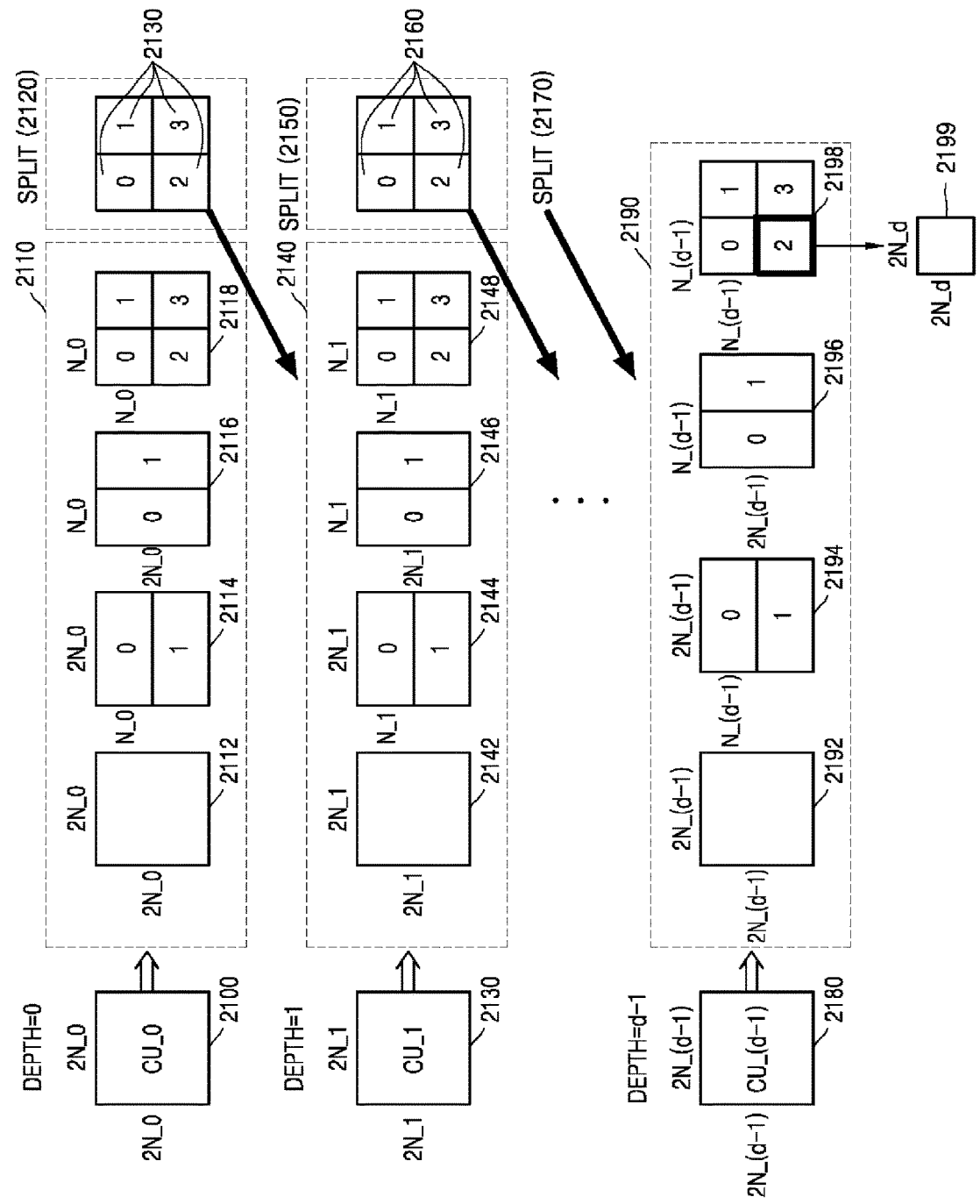
FIG. 21 illustrates deeper coding units according to depths, according to various embodiments.

FIG. 21 illustrates deeper coding units according to depths, according to various embodiments.

Split information may be used to indicate a change of a depth. The spilt information indicates whether a coding unit of a current depth is split into coding units of a lower depth.

A prediction unit 2110 for prediction encoding a coding unit 2100 having a depth of 0 and a size of 2N_0×2N_0 may include partitions of a partition type 2112 having a size of 2N_0×2N_0, a partition type 2114 having a size of 2N_0×N_0, a partition type 2116 having a size of N_0×2N_0, and a partition type 2118 having a size of N_0×N_0. FIG. 9 only illustrates the partition types 2112 through 2118 which are obtained by symmetrically splitting the prediction unit 2110, but a partition type is not limited thereto, and the partitions of the prediction unit 2110 may include asymmetrical partitions, partitions having a predetermined shape, and partitions having a geometrical shape.

Prediction encoding is repeatedly performed on one partition having a size of 2N_0×2N_0, two partitions having a size of 2N_0×N_0, two partitions having a size of N_0×2N_0, and four partitions having a size of N_0×N_0, according to each partition type. The prediction encoding in an intra mode and an inter mode may be performed on the partitions having the sizes of 2N_0×2N_0, N_0×2N_0, 2N_0×N_0, and N_0×N_0. The prediction encoding in a skip mode is performed only on the partition having the size of 2N_0×2N_0.

If an encoding error is smallest in one of the partition types 2112 through 2116, the prediction unit 2110 may not be split into a lower depth.

If the encoding error is the smallest in the partition type 2118, a depth is changed from 0 to 1 to split the partition type 2118 in operation 2120, and encoding is repeatedly performed on coding units 2130 having a depth of 2 and a size of N_0×N_0 to search for a minimum encoding error.

A prediction unit 2140 for prediction encoding the coding unit 2130 having a depth of 1 and a size of 2N_1×2N_1 (=N_0×N_0) may include partitions of a partition type 2142 having a size of 2N_1×2N_1, a partition type 2144 having a size of 2N_1×N_1, a partition type 2146 having a size of N_1×2N_1, and a partition type 2148 having a size of N_1×N_1.

If an encoding error is the smallest in the partition type 2148, a depth is changed from 1 to 2 to split the partition type 2148 in operation 2150, and encoding is repeatedly performed on coding units 2160, which have a depth of 2 and a size of N_2×N_2 to search for a minimum encoding error.

When a maximum depth is d, a split operation according to each depth may be performed until a depth becomes d−1, and split information may be encoded for up to when a depth is one of 0 to d−2. In other words, when encoding is performed until the depth is d−1 after a coding unit corresponding to a depth of d−2 is split in operation 2170, a prediction unit 2190 for prediction encoding a coding unit 2180 having a depth of d−1 and a size of 2N_(d−1)×2N_(d−1) may include partitions of a partition type 2192 having a size of 2N_(d−1)×2N_(d−1), a partition type 2194 having a size of 2N_(d−1)×N_(d−1), a partition type 2196 having a size of N_(d−1)×2N_(d−1), and a partition type 2198 having a size of N_(d−1)×N_(d−1).

Prediction encoding may be repeatedly performed on one partition having a size of 2N_(d−1)×2N_(d−1), two partitions having a size of 2N_(d−1)×N_(d−1), two partitions having a size of N_(d−1)×2N_(d−1), four partitions having a size of N_(d−1)×N_(d−1) from among the partition types 2192 through 2198 to search for a partition type having a minimum encoding error.

Even when the partition type 2198 has the minimum encoding error, since a maximum depth is d, a coding unit CU_(d−1) having a depth of d−1 is no longer split to a lower depth, and a coded depth for the coding units constituting a current largest coding unit 2100 is determined to be d−1 and a partition type of the current largest coding unit 2100 may be determined to be N_(d−1)×N_(d−1). Also, since the maximum depth is d, split information for the smallest coding unit 2152 is not set.

A data unit 2199 may be a 'minimum unit' for the current largest coding unit. A minimum unit according to an exemplary embodiment may be a rectangular data unit obtained by splitting a smallest coding unit by 4. By performing the encoding repeatedly, the video encoding apparatus 100 may select a depth having the least encoding error by comparing encoding errors according to depths of the coding unit 2100 to determine a coded depth, and set a corresponding partition type and a prediction mode as an encoding mode of the coded depth.

As such, the minimum encoding errors according to depths are compared in all of the depths of 1 through d, and a depth having the least encoding error may be determined as a coded depth. The coded depth, the partition type of the prediction unit, and the prediction mode may be encoded and transmitted as information about an encoding mode. Also, since a coding unit is split from a depth of 0 to a coded depth, only split information of the coded depth is set to 0, and split information of depths excluding the coded depth is set to 1.

The image data and encoding information receiving extractor 1560 of the video decoding apparatus 1550 according to an embodiment may extract and use the information about the coded depth and the prediction unit of the coding unit 2100 to decode the partition 2112. The video decoding apparatus 1550 according to an embodiment may determine a depth, in which split information is 0, as a coded depth by using split information according to depths, and use information about an encoding mode of the corresponding depth for decoding.

Figure 22:
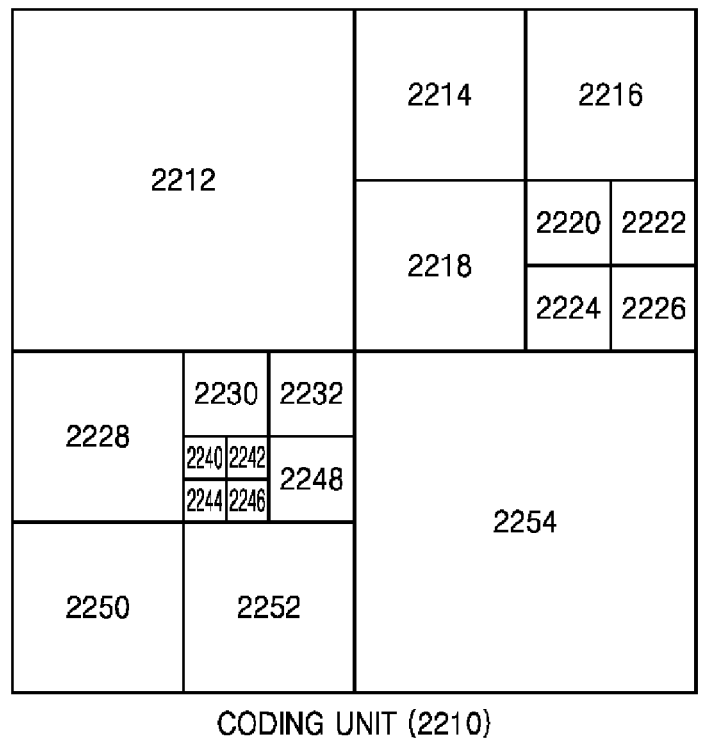
FIGS. 22, 23, and 24 illustrate relationships between coding units, prediction units, and transformation units, according to various embodiments.
Figure 23:
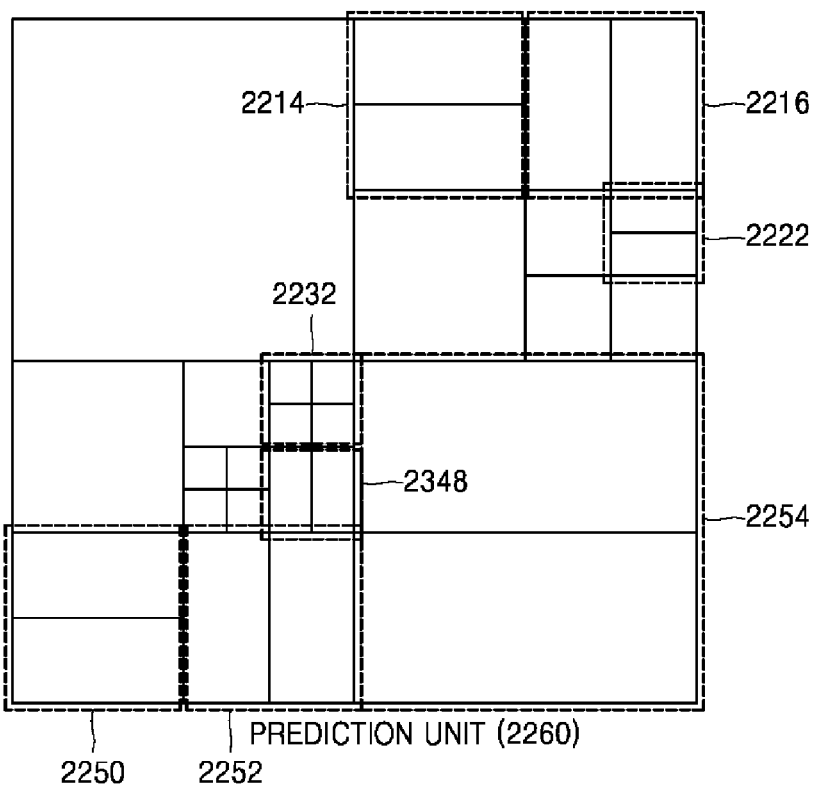
Figure 24:
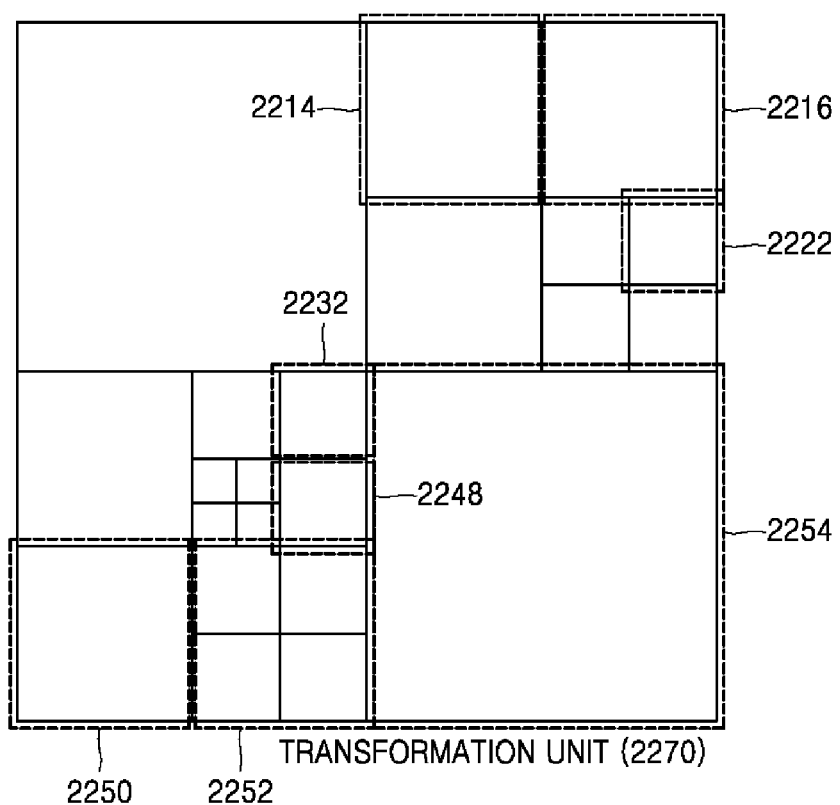

FIGS. 22, 23, and 24 illustrate relationships between coding units, prediction units, and transformation units, according to various embodiments.

The coding units 2210 are coding units having a tree structure, corresponding to coded depths determined by the video encoding apparatus 100 according to an embodiment, in a largest coding unit. The prediction units 2260 are partitions of prediction units of each of the coding units 2210, and the transformation units 2270 are transformation units of each of the coding units 2210.

When a depth of a largest coding unit is 0 in the coding units 2210, depths of coding units 2212 and 1054 are 1, depths of coding units 2214, 2216, 2218, 2228, 2250, and 2252 are 2, depths of coding units 2220, 2222, 2224, 2226, 2230, 2232, and 2248 are 3, and depths of coding units 2240, 2242, 2244, and 2246 are 4.

In the prediction units 2260, some coding units 2214, 2216, 2222, 2232, 2248, 2250, 2252, and 2254 are obtained by splitting the coding units in the coding units 2210. That is, partition types in the coding units 2214, 2222, 2250, and 2254 each have a size of 2N×N, partition types in the coding units 2216, 2248, and 2252 each have a size of N×2N, and a partition type of the coding unit 2232 has a size of N×N. Prediction units and partitions of the coding units 2210 are smaller than or equal to each coding unit.

Transformation or inverse transformation is performed on image data of the coding unit 2252 in the transformation units 2270 in a data unit that is smaller than the coding unit 2252. Also, the coding units 2214, 2216, 2222, 2232, 2248, 2250, 2252, and 2254 in the transformation units 2260 are different from those in the prediction units 2260 in terms of sizes and shapes. That is, the video encoding and decoding apparatuses 1500 and 1550 may perform intra prediction, motion estimation, motion compensation, transformation, and inverse transformation individually on a data unit in the same coding unit.

Accordingly, encoding is recursively performed on each of coding units having a hierarchical structure in each region of a largest coding unit to determine an optimum coding unit, and thus coding units having a recursive tree structure may be obtained. Encoding information may include split information about a coding unit, information about a partition type, information about a prediction mode, and information about a size of a transformation unit. Table 1 shows the encoding information that may be set by the video encoding and decoding apparatuses 1500 and 1550 according to embodiments.

TABLE 1

Split Information 0
(Encoding on Coding Unit having Size of 2N × 2N and Current Depth of d)

| | Partition Type | | Size of Transformation Unit | | |
| --- | --- | --- | --- | --- | --- |
| Prediction Mode | Symmetrical Partition Type | Asymmetrical Partition Type | Split Information 0 of Transformation Unit | Split Information 1 of Transformation Unit | Split Information 1 |
| Intra Inter Skip (Only 2N × 2N) | 2N × 2N 2N × N N × 2N N × N | 2N × nU 2N × nD nL × 2N nR × 2N | 2N × 2N | N × N (Symmetrical Type) N/2 × N/2 (Asymmetrical Type) | Repeatedly Encode Coding Units having Lower Depth of d + 1 |

The output unit 1520 of the video encoding apparatus 100 according to an embodiment may output the encoding information about the coding units having a tree structure, and the encoding information receiving extractor 1560 of the video decoding apparatus 1550 according to an embodiment may extract the encoding information about the coding units having a tree structure from a received bitstream.

Split information indicates whether a current coding unit is split into coding units of a lower depth. If split information of a current depth d is 0, a depth, in which a current coding unit is no longer split into a lower depth, is a coded depth, and thus information about a partition type, prediction mode, and a size of a transformation unit may be defined for the coded depth. If the current coding unit is further split according to the split information, encoding is independently performed on four split coding units of a lower depth.

A prediction mode may be one of an intra mode, an inter mode, and a skip mode. The intra mode and the inter mode may be defined in all partition types, and the skip mode is defined only in a partition type having a size of 2N×2N.

The information about the partition type may indicate symmetrical partition types having sizes of 2N×2N, 2N×N, N×2N, and N×N, which are obtained by symmetrically splitting a height or a width of a prediction unit, and asymmetrical partition types having sizes of 2N×nU, 2N×nD, nL×2N, and nR×2N, which are obtained by asymmetrically splitting the height or width of the prediction unit. The asymmetrical partition types having the sizes of 2N×nU and 2N×nD may be respectively obtained by splitting the height of the prediction unit in 1:3 and 3:1, and the asymmetrical partition types having the sizes of nL×2N and nR×2N may be respectively obtained by splitting the width of the prediction unit in 1:3 and 3:1

The size of the transformation unit may be set to be two types in the intra mode and two types in the inter mode. In other words, if split information of the transformation unit is 0, the size of the transformation unit may be 2N×2N, which is the size of the current coding unit. If split information of the transformation unit is 1, the transformation units may be obtained by splitting the current coding unit. Also, if a partition type of the current coding unit having the size of 2N×2N is a symmetrical partition type, a size of a transformation unit may be N×N, and if the partition type of the current coding unit is an asymmetrical partition type, the size of the transformation unit may be N/2×N/2.

The encoding information about coding units having a tree structure may include at least one of a coding unit corresponding to a coded depth, a prediction unit, and a minimum unit. The coding unit corresponding to the coded depth may include at least one of a prediction unit and a minimum unit containing the same encoding information.

Accordingly, it is determined whether adjacent data units are included in the same coding unit corresponding to the coded depth by comparing encoding information of the adjacent data units. Also, a corresponding coding unit corresponding to a coded depth is determined by using encoding information of a data unit, and thus a distribution of coded depths in a largest coding unit may be inferred.

Accordingly, if a current coding unit is predicted based on encoding information of adjacent data units, encoding information of data units in deeper coding units adjacent to the current coding unit may be directly referred to and used.

In another embodiment, if a current coding unit is predicted based on encoding information of adjacent data units, data units adjacent to the current coding unit are searched using encoded information of the data units, and the searched adjacent coding units may be referred to for predicting the current coding unit.

Figure 25:
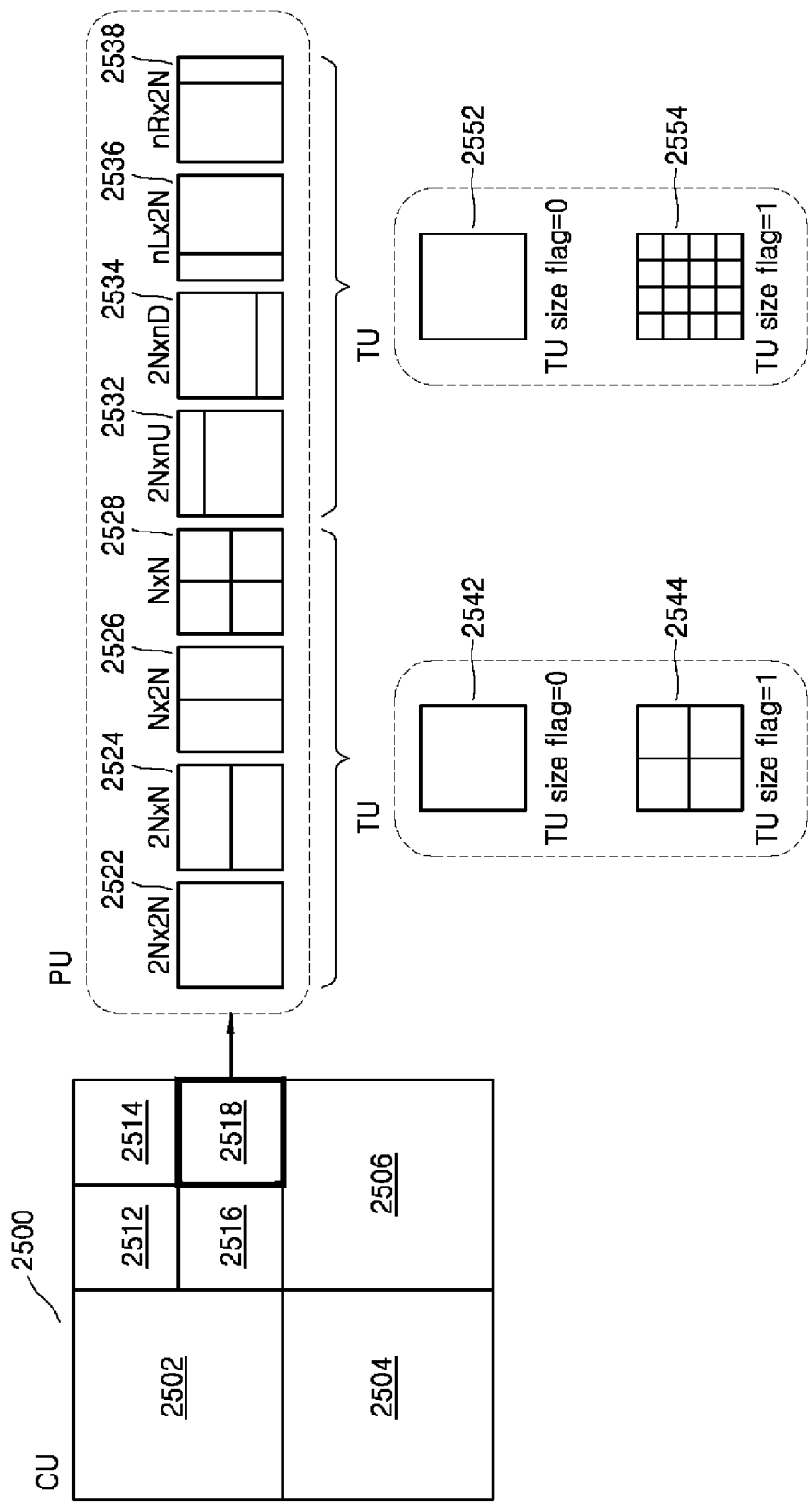
FIG. 25 illustrates a relationship between a coding unit, a prediction unit, and a transformation unit, according to encoding mode information of Table 1.

FIG. 25 illustrates a relationship between a coding unit, a prediction unit, and a transformation unit, according to encoding mode information of Table 1.

A largest coding unit 2500 includes coding units 2502, 2504, 2506, 2512, 2514, 2516, and 2518 of coded depths. Here, since the coding unit 2518 is a coding unit of a coded depth, split information may be set to 0. Information about a partition type of the coding unit 2518 having a size of 2N×2N may be set to be one of a partition type 2522 having a size of 2N×2N, a partition type 2524 having a size of 2N×N, a partition type 2526 having a size of N×2N, a partition type 2528 having a size of N×N, a partition type 2532 having a size of 2N×nU, a partition type 2534 having a size of 2N×nD, a partition type 2536 having a size of nL×2N, and a partition type 2538 having a size of nR×2N.

Split information (TU size flag) of a transformation unit is a type of a transformation index. The size of the transformation unit corresponding to the transformation index may be changed according to a prediction unit type or partition type of the coding unit.

For example, when the partition type is set to be symmetrical, i.e. the partition type 2522, 2524, 2526, or 2528, a transformation unit 2542 having a size of 2N×2N may be set if split information (TU size flag) of a transformation unit is 0, and a transformation unit 2544 having a size of N×N may be set if a TU size flag is 1.

When the partition type is set to be asymmetrical, i.e., the partition type 2532, 2534, 2536, or 2538, a transformation unit 2552 having a size of 2N×2N may be set if a TU size flag is 0, and a transformation unit 2554 having a size of N/2×N/2 may be set if a TU size flag is 1.

Referring to FIG. 19, the TU size flag is a flag having a value or 0 or 1, but the TU size flag is not limited to 1 bit, and a transformation unit may be hierarchically split having a tree structure while the TU size flag increases from 0. Split information (TU size flag) of a transformation unit may be an example of a transformation index.

In this case, the size of a transformation unit that has been actually used may be expressed by using a TU size flag of a transformation unit, according to an exemplary embodiment, together with a maximum size and minimum size of the transformation unit. According to an embodiment, the video encoding apparatus 1550 is capable of encoding maximum transformation unit size information, minimum transformation unit size information, and a maximum TU size flag. A result of encoding the maximum transformation unit size information, the minimum transformation unit size information, and the maximum TU size flag may be inserted into an SPS. The video decoding apparatus 1550 according to an embodiment may decode video by using the maximum transformation unit size information, the minimum transformation unit size information, and the maximum TU size flag.

For example, (a) if the size of a current coding unit is 64×64 and a maximum transformation unit size is 32×32, (a-1) then the size of a transformation unit may be 32×32 when a TU size flag is 0, (a-2) may be 16×16 when the TU size flag is 1, and (a-3) may be 8×8 when the TU size flag is 2.

As another example, (b) if the size of the current coding unit is 32×32 and a minimum transformation unit size is 32×32, (b-1) then the size of the transformation unit may be 32×32 when the TU size flag is 0. Here, the TU size flag cannot be set to a value other than 0, since the size of the transformation unit cannot be less than 32×32.

As another example, (c) if the size of the current coding unit is 64×64 and a maximum TU size flag is 1, then the TU size flag may be 0 or 1. Here, the TU size flag cannot be set to a value other than 0 or 1.

Thus, if it is defined that the maximum TU size flag is 'MaxTransformSizeIndex', a minimum transformation unit size is 'MinTransformSize', and a transformation unit size is 'RootTuSize' when the TU size flag is 0, then a current minimum transformation unit size 'CurrMinTuSize' that can be determined in a current coding unit, may be defined by Equation (1):

$$\text{CurrMinTuSize} = \max(\text{MinTransformSize}, \text{RootTuSize}/(2^{\text{MaxTransformSizeIndex}})) \quad (1)$$

Compared to the current minimum transformation unit size 'CurrMinTuSize' that can be determined in the current coding unit, a transformation unit size 'RootTuSize' when the TU size flag is 0 may denote a maximum transformation unit size that can be selected in the system. In Equation (1), 'RootTuSize/(2^MaxTransformSizeIndex)' denotes a transformation unit size when the transformation unit size 'RootTuSize', when the TU size flag is 0, is split a number of times corresponding to the maximum TU size flag, and 'MinTransformSize' denotes a minimum transformation size. Thus, a smaller value from among 'RootTuSize/(2^MaxTransformSizeIndex)' and 'MinTransformSize' may be the current minimum transformation unit size 'CurrMinTuSize' that can be determined in the current coding unit.

The largest transformation unit size RootTuSize according to an embodiment may vary according to the type of a prediction mode.

For example, if a current prediction mode is an inter mode, then 'RootTuSize' may be determined by using Equation (2) below. In Equation (2), 'MaxTransformSize' denotes a maximum transformation unit size, and 'PUSize' denotes a current prediction unit size.

$$\text{RootTuSize} = \min(\text{MaxTransformSize}, \text{PUSize}) \quad (2)$$

That is, if the current prediction mode is the inter mode, the transformation unit size 'RootTuSize', when the TU size flag is 0, may be a smaller value from among the maximum transformation unit size and the current prediction unit size.

If a prediction mode of a current partition unit is an intra mode, 'RootTuSize' may be determined by using Equation (3) below. In Equation (3), 'PartitionSize' denotes the size of the current partition unit.

$$\text{RootTuSize} = \min(\text{MaxTransformSize}, \text{PartitionSize}) \quad (3)$$

That is, if the current prediction mode is the intra mode, the transformation unit size 'RootTuSize' when the TU size flag is 0 may be a smaller value from among the maximum transformation unit size and the size of the current partition unit.

However, the current maximum transformation unit size 'RootTuSize' that varies according to the type of a prediction mode in a partition unit is just an example and embodiments are not limited thereto.

According to the video encoding method based on coding units having a tree structure as described with reference to FIGS. 15 through 25, image data of a spatial region is encoded for each coding unit of a tree structure. According to the video decoding method based on coding units having a tree structure, decoding is performed for each largest coding unit to restore image data of a spatial region. Thus, a picture and a video that is a picture sequence may be restored. The restored video may be reproduced by a reproducing apparatus, stored in a storage medium, or transmitted through a network.

The embodiments may be written as computer programs and may be implemented in general-use digital computers that execute the programs using a computer-readable recording medium. Examples of the computer-readable recording medium include magnetic storage media (e.g., ROM, floppy disks, hard disks, etc.) and optical recording media (e.g., CD-ROMs, or DVDs).

For convenience of description, a scalable video encoding method and/or a video encoding method, which has been described with reference to FIGS. 12A through 25, will be collectively referred to as a 'video encoding method'. In addition, the scalable video decoding method and/or the video decoding method, which has been described with reference to FIGS. 12A through 25, will be referred to as a 'video decoding method'.

Also, a video encoding apparatus including the scalable video encoding apparatus 1200, the video encoding apparatus 1500, or the image encoder 1700, which has been described with reference to FIGS. 12A through 25, will be referred to as a 'video encoding apparatus'. In addition, a video decoding apparatus including the scalable video decoding apparatus 1250, the video decoding apparatus 1550, or the image decoder 1750, which has been descried with reference to FIGS. 11A through 24, will be referred to as a 'video decoding apparatus'.

A computer-readable recording medium storing a program, e.g., a disc 26000, according to an embodiment will now be described in detail.

Figure 26:
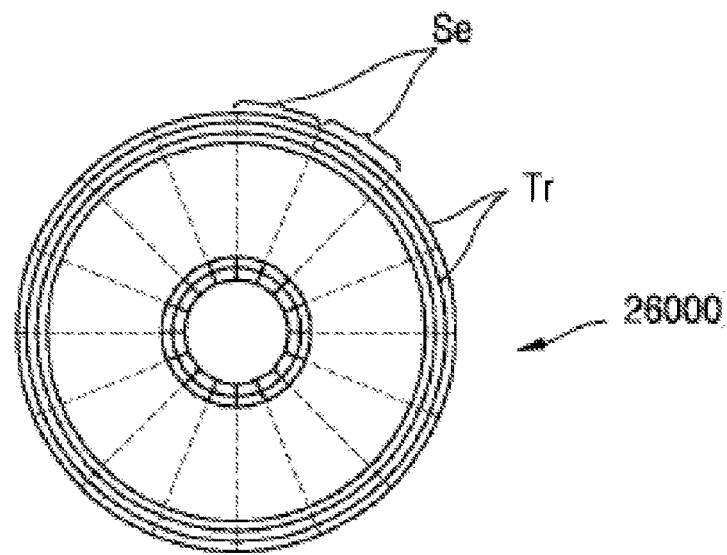
FIG. 26 illustrates a physical structure of a disc that stores a program, according to various embodiments.

FIG. 26 illustrates a physical structure of a disc 26000 that stores a program, according to an embodiment. The disc

26000 which is a storage medium may be a hard drive, a compact disc-read only memory (CD-ROM) disc, a Blu-ray disc, or a digital versatile disc (DVD). The disc 26000 includes a plurality of concentric tracks Tf each being divided into a specific number of sectors Se in a circumferential direction of the disc 26000. In a specific region of the disc 26000, a program that executes a method of determining a quantization parameter, a video encoding method, and a video decoding method as described above may be assigned and stored.

A computer system embodied using a storage medium that stores a program for executing a video encoding method and a video decoding method as described above will now be described with reference to FIG. 21.

Figure 27:
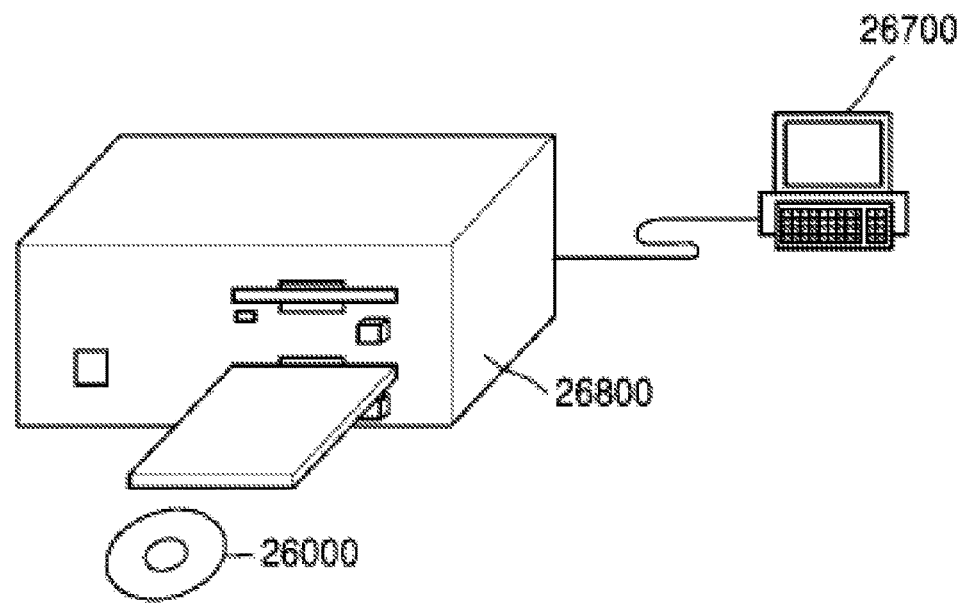
FIG. 27 illustrates a disc drive that records and reads a program by using a disc.

FIG. 27 illustrates a disc drive 26800 that records and reads a program by using a disc 26000. A computer system 26700 may store a program that executes at least one of a video encoding method and a video decoding method according to an exemplary embodiment, in the disc 26000 via the disc drive 26800. To run the program stored in the disc 26000 in the computer system 26700, the program may be read from the disc 26000 and be transmitted to the computer system 26700 by using the disc drive 26800.

Figure 28:
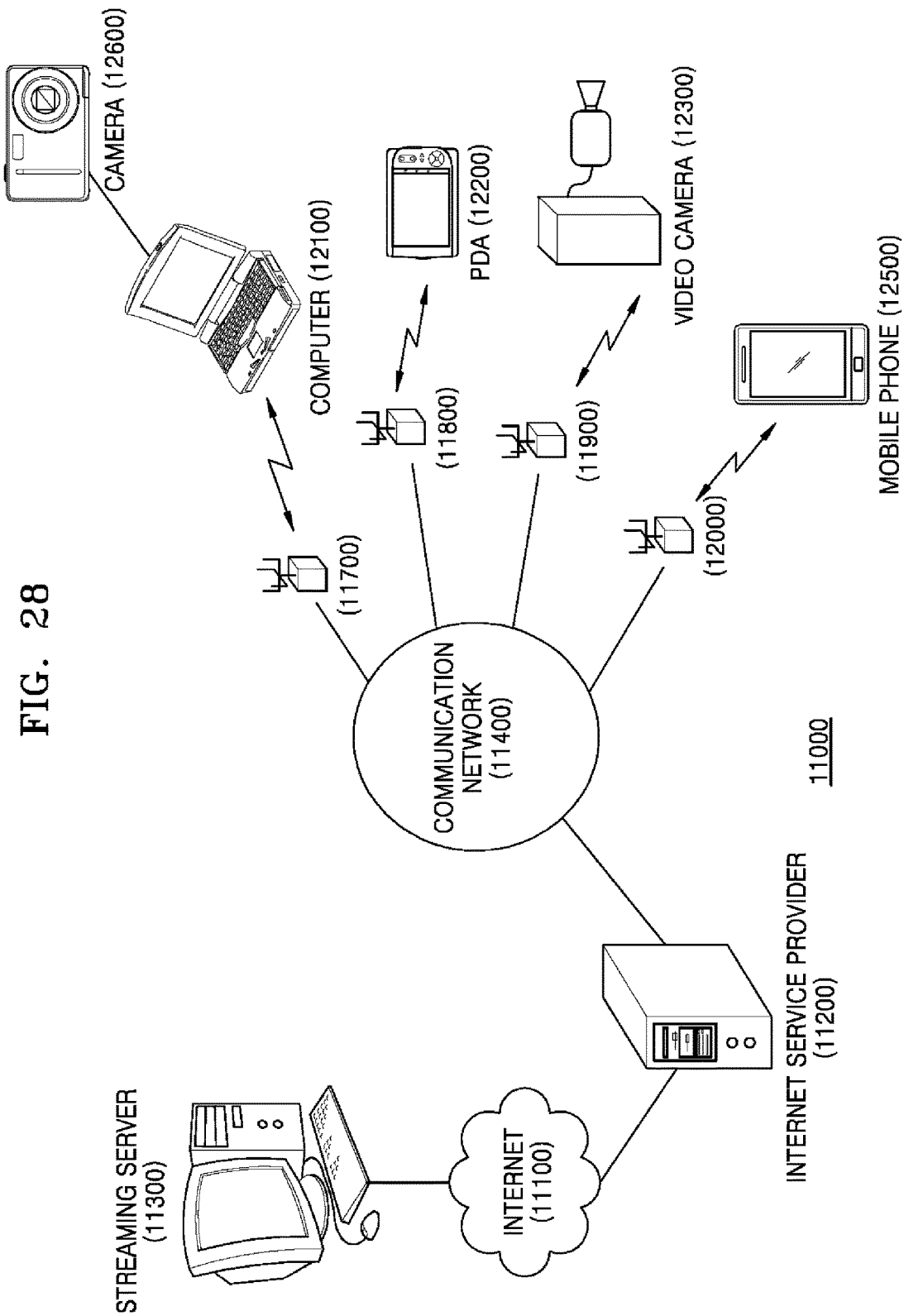
FIG. 28 illustrates an entire structure of a content supply system that provides a content distribution service.

The program that executes at least one of a video encoding method and a video decoding method according to an exemplary embodiment may be stored not only in the disc 26000 illustrated in FIGS. 26 and 28 but also in a memory card, ROM cassette, or a solid state drive (SSD).

A system to which the video encoding method and the video decoding method according to the aforementioned embodiments are applied will be described below.

FIG. 28 illustrates an entire structure of a content supply system 11000 that provides a content distribution service. A service area of a communication system is divided into predetermined-sized cells, and wireless base stations 11700, 11800, 11900, and 12000 are installed in these cells, respectively.

The content supply system 11000 includes a plurality of independent devices. For example, the plurality of independent devices, such as a computer 12100, a personal digital assistant (PDA) 12200, a video camera 12300, and a mobile phone 12500, are connected to the Internet 11100 via an internet service provider 11200, a communication network 11400, and the wireless base stations 11700, 11800, 11900, and 12000.

However, the content supply system 11000 is not limited to that illustrated in FIG. 23, and devices may be selectively connected thereto. The plurality of independent devices may be directly connected to the communication network 11400, rather than via the wireless base stations 11700, 11800, 11900, and 12000.

The video camera 12300 is an imaging device, e.g., a digital video camera, which is capable of capturing video images. The mobile phone 12500 may employ at least one communication method from among various protocols, e.g., Personal Digital Communications (PDC), Code Division Multiple Access (CDMA), Wideband-Code Division Multiple Access (W-CDMA), Global System for Mobile Communications (GSM), and Personal Handyphone System (PHS).

The video camera 12300 may be connected to a streaming server 11300 via the wireless base station 11900 and the communication network 11400. The streaming server 11300 allows content received from a user via the video camera 12300 to be streamed via a real-time broadcast. The content received from the video camera 12300 may be encoded using the video camera 12300 or the streaming server 11300. Video data captured by the video camera 12300 may be transmitted to the streaming server 11300 via the computer 12100.

Video data captured by a camera 12600 may also be transmitted to the streaming server 11300 via the computer 12100. The camera 12600 is an imaging device capable of capturing both still images and video images, similar to a digital camera. The video data captured by the camera 12600 may be encoded using the camera 12600 or the computer 12100. Software that performs encoding and decoding of video may be stored in a computer-readable recording medium, e.g., a CD-ROM disc, a floppy disc, a hard disc drive, an SSD, or a memory card, which may be accessible by the computer 12100.

If video data is captured by a camera built into the mobile phone 12500, the video data may be received from the mobile phone 12500.

The video data may also be encoded by a large scale integrated circuit (LSI) system installed in the video camera 12300, the mobile phone 12500, or the camera 12600.

The content supply system 11000 according to an embodiment may encode content data recorded by a user using the video camera 12300, the camera 12600, the mobile phone 12500, or another imaging device, e.g., content recorded during a concert, and transmit the encoded content data to the streaming server 11300. The streaming server 11300 may transmit the encoded content data in a type of a streaming content to other clients that request the content data.

The clients are devices capable of decoding the encoded content data, e.g., the computer 12100, the PDA 12200, the video camera 12300, or the mobile phone 12500. Thus, the content supply system 11000 allows the clients to receive and reproduce the encoded content data. Also, the content supply system 11000 allows the clients to receive the encoded content data and decode and reproduce the encoded content data in real time, thereby enabling personal broadcasting.

The video encoding apparatus and the video decoding apparatus of the present invention may be applied to encoding and decoding operations of the plurality of independent devices included in the content supply system 11000.

Figure 29:
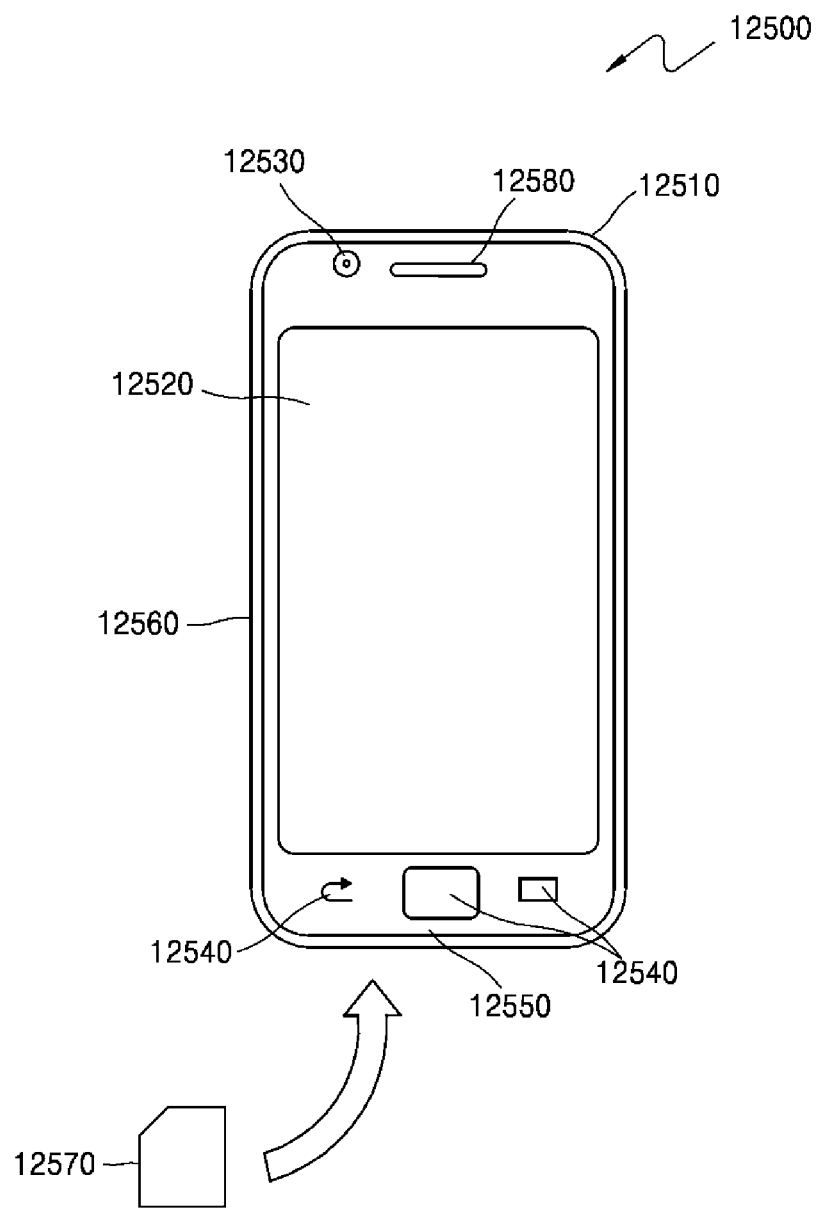
FIGS. 29 and 30 illustrate external and internal structures of a mobile phone to which a video encoding method and a video decoding method are applied, according to various embodiments.
Figure 31:
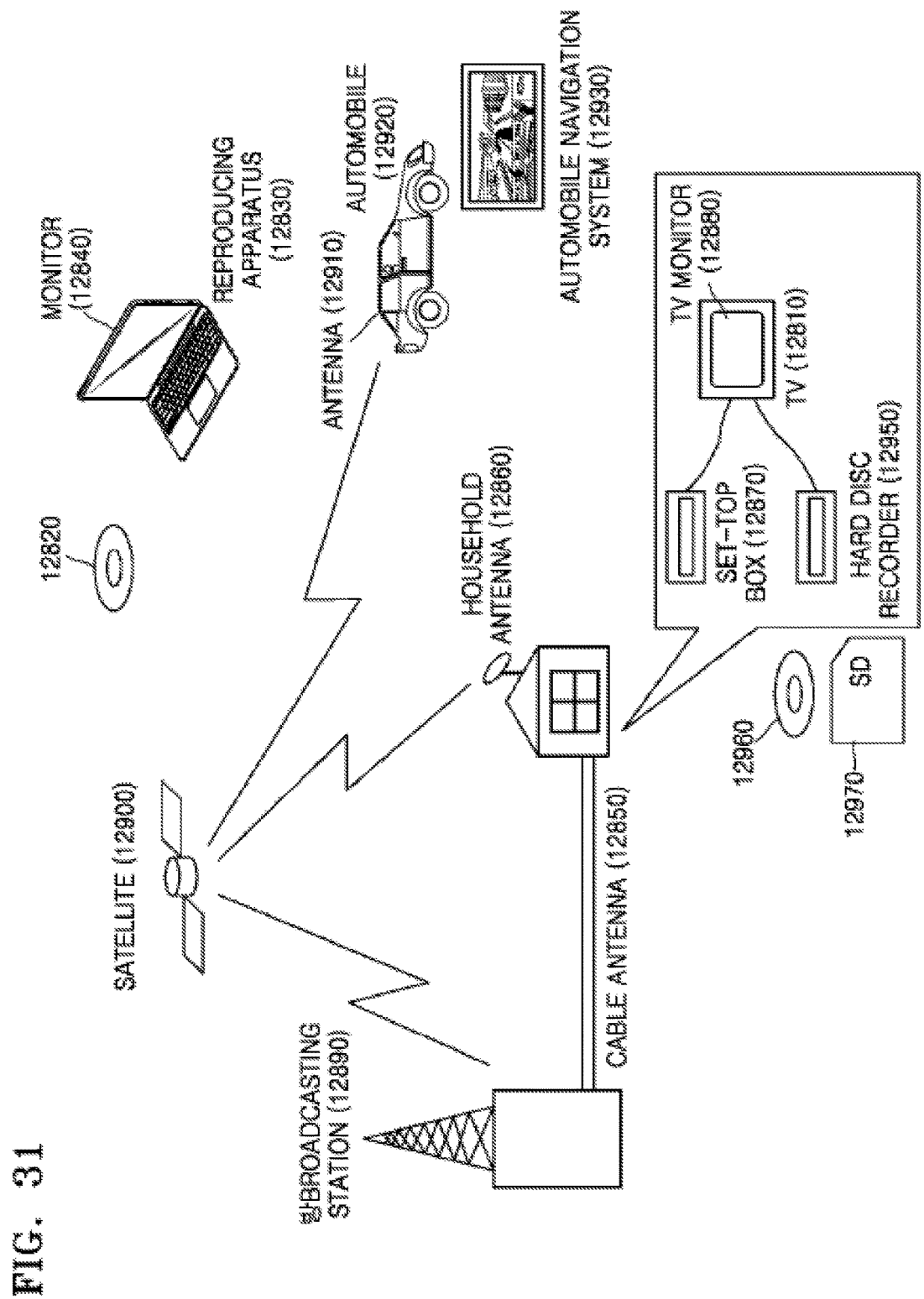
FIG. 31 illustrates a digital broadcasting system employing a communication system, according to various embodiments.

With reference to FIGS. 29 and 31, the mobile phone 12500 included in the content supply system 11000 according to an embodiment will now be described in detail.

FIG. 29 illustrates an external structure of a mobile phone 12500 to which a video encoding method and a video decoding method are applied, according to an exemplary embodiment. The mobile phone 12500 may be a smart phone, the functions of which are not limited and a large part of the functions of which may be changed or expanded.

The mobile phone 12500 includes an internal antenna 12510 via which a radio-frequency (RF) signal may be exchanged with the wireless base station 12000 of FIG. 24, and includes a display screen 12520 for displaying images captured by a camera 1253 or images that are received via the antenna 12510 and decoded, e.g., a liquid crystal display (LCD) or an organic light-emitting diodes (OLED) screen. The smart phone 12510 includes an operation panel 12540 including a control button and a touch panel. If the display screen 12520 is a touch screen, the operation panel 12540 further includes a touch sensing panel of the display screen 12520. The smart phone 12510 includes a speaker 12580 for outputting voice and sound or another type sound output unit, and a microphone 12550 for inputting voice and sound or another type sound input unit. The smart phone 12510 further includes the camera 12530, such as a charge-coupled device (CCD) camera, to capture video and still images. The smart phone 12510 may further include a storage medium 12570 for storing encoded/decoded data, e.g., video or still images captured by the camera 12530, received via email, or obtained according to various ways; and a slot 12560 via which the storage medium 12570 is loaded into the mobile phone 12500. The storage medium 12570 may be a flash memory, e.g., a secure digital (SD) card or an electrically erasable and programmable read only memory (EEPROM) included in a plastic case.

Figure 30:
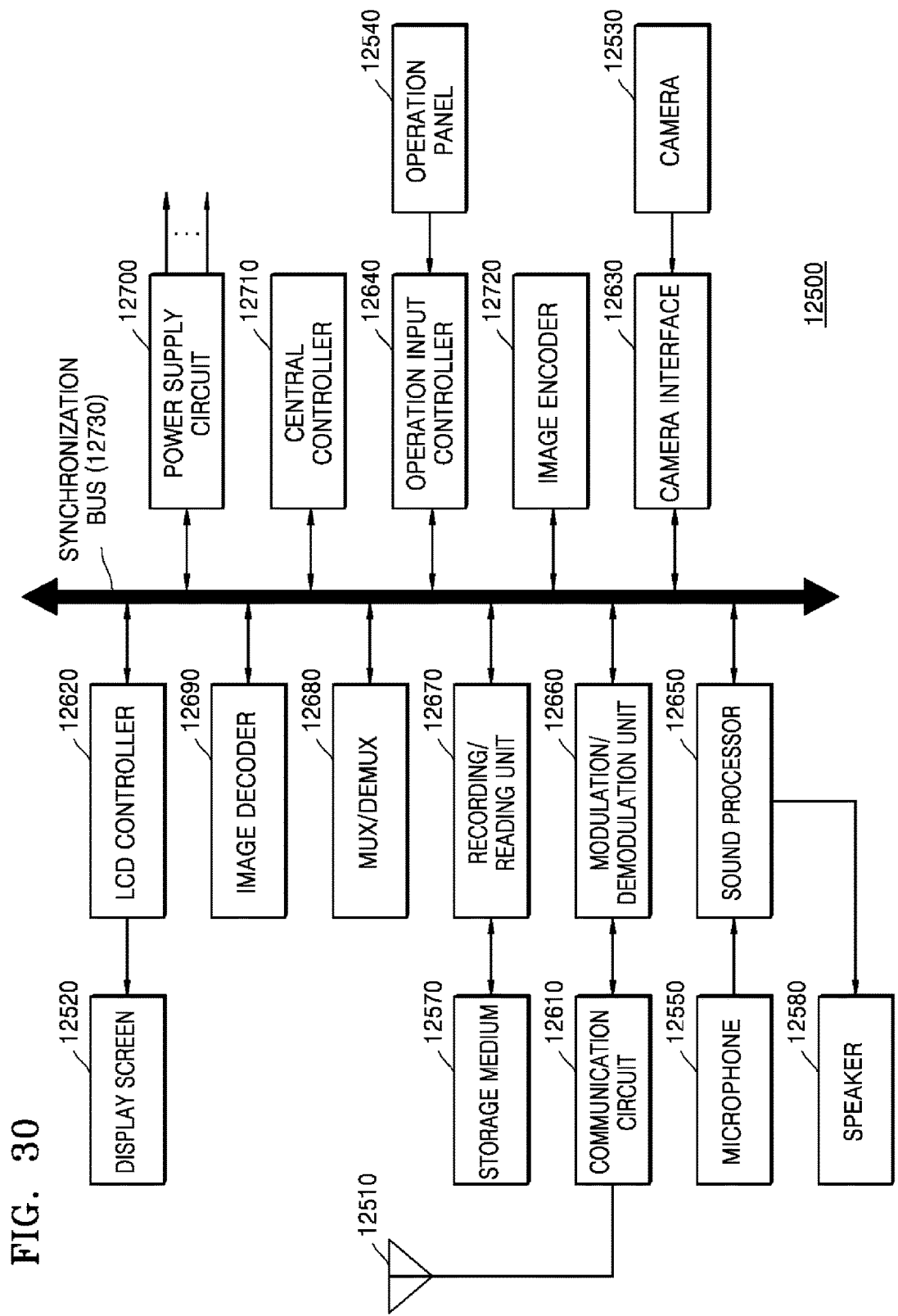

FIG. 30 illustrates an internal structure of the mobile phone 12500. In order to systemically control parts of the mobile phone 12500 including the display screen 12520 and the operation panel 12540, a power supply circuit 12700, an operation input controller 12640, an image coding unit 12720, a camera interface 12630, an LCD controller 12620, an image decoding unit 12690, a multiplexer/demultiplexer 12680, a recording/reading unit 12670, a modulation/demodulation unit 12660, and a sound processor 12650 are connected to a central controller 12710 via a synchronization bus 12730.

If a user operates a power button and sets from a 'power off' state to a 'power on' state, the power supply circuit 12700 supplies power to all the parts of the mobile phone 12500 from a battery pack, thereby setting the mobile phone 12500 in an operation mode.

The central controller 12710 includes a central processing unit (CPU), ROM, and random access memory (RAM).

While the mobile phone 12500 transmits communication data to the outside, a digital signal is generated in the mobile phone 12500 under control of the central controller. For example, the sound processor 12650 may generate a digital sound signal, the image coding unit 12720 may generate a digital image signal, and text data of a message may be generated via the operation panel 12540 and the operation input controller 12640. When a digital signal is delivered to the modulation/demodulation unit 12660 under control of the central controller 12710, the modulation/demodulation unit 12660 modulates a frequency band of the digital signal, and a communication circuit 12610 performs digital-to-analog conversion (D/C) and frequency conversion on the frequency band-modulated digital sound signal. A transmission signal output from the communication circuit 12610 may be transmitted to a voice communication base station or the wireless base station 12000 via the antenna 12510.

For example, when the mobile phone 12500 is in a conversation mode, a sound signal obtained via the microphone 12550 is transformed into a digital sound signal by the sound processor 12650, under control of the central controller 12710. The digital sound signal may be transformed into a transformation signal via the modulation/demodulation unit 12660 and the communication circuit 12610, and may be transmitted via the antenna 12510.

When a text message, e.g., email, is transmitted during a data communication mode, text data of the text message is input via the operation panel 12540 and is transmitted to the central controller 12610 via the operation input controller 12640. Under control of the central controller 12610, the text data is transformed into a transmission signal via the modulation/demodulation unit 12660 and the communication circuit 12610 and is transmitted to the wireless base station 12000 via the antenna 12510.

In order to transmit image data in the data communication mode, image data captured by the camera 12530 is provided to the image coding unit 12720 via the camera interface 12630. The captured image data may be directly displayed on the display screen 12520 via the camera interface 12630 and the LCD controller 12620.

A structure of the image coding unit 12720 may correspond to that of the video encoding apparatus 100 described above. The image coding unit 12720 may transform the image data received from the camera 12530 into compressed and encoded image data according to the video encoding method described above, and then output the encoded image data to the multiplexer/demultiplexer 12680. During a recording operation of the camera 12530, a sound signal obtained by the microphone 12550 of the mobile phone 12500 may be transformed into digital sound data via the sound processor 12650, and the digital sound data may be delivered to the multiplexer/demultiplexer 12680.

The multiplexer/demultiplexer 12680 multiplexes the encoded image data received from the image coding unit 12720, together with the sound data received from the sound processor 12650. A result of multiplexing the data may be transformed into a transmission signal via the modulation/demodulation unit 12660 and the communication circuit 12610, and may then be transmitted via the antenna 12510.

While the mobile phone 12500 receives communication data from the outside, frequency recovery and analog-digital conversion (A/D conversion) are performed on a signal received via the antenna 12510 so as to transform the signal into a digital signal. The modulation/demodulation unit 12660 modulates a frequency band of the digital signal. The frequency-band modulated digital signal is transmitted to the video decoding unit 12690, the sound processor 12650, or the LCD controller 12620, according to the type of the digital signal.

During the conversation mode, the mobile phone 12500 amplifies a signal received via the antenna 12510, and obtains a digital sound signal by performing frequency conversion and A/D conversion on the amplified signal. A received digital sound signal is transformed into an analog sound signal via the modulation/demodulation unit 1266 and the sound processor 12650, and the analog sound signal is output via the speaker 12580, under control of the central controller 12710.

When, in the data communication mode, data of a video file accessed at an Internet website is received, a signal received from wireless base station 12000 via the antenna 12510 is output as multiplexed data via the modulation/demodulation unit 1266, and the multiplexed data is transmitted to the multiplexer/demultiplexer 12680.

In order to decode the multiplexed data received via the antenna 12510, the multiplexer/demultiplexer 12680 demultiplexes the multiplexed data into an encoded video data stream and an encoded audio data stream. Via the synchronization bus 12730, the encoded video data stream and the encoded audio data stream are provided to the video decoding unit 12690 and the sound processor 12650, respectively.

A structure of the image decoding unit 12690 may correspond to that of the video decoding apparatus 200 described above. The image decoding unit 12690 may decode the encoded video data to obtain restored video data and provide the restored video data to the display screen 12520 via the LCD controller 12602, according to the video decoding method described above.

Thus, the data of the video file accessed at the Internet website may be displayed on the display screen 12520. At the same time, the sound processor 1265 may transform audio data into an analog sound signal, and provide the analog sound signal to the speaker 12580. Thus, audio data contained in the video file accessed at the Internet website may also be reproduced via the speaker 12580.

The mobile phone 1150 or another type of communication terminal may be a transceiving terminal including both a video encoding apparatus and a video decoding apparatus according to an exemplary embodiment, may be a transceiving terminal including only the video encoding apparatus, or may be a transceiving terminal including only the video decoding apparatus.

A communication system according to the exemplary embodiment is not limited to the communication system described above with reference to FIG. 28. For example, FIG. 31 illustrates a digital broadcasting system employing a communication system, according to an exemplary embodiment. The digital broadcasting system of FIG. 31 may receive a digital broadcast transmitted via a satellite or a terrestrial network by using the video encoding apparatus and the video decoding apparatus according to embodiments.

Specifically, a broadcasting station 12890 transmits a video data stream to a communication satellite or a broadcasting satellite 12900 by using radio waves. The broadcasting satellite 12900 transmits a broadcast signal, and the broadcast signal is transmitted to a satellite broadcast receiver via a household antenna 12860. In every house, an encoded video stream may be decoded and reproduced by a TV receiver 12810, a set-top box 12870, or another device.

When a video decoding apparatus according to an exemplary embodiment is implemented in a reproducing apparatus 12830, the reproducing apparatus 12830 may parse and decode an encoded video stream recorded on a storage medium 12820, such as a disc or a memory card to restore digital signals. Thus, the restored video signal may be reproduced, for example, on a monitor 12840.

In the set-top box 12870 connected to the antenna 12860 for a satellite/terrestrial broadcast or a cable antenna 12850 for receiving a cable television (TV) broadcast, a video decoding apparatus according to an exemplary embodiment may be installed. Data output from the set-top box 12870 may also be reproduced on a TV monitor 12880.

As another example, a video decoding apparatus according to an exemplary embodiment may be installed in the TV receiver 12810 instead of the set-top box 12870.

An automobile 12920 including an appropriate antenna 12910 may receive a signal transmitted from the satellite 12900 or the wireless base station 11700. A decoded video may be reproduced on a display screen of an automobile navigation system 12930 built into the automobile 12920.

A video signal may be encoded by a video encoding apparatus according to an exemplary embodiment and may then be stored in a storage medium. Specifically, an image signal may be stored in a DVD disc 12960 by a DVD recorder or may be stored in a hard disc by a hard disc recorder 12950. As another example, the video signal may be stored in an SD card 12970. If the hard disc recorder 12950 includes a video decoding apparatus according to an exemplary embodiment, a video signal recorded on the DVD disc 12960, the SD card 12970, or another storage medium may be reproduced on the TV monitor 12880.

The automobile navigation system 12930 may not include the camera 12530, the camera interface 12630, and the image coding unit 12720 of FIG. 30. For example, the computer 12100 and the TV receiver 12810 may not be included in the camera 12530, the camera interface 12630, or the image coding unit 12720 of FIG. 30.

Figure 32:
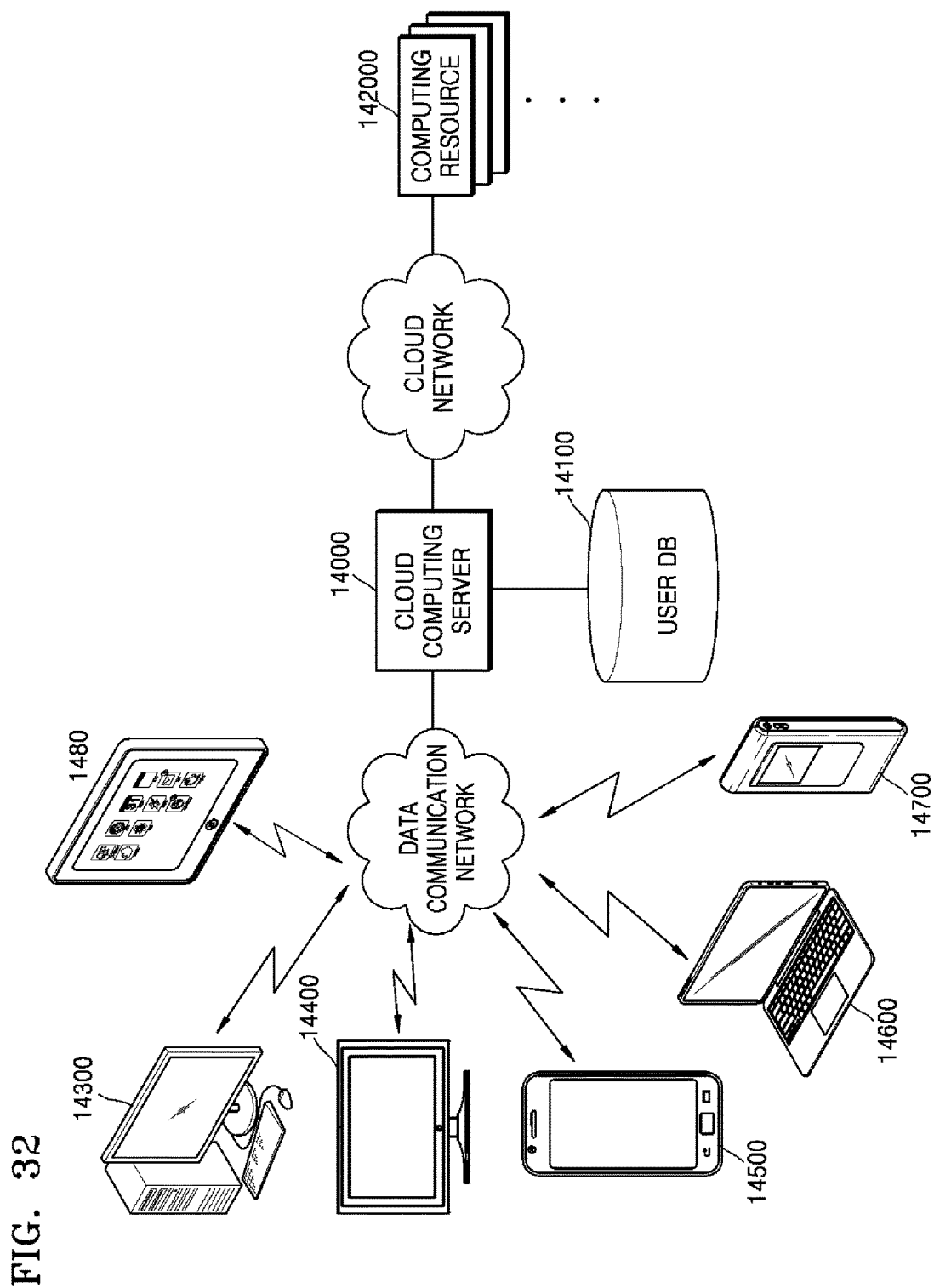
FIG. 32 illustrates a network structure of a cloud computing system using a video encoding apparatus and a video decoding apparatus, according to various embodiments.

FIG. 32 illustrates a network structure of a cloud computing system using a video encoding apparatus and a video decoding apparatus, according to various embodiments.

The cloud computing system of the present invention may include a cloud computing server 14000, a user database (DB) 14100, a plurality of computing resources 14200, and a user terminal.

The cloud computing system provides an on-demand outsourcing service of the plurality of computing resources 14200 via a data communication network, e.g., the Internet, in response to a request from the user terminal. Under a cloud computing environment, a service provider provides users with desired services by combining computing resources at data centers located at physically different locations by using virtualization technology. A service user does not have to install computing resources, e.g., an application, storage, an operating system (OS), and security, in his/her own terminal in order to use them, but may select and use desired services from among services in a virtual space generated through the virtualization technology, at a desired point of time.

A user terminal of a specified service user is connected to the cloud computing server 14100 via a data communication network including the Internet and a mobile telecommunication network. User terminals may be provided with cloud computing services, and particularly video reproduction services, from the cloud computing server 14100. The user terminals may be various types of electronic devices capable of being connected to the Internet, e.g., a desk-top PC 14300, a smart TV 14400, a smart phone 14500, a notebook computer 14600, a portable multimedia player (PMP) 14700, a tablet PC 14800, and the like.

The cloud computing server 14100 may combine the plurality of computing resources 14200 distributed in a cloud network and provide user terminals with a result of the combining. The plurality of computing resources 14200 may include various data services, and may include data uploaded from user terminals. As described above, the cloud computing server 14100 may provide user terminals with desired services by combining video databases distributed in different regions according to the virtualization technology.

User information about users who has subscribed to a cloud computing service is stored in the user DB 14100. The user information may include logging information, addresses, names, and personal credit information of the users. The user information may further include indexes of videos. Here, the indexes may include a list of videos that have already been reproduced, a list of videos that are being reproduced, a pausing point of a video that was being reproduced, and the like.

Information about a video stored in the user DB 14100 may be shared between user devices. For example, when a video service is provided to the notebook computer 14600 in response to a request from the notebook computer 14600, a reproduction history of the video service is stored in the user DB 14100. When a request to reproduce this video service is received from the smart phone 14500, the cloud computing server 14100 searches for and reproduces this video service, based on the user DB 14100. When the smart phone 14500 receives a video data stream from the cloud computing server 14100, a process of reproducing video by decoding the video data stream is similar to an operation of the mobile phone 12500 described above with reference to FIG. 24.

The cloud computing server 14100 may refer to a reproduction history of a desired video service, stored in the user DB 14100. For example, the cloud computing server 14100 receives a request to reproduce a video stored in the user DB 14100, from a user terminal. If this video was being reproduced, then a method of streaming this video, performed by the cloud computing server 14100 may vary according to the request from the user terminal, i.e., according to whether the video will be reproduced, starting from a start thereof or a pausing point thereof. For example, if the user terminal requests to reproduce the video, starting from the start thereof, the cloud computing server 14100 transmits streaming data of the video starting from a first frame thereof to the user terminal. On the other hand, if the user terminal requests to reproduce the video, starting from the pausing point thereof, the cloud computing server 14100 transmits streaming data of the video starting from a frame corresponding to the pausing point, to the user terminal.

In this case, the user terminal may include a video decoding apparatus as described above with reference to FIGS. 12A through 25. As another example, the user terminal may include a video encoding apparatus as described above with reference to FIGS. 12A through 25. Alternatively, the user terminal may include both the video decoding apparatus and the video encoding apparatus as described above with reference to FIGS. 12A through 25.

Various applications of the video encoding method, the video decoding method, the video encoding apparatus, and the video decoding apparatus according to embodiments described above with reference to FIGS. 12A through 25 have been described above with reference to FIGS. 21 through 27. However, various applications of the video encoding method, the video decoding method, the video encoding apparatus, and the video decoding apparatus according to the embodiments described above with reference to FIGS. 12A through 25 are not limited to the embodiments described above with reference to FIGS. 21 through 27.

While this invention has been particularly shown and described with reference to embodiments thereof, it will be understood by one of ordinary skill in the art that various changes in form and details may be made therein without departing from the spirit and scope of the invention as defined by the appended claims. The disclosed embodiments should be considered in a descriptive sense only and not for purposes of limitation. Therefore, the scope of the invention is defined not by the detailed description of the invention but by the appended claims, and all differences within the scope will be construed as being included in the present invention.

The invention claimed is:

1. A scalable video encoding method comprising:
   determining a reference layer image from among base layer images so as to inter layer predict an enhancement layer image, wherein the reference layer image corresponds to the enhancement layer image;
   determining a phase between pixels of the enhancement layer image and the reference layer image, according to a scaling factor between the enhancement layer image and the reference layer image and a color format difference of the enhancement layer image and the reference layer image;
   selecting at least one filter coefficient set corresponding to the determined phase, from filter coefficient data comprising filter coefficient sets that respectively correspond to phases;
   generating an up-sampled reference layer image by extending a resolution of the reference layer image according to the scaling factor by performing interpolation filtering on the reference layer image by using the selected filter coefficient set;
   obtaining a prediction error between the up-sampled reference layer image and the enhancement layer image;
   generating an enhancement layer bitstream comprising the prediction error; and
   generating a base layer bitstream by encoding the base layer images.

2. The scalable video encoding method of claim 1, wherein the generating of the up-sampled reference layer image comprises converting a bit depth of the reference layer image so that the up-sampled reference layer image corresponds to a bit depth of the enhancement layer image.

3. The scalable video encoding method of claim 1, wherein the determining of the phase between the pixels comprises:
   determining a phase between a luma pixel of the reference layer image and a luma pixel of the enhancement layer image according to the scaling factor; and
   determining a phase between a chroma pixel of the reference layer image and a chroma pixel of the enhancement layer image according to the scaling factor and the color format of the enhancement layer.

4. The scalable video encoding method of claim 3, wherein the determining of the phase between the chroma pixels comprises:
   determining a chroma pixel ratio according to the scaling factor and the color format difference; and
   determining the phase between the chroma pixel of the reference layer image and the chroma pixel of the enhancement layer image according to the chroma pixel ratio.

5. The scalable video encoding method of claim 1, further comprising determining, from the reference layer image, positions of samples used in the interpolation filtering.

6. A scalable video decoding method comprising:
   determining a reference layer image from among base layer images obtained by decoding a base layer bitstream comprising encoded base layer images, wherein the reference layer image corresponds to an enhancement layer image;
   obtaining a scaling factor between the enhancement layer image and the reference layer image and a color format difference of the enhancement layer image and the reference layer image and a prediction error for inter layer prediction of the enhancement layer image by decoding an enhancement layer bitstream;
   determining a phase between pixels of the enhancement layer image and the reference layer image based on the scaling factor and the color format difference;
   selecting at least one filter coefficient set corresponding to the determined phase, from filter coefficient data comprising filter coefficient sets that respectively correspond to phases;
   generating an up-sampled reference layer image by extending a resolution of the reference layer image according to the scaling factor by performing, the interpolation filtering on the reference layer image according to the selected filter coefficient set; and
   reconstructing the enhancement layer image by using the prediction error and the up-sampled reference layer image.

7. The scalable video decoding method of claim 6, wherein the generating of the up-sampled reference layer image comprises converting a bit depth of the reference layer image so that the up-sampled reference layer image corresponds to a bit depth of the enhancement layer image.

8. The scalable video decoding method of claim 6, wherein the determining of the phase between the pixels comprises:

determining a phase between a luma pixel of the reference layer image and a luma pixel of the enhancement layer image according to the scaling factor; and determining a phase between a chroma pixel of the reference layer image and a chroma pixel of the enhancement layer image according to the scaling factor and the color format of the enhancement layer.

9. The scalable video decoding method of claim 8, wherein the determining of the phase between the chroma pixels comprises:

determining a chroma pixel ratio according to the scaling factor and the color format difference; and determining the phase between the chroma pixel of the reference layer image and the chroma pixel of the enhancement layer image according to the chroma pixel ratio.

10. The scalable video decoding method of claim 8, wherein the converting of the color format comprises converting the color format of the enhancement layer image, so that a ratio of a luma pixel to two chroma pixels is 4:2:2 or 4:4:4.

11. The scalable video decoding method of claim 6, further comprising determining, from the reference layer image, positions of samples used in the interpolation filtering.

12. A scalable video encoding apparatus comprising:

a filter data storage unit configured to store filter coefficient sets that respectively correspond to phases;

a filter selector configured to determine a phase between a pixel of a reference layer image and a pixel of an enhancement layer image, based on a scaling factor between the reference layer image selected from a base layer and the enhancement layer image corresponding to the reference layer image, and a color format difference of the enhancement layer image and the reference layer image, and to select, from data of the filter coefficient sets, a filter coefficient set corresponding to the determined phase;

an up-sampling unit configured to perform interpolation filtering on the reference layer image by using the selected filter coefficient set;

a prediction error obtainer configured to obtain a prediction error between the up-sampled reference layer image and the enhancement layer image;

a base layer encoder configured to generate a base layer bitstream by performing encoding on the base layer image; and an enhancement layer encoder configured to generate an enhancement layer bitstream comprising the prediction error.

13. A scalable video decoding apparatus comprising:

a filter data storage unit configured to store filter coefficient sets that respectively correspond to phases;

an enhancement layer decoder configured to obtain, from an enhancement layer bitstream, a prediction error between an up-sampled reference layer image and an enhancement layer image, a scaling factor between the enhancement layer image and a reference layer image and a color format difference of the enhancement layer image and the reference layer image;

a base layer bitstream decoder configured to generate a base layer image from a base layer bitstream;

a filter selector configured to select, from among filter coefficient sets stored in the filter data storage unit, a filter coefficient set corresponding to a phase between pixels of the enhancement layer image and the reference layer image based on the scaling factor and the color format difference;

an up-sampling unit configured to obtain the up-sampled reference layer image by performing the interpolation filtering on the reference layer image according to the selected filter coefficient set; and an enhancement layer obtainer configured to obtain the enhancement layer image by using the prediction error and the up-sampled reference layer image.

14. A computer-readable recording medium having recorded thereon a program for executing the video encoding method of claim 1.

15. A computer-readable recording medium having recorded thereon a program for executing the video decoding method of claim 6.

* * * * *